US008683023B1

(12) United States Patent (10) Patent No.: US 8,683,023 B1
Brandwine et al. (45) Date of Patent: Mar. 25, 2014

(54) MANAGING COMMUNICATIONS INVOLVING EXTERNAL NODES OF PROVIDED COMPUTER NETWORKS

(75) Inventors: Eric Jason Brandwine, Haymarket, VA (US); Andrew B. Dickinson, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 702 days.

(21) Appl. No.: 12/828,060

(22) Filed: Jun. 30, 2010

(51) Int. Cl.
*G06F 15/177* (2006.01)
*G06F 15/173* (2006.01)

(52) U.S. Cl.
USPC ................ 709/222; 709/220; 709/223

(58) Field of Classification Search
USPC .......................................... 709/222
See application file for complete search history.

(56) References Cited

U.S. PATENT DOCUMENTS

| 6,411,967 | B1 | 6/2002 | Van Renesse |
| 6,529,953 | B1 | 3/2003 | Van Renesse |
| 6,724,770 | B1 | 4/2004 | Van Renesse |
| 7,068,666 | B2 | 6/2006 | Foster et al. |
| 7,068,667 | B2 | 6/2006 | Foster et al. |
| 7,124,289 | B1 | 10/2006 | Suorsa |
| 7,131,123 | B2 | 10/2006 | Suorsa et al. |
| 7,152,109 | B2 | 12/2006 | Suorsa et al. |
| 2005/0025157 | A1* | 2/2005 | Pennec et al. ............. 370/395.5 |
| 2005/0114507 | A1 | 5/2005 | Tarui et al. |
| 2005/0120160 | A1 | 6/2005 | Plouffe et al. |
| 2006/0184936 | A1 | 8/2006 | Abels et al. |

OTHER PUBLICATIONS

"Chapter: Configuring Layer 2 Services Over MPLS," JUNOse Internet Software for E-series Routing Platforms: Routing Protocols Configuration Guide, vol. 2, Mar. 2004, retrieved Jan. 26, 2007, from http://www.juniper.net/techpubs/software/erx/junose52/swconfig-routing-vol2/html/title-swconfig . . . , pp. 357-382, 31 pages.
"Cisco IP Solution Center MPLS VPN Management 4.2," Cisco Systems, Inc., retrieved Jan. 24, 2007, from http://www.cisco.com/en/US/products/sw/netmgtsw/ps5332/products_data_sheet_09186a008017d7 . . . , 5 pages.
"Grid Computing Solutions," Sun Microsystems, Inc., retrieved May 3, 2006, from http://www.sun.com/software/grid, 3 pages.
"Grid Offerings," Java.net, retrieved May 3, 2006, from http://wiki.java.net/bin/view/Sungrid/OtherGridOfferings, 8 pages.

(Continued)

*Primary Examiner* — Hee Soo Kim
(74) *Attorney, Agent, or Firm* — Seed IP Law Group PLLC

(57) ABSTRACT

Techniques are described for managing communications for a managed virtual computer network overlaid on a distinct substrate computer network, including for communications involving computing nodes of the managed virtual computer network connected to the substrate network and/or other external nodes of the managed virtual computer network that are not connected to the substrate network. The managed virtual computer network may have multiple associated virtual network addresses, and the managing of the communications may further include using one or more edge modules to direct all communication that have a destination virtual network address within a range or other group of multiple virtual network addresses assigned to one or more external nodes to be forwarded over the substrate network to an edge module associated with the one or more external nodes, including to route communications between different external nodes via the substrate network.

29 Claims, 13 Drawing Sheets

(56) References Cited

OTHER PUBLICATIONS

"MPLS-enabled VPN Services," Data Connection, retrieved Jan. 26, 2007, from http://www.dataconnection.com/solutions/vpn_vlan.htm, 1 page.
"Recent Advances Boost System Virtualization," eWeek.com, retrieved May 3, 2006, from http://www.eweek.com/article2/0,1895,1772626,00.asp, 5 pages.
"Scalable Trust of Next Generation Management (STRONGMAN)," retrieved May 17, 2006, from http://www.cis.upenn.edu/~dsl/STRONGMAN/, 4 pages.
"Sun EDA Compute Ranch," Sun Microsystems, Inc., retrieved May 3, 2006, from http://www.sun.com/processors/ranch/brochure.pdf, 2 pages.
"Sun Microsystems Accelerates UltraSPARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3.xml, 2 pages.
"Sun N1 Grid Engine 6," Sun Microsystems, Inc., retrieved May 3, 2006, from http://www.sun.com/software/gridware/index.xml, 3 pages.
"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.
"The Reverse Firewall™: Defeating DDoS Attacks Emerging from Local Area Networks," Cs3, Inc., retrieved Nov. 11, 2005, from http://www.cs3-inc.com/rfw.html, 4 pages.
"The Softricity Desktop," Softricity, retrieved May 3, 2006, from http://www.softricity.com/products/, 3 pages.
Bellovin, S., "Distributed Firewalls," Nov. 1999, issue of ;login:, pp. 37-39, retrieved Nov. 11, 2005, from http://www.cs.columbia.edu/~smb/papers/distfw.html, 10 pages.
Blaze, M., "Using the KeyNote Trust Management System," Mar. 1, 2001, retrieved May 17, 2006, from http://www.crypto.com/trustmgt/kn.html, 4 pages.
Brenton, C., "What is Egress Filtering and How Can I Implement It? —Egress Filtering v 0.2," Feb. 29, 2000, SANS Institute, http://www.sans.org/infosecFAQ/firewall/egress.htm, 6 pages.
Chown, T., "Use of VLANs for IPv4-1Pv6 Coexistence in Enterprise Networks: draft-ietf-v6ops-vlan-usage-01," IPv6 Operations, University of Southampton, Mar. 6, 2006, retrieved Jun. 15, 2007, from http://tools.ieft.org/html/draft-ieft-v6ops-vlan-usage-01, 13 pages.
Coulson, D., "Network Security Iptables," Apr. 2003, Linuxpro, Part 2, retrieved from http://davidcoulson.net/writing/lxf/39/iptables.pdf, 4 pages.
Coulson, D., "Network Security Iptables," Mar. 2003, Linuxpro, Part 1, retrieved from http://davidcoulson.net/writing/lxf138/iptables.pdf, 4 pages.
Demers, A., "Epidemic Algorithms for Replicated Database Maintenance," 1987. Proceedings of the Sixth Annual ACM Symposium on Principles of Distributed Computing, Vancouver, British Columbia, Canada, Aug. 10-12, 1987, 12 pages.
Gruener, J., "A vision of togetherness," May 24, 2004, Network World, retrieved May 3, 2006, from http://networkworld.com/supp/2004/ndc3/0524virt.html, 9 pages.
loannidis, S., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dsl/STRONGMAN/Papers/df.pdf, 10 pages.
Kenshi, P., "Help File Library: Iptables Basics," Justlinux, retrieved Dec. 1, 2005, from http://www.justlinux.com/nhf/Security/Iptables_Basics.html, 4 pages.
Shankland, S., "Sun to buy start-up to bolster N1," Jul. 30, 2003, CNet News,com, retrieved May 3, 2006, http://news.zdnet.com/2100-35213_22-5057752.html, 8 pages.
Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.
Townsley, M., et al., "Encapsulation of MPLS over Layer 2 Tunneling Protocol Version 3: draft-ietf-mpls-over-12tpv3-03.txt," Network Working Group, Nov. 2006, retrieved Jun. 15, 2007, from http://tools.ietf.org/html/draft-ietf-mpls-over-12tpv3-03, 12 pages.
Van Renesse, R., "Astrolabe: a Robust and Scalable Technology for Distributed System Monitoring, Management, and Data Mining," May 2003, ACM Transcriptions On Computer Systems (TOCS), 21(2): 164-206, 43 pages.
Vijayan, J., "Terraspring Gives Sun's N1 a Boost," Novemeber 25, 2002, Computerworld, retrieved May 3, 2006, from http://www.computerworld.com/printthis/2002/0,4814,76159,00.html, 3 pages.
Virtual Iron Software Home, Virtualiron®, retrieved May 3, 2006, from http://www.virtualiron.com/, 1 page.
Waldspurger, C.A., "Spawn: A Distributed Computational Economy," Feb. 1992, IEEE Transactions on Software Engineering, 18(2): 103-117, 15 pages.
"Anycast," retrieved on Mar. 16, 2009, from http://en.wikipedia.org/wiki/Anycast, 4 pages.
"Load Balancing (Computing)," retrieved on Mar. 16, 2009, from http://en.wikipedia.org/wiki/Load_balancing_(computing), 5 pages.
"Mobile IP," retrieved on Dec. 19, 2008, from http://en.wikipedia.org/wiki/Mobile_ip, 3 pages.
"Roung Robin DNS," retrieved on Dec. 17, 2008, from http://en.wikipedia.org/wiki/Round_robin_DNS, 2 pages.
"Virtual IP Address," retrieved on Dec. 17, 2008, from http://www.answers.com/topic/virtual-ip-address-1, 2 pages.
"VMware VMotion," retrieved on Mar. 16, 2009, from http://www.vmware.com/products/vi/vc/vmotion.html, 2 pages.
"VMWare Storage VMotion," retrieved on Mar. 16, 2009, from http://www.vmware.com/products/vi/storage_vmotion.html, 2 pages.
Clark, C., et al., "Live Migration of Virtual Machines," retrieved on Mar. 16, 2009, from http://www.cl.cam.ac.uk/research/srg/netos/papers/2005-migration-nsdi-pre.pdf, 14 pages.
"EZchip Technologies-Technologies," retrieved on Mar. 31, 2010, from http://www.ezchip.com/technologies.htm, 2 pages.
"Link Aggregation," retrieved on Mar. 31, 2010, from http://en.wikipedia.org/wiki/802.3ad, 6 pages.
"Network Processor," retrieved on Mar. 31, 2010, from http://en.wikipedia.org/wiki/Network_processor, 3 pages.
"TippingPoint_Core_Controller," retrieved on Mar. 31, 2010, from http://www.tippingpoint.com/pdf/resources/datasheets/401054-005_TippingPointCoreController.pdf, 3 pages.
"TippingPoint Technologies," retrieved on Mar. 31, 2010, from http://www.tippingpoint.com/products_core_controller.html, 2 pages.
"VMware VMsafe Security Technology," retrieved on Mar. 31, 2010, from http://www.vmware.com/technical-resources/security/vmsafe/faq.html, 3 pages.
"New VMware VMsafe Technology Allows the Virtual Datacenter to Be More Secure Than Physical Environments," Feb. 27, 2008, retrieved on Mar. 31, 2010, from http://www.vmware.com/company/news/releases/vmsafe_vmworld.html, 5 pages.
"VMware VMsafe Security Technology," retrieved on Mar. 31, 2010, from http://www.vmware.com/technical-resources/security/vmsafe.html?rls=com.microsoft:en-u . . . , 3 pages.
"Border Gateway Protocol," retrieved on Jun. 24, 2010, from http://en.wikipedia.org/wiki/MP-BGP, 14 pages.
"Connecting IPv6 Islands Across IPv4 Clouds with BGP," retrieved on Jun. 24, 2010, from http://www.juniper.net/ techpubs/en_US/junose10.2/information-products/topic-collections/swconfig-bgp-mpls/id-13832.html, 5 pages.

\* cited by examiner

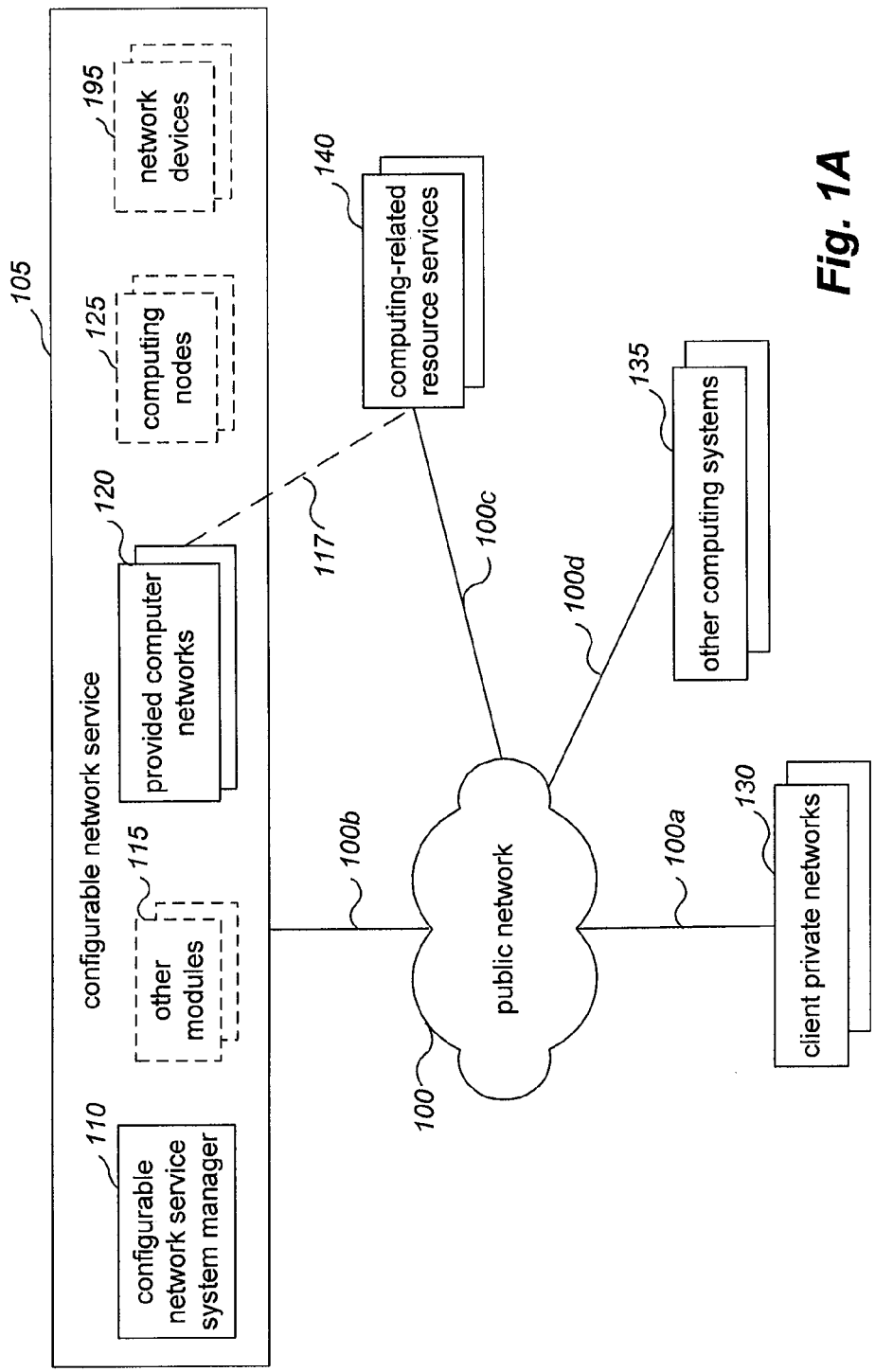

Fig. 2D mapping information 282d

| | | | |
|---|---|---|---|
| Z U | 10.2.0.0/16 | 200.0.10.6 | ... |
| Z V | 10.1.0.5 | <external connection encoding information> | |
| Z U | 10.0.0.3 | 200.50.0.2 | |
| Z U | 10.0.0.0/8 | 200.0.0.4 | |

- 213x: Z U
- 213y: Z V
- 213m: Z U
- 213n: Z U
- 213a / 213b
- 213c
- 213d
- 213e mapping information 282e

| | | | |
|---|---|---|---|
| Z W | 10.3.0.0/16 | <external connection encoding information> 30.0.5.4 and optionally additional external connection encoding information> | ... |
| Z X | 10.2.0.0/16 | | |

- 214y: Z W
- 214z: Z X
- 214a / 214b
- 214c
- 214d
- 214e

MANAGING COMMUNICATIONS INVOLVING EXTERNAL NODES OF PROVIDED COMPUTER NETWORKS

BACKGROUND

Many companies and other organizations operate computer networks that interconnect numerous computing systems to support their operations, with the computing systems alternatively co-located (e.g., as part of a private local area network, or "LAN") or instead located in multiple distinct geographical locations (e.g., connected via one or more other private or shared intermediate networks). For example, data centers housing significant numbers of interconnected co-located computing systems have become commonplace, such as private data centers that are operated by and on behalf of a single organization, as well as public data centers that are operated by entities as businesses. Some public data center operators provide network access, power, and secure installation facilities for hardware owned by various customers, while other public data center operators provide "full service" facilities that also include hardware resources made available for use by their customers. However, as the scale and scope of typical data centers and computer networks has increased, the task of provisioning, administering, and managing the associated physical computing resources has become increasingly complicated.

The advent of virtualization technologies for commodity hardware has provided some benefits with respect to managing large-scale computing resources for many customers with diverse needs, allowing various computing resources to be efficiently and securely shared between multiple customers. For example, virtualization technologies such as those provided by VMWare, XEN, Linux's KVM ("Kernel-based Virtual Machine"), or User-Mode Linux may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines.

BRIEF DESCRIPTION OF THE DRAWINGS

FIGS. 1A and 1B are network diagrams illustrating example embodiments of managing communications for computing nodes and external nodes belonging to a managed computer network.

FIGS. 2A-2E illustrate examples of managing communications involving computing nodes and external nodes of a managed virtual overlay computer network.

DETAILED DESCRIPTION

Figure 1B:
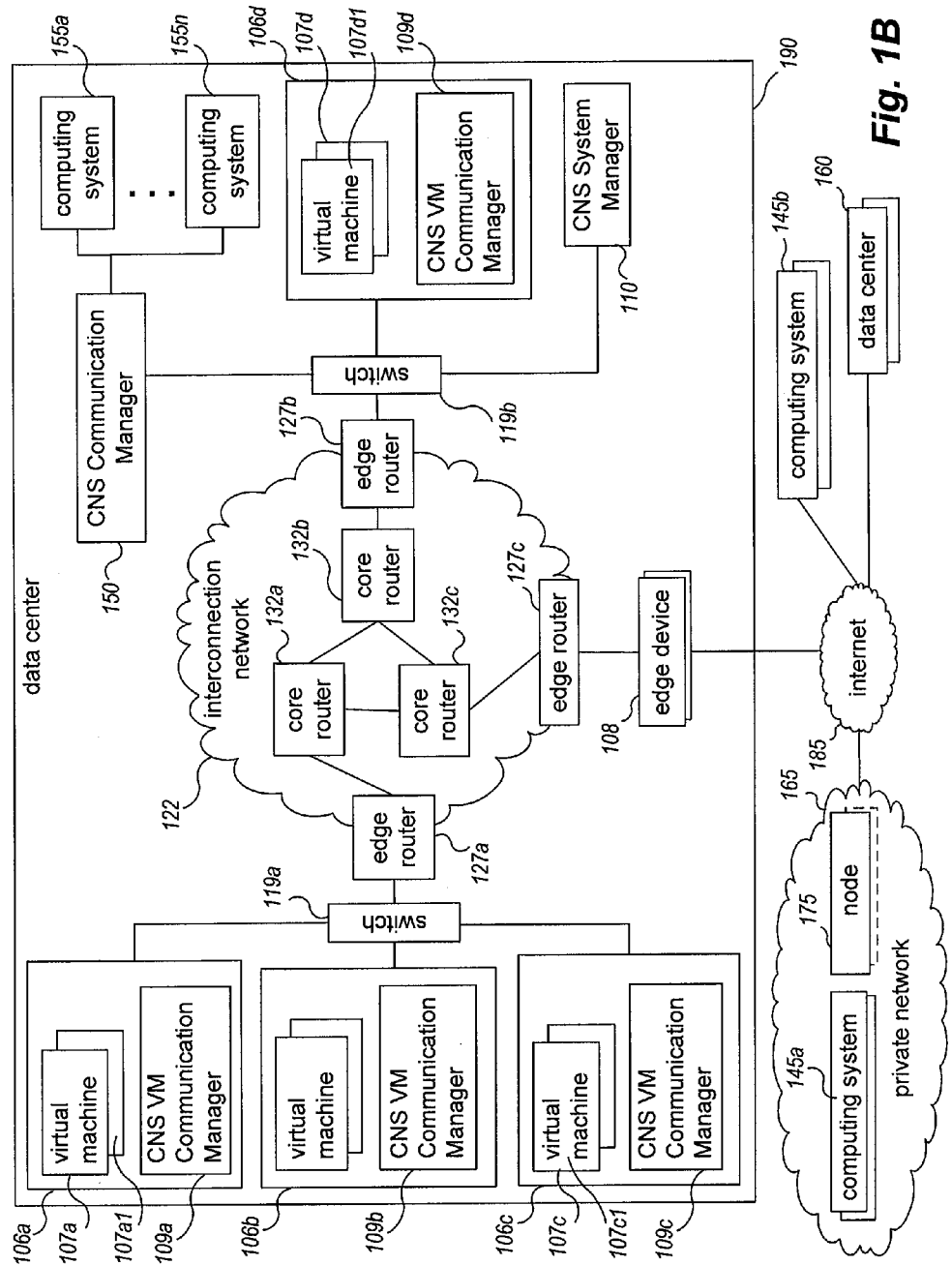

Techniques are described for providing managed computer networks, such as for managed computer networks that are each implemented as a virtual computer network overlaid on one or more other computer networks. The managed computer networks may in some embodiments be provided by a configurable network service to users or other entities who are customers (e.g., for a fee) or otherwise clients of the configurable network service, such as to remote clients that access the configurable network service and/or the provided managed computer networks from remote locations over one or more intervening networks (e.g., over the Internet). In at least some embodiments, the techniques include managing communications for various computing nodes of a managed virtual computer network overlaid on a substrate network, including in situations in which one or more groups of nodes that are external to the substrate network are integrated into and used as part of the managed virtual computer network, such as to enable communications between multiple external node groups via the substrate network. As one example, a configurable network service that is providing the managed computer network for a client may use one or more edge devices or other edge modules at a data center in order to manage communications between a substrate network at the data center and other remote computer networks that include external nodes. The external nodes may be separated from the substrate network via one or more external connections, such as if the external nodes are located in one or more separate geographical locations (e.g., at remote premises of the client). In at least some embodiments, some or all of the described techniques are automatically performed by embodiments of a system manager module, one or more communication manager modules, and/or one or more edge modules, such as modules that are part of a network-accessible configurable network service.

Thus, the managing of communications for a managed virtual computer network overlaid on a substrate network may in at least some embodiments include managing communications involving one or more computing nodes of the managed computer network that are connected to the substrate network and/or involving one or more external nodes that are integrated into or otherwise part of the virtual computer network. For example, the computing nodes of the managed virtual computer network may in some embodiments each have an associated communication manager module that manages communications to and/or from the computing node, and the communication manager module associated with a source computing node that is sending a communication to one or more indicated final destinations may in at least some situations facilitate the sending of that communication. Similarly, any external nodes integrated into the managed virtual computer network may in some embodiments each have an associated edge module that interconnects the substrate network and an external connection to the external node and that manages communications to and/or from the external node. Communications involving an external node may have various forms in various embodiments and situations, including the following non-exclusive list: a communication between an external node outside the substrate network and a computing node connected to the substrate network, such as via an edge module associated with the external node; a communication between a first such external node associated with a first edge module and a second such external node associated with a second edge module, such as via both edge modules and via the substrate network between the edge modules; a communication between two such external nodes that are associated with a single edge module, whether connected to the edge module via a single external connection or multiple connections, and whether being part of a single external network or multiple external networks (e.g., with the communication not entering the substrate network, or with the communication optionally entering a portion of the substrate network and then being routed back to the single edge module); etc. As discussed elsewhere, a managed virtual computer network may further be configured to manage communications directed to one or more particular external nodes via a particular external connection in various manners, including by associating one or more virtual network addresses assigned to those one or more particular external nodes with the particular external connection and/or with one or more associated edge modules that support that particular external connection, including in situations in which some or all of the particular external nodes are not actually implemented or present via the particular external connection.

In addition, one or more external nodes may be integrated into a virtual computer network in various manners in various embodiments. For example, the managed virtual computer network may have multiple associated virtual network addresses (e.g., a range of contiguous virtual network addresses, such as a CIDR ("Classless Inter-Domain Routing") block), with each of the computing nodes of the managed virtual computer network being associated with at least one of the virtual network addresses for the managed virtual computer network, and with one or more external nodes being integrated into the managed virtual computer network based at least in part by associating one or more other of the virtual network addresses for the managed virtual computer network with the external nodes, with inter-node communications being managed accordingly. For example, in some embodiments and situations, a group of multiple of the virtual network addresses for a managed virtual computer network (e.g., a sub-range or other subset of a range of contiguous virtual network addresses for the managed virtual computer network) may be associated with a group of one or more external nodes (e.g., a particular external network) that is located at an external location outside of the substrate network—in such situations, that entire sub-range or other group of multiple virtual network addresses may be associated within the substrate network with a single edge module (or a pool of multiple alternative edge modules) that is associated with that group of one or more external nodes, as discussed in greater detail below.

When a source computing node of the managed virtual computer network initiates an outgoing communication to a destination external node that is integrated into the managed virtual computer network (e.g., by sending the communication to a destination virtual network address that is associated with the destination external node, such as by being within a range associated with an external network to which the destination external node belongs), the communication manager module associated with the source computing node may identify a particular edge module that is associated with the external node, encode the communication in a manner specific to the substrate network (e.g., by including various information in the encoded communication to enable the communication to be properly forwarded over the substrate network, such as in a header of the communication), and then forward the encoded communication over the substrate network to the identified associated edge module for the destination external node. When the associated edge module receives the communication, the edge module decodes the communication so that it is no longer specific to the substrate network (e.g., by removing any information that was previously included in the encoded communication to enable the communication to be properly forwarded over the substrate network), modifies the decoded communication so that it is directed to an external location associated with the external node and to optionally add network-identifying information for the managed virtual computer network to the modified communication, and forwards the modified communication to the external node over one or more external networks or other external connections. When multiple virtual network addresses are associated with an external location outside of the substrate network (e.g., with one or more external nodes at that external location), one or more edge modules connected to the substrate network may similarly be configured to forward any communications within the substrate network that are directed to any of those multiple virtual network addresses to that external location, including in situations in which the edge module is not aware of the particular external node that will ultimately receive the communication (e.g., if a single device at the external location is responsible for receiving and further handling communications sent to those multiple virtual network addresses), and optionally in which no actual external node is currently associated with a particular one or more of the multiple virtual network addresses (e.g., such that a device at the external location will cache the communication until a corresponding external node is available, or may instead drop the communication or otherwise handle the communication in other manners). In addition, as described in greater detail below, the external connection via which an edge module forwards a communication to an external node may have various forms in various embodiments and situations, and the edge module may further encode or otherwise format communications in a manner specific to a particular type of external connection that will be used in various manners—as non-exclusive examples, the types of external connections may include the following: a link that is configured to support VLAN ("virtual LAN") identifiers, such as in accordance with the IEEE 802.1Q standard (e.g., with the edge module optionally adding an appropriate VLAN identifier corresponding to a particular managed virtual computer network to a communication being sent over that external connection); a link that is configured to support MPLS ("Multi Protocol Label Switching") labels or tags (e.g., with the edge module optionally adding an appropriate MPLS label corresponding to a particular managed virtual computer network to a communication being sent over that external connection); one or more external networks that use publicly routable external network addresses (e.g., with the edge module optionally tracking a publicly routable external network address for one or more particular external nodes, and forwarding communications to those external nodes to that external network address); a link that is connected to a VPN ("Virtual Private Network") connection endpoint (e.g., with the edge module optionally adding an external network address or other information that the VPN connection endpoint will use in further encoding the communication before it is forwarded to the external node); etc. Communications being sent from an external node to a computing node of a managed virtual computer network may be handled in a similar manner but in the opposite direction, as discussed in greater detail below. In some embodiments, the source computing node may be one of multiple virtual machines hosted on a physical computer system, the associated communication manager module for the source computing node may be provided by a virtual machine hypervisor monitor executing on the physical computer system to manage those hosted virtual machines, and the edge module may be provided as part of an edge device or other module that interconnects the substrate network and one or more external networks or external connections via which the external node is accessible.

When a source external node of the managed virtual computer network initiates a communication to another destination external node that is integrated into the managed virtual computer network (e.g., by sending the communication to a destination virtual network address that is associated with the destination external node), the source edge module associated with the source external node receives the communication, and identifies a particular destination edge module that is associated with the destination external node. When the identified destination edge module is different from the source edge module, the source edge module further proceeds to encode the communication in a manner specific to the substrate network (e.g., by including various information in the encoded communication to enable the communication to be properly forwarded over the substrate network, such as in a header of the communication), and then forward the encoded communication over the substrate network to the identified destination edge module. When the destination edge module receives the communication, the destination edge module decodes the communication so that it is no longer specific to the substrate network (e.g., by removing any information that was previously included in the encoded communication to enable the communication to be properly forwarded over the substrate network), modifies the decoded communication so that it is directed to an external location associated with the destination external node and to optionally add network-identifying information for the managed virtual computer network to the modified communication, and forwards the modified communication to the destination external node over one or more external connections.

In some embodiments, a virtual computer network may be configured to enable computing nodes within the substrate network to send communications directly over the substrate network to other such computing nodes, while communications from some or all external nodes to some or all computing nodes within the substrate network may be configured to be handled in a different manner, such as by being first directed to a particular computing node configured to operate as an intermediate destination for such communications. For example, if a particular first edge module is associated with a group of one or more first external nodes, the first edge module may be configured to associate a sub-range or other group of multiple virtual network addresses corresponding to multiple of the computing nodes with a particular specified intermediate computing node, such as based on using a mapping that associates those multiple virtual network addresses with a single substrate network address corresponding to the specified intermediate computing node. Thus, if a source first external node sends a communication to a destination computing node that has a virtual network address within those assigned multiple virtual network addresses, the sent communication will first be received by the first edge module, which will then forward the communication over the substrate network to the specified intermediate computing node, to enable that intermediate destination computing node to further handle the communication (e.g., to further forward the communication on to the final destination computing node; to optionally first perform configured firewall-related activities and/or other operations for the communication, such as to determine whether to further forward the communication; etc.). In addition, in some embodiments and situations, a particular virtual computer network may be configured to enable some integrated external nodes to perform activities that other integrated external nodes are not allowed to perform, such as to enable a first group of one or more first external nodes to send communications to computing nodes connected to the substrate network and/or to a second group of one or more second external nodes, but to prevent the second external nodes from performing one or both of sending communications to the computing nodes connected to the substrate network and to the first external nodes.

In addition, the edge modules may further optionally provide various additional types of functionality in various embodiments for at least some communications that they manage. Such optional additional functionality may include, for example, one or more of the following: firewall functionality; network address translation ("NAT") functionality; port address translation ("PAT") functionality; intrusion detection functionality; intrusion prevention functionality; content analysis functionality; virtual private network ("VPN") connection endpoint functionality or other functionality involving modifying the format or encoding of a communication (e.g., to encapsulate a communication in another communication, to separate a single communication into multiple communications or to combine multiple communications into a single communication, etc.); wide area network ("WAN") acceleration or other network acceleration; etc. Similar functionality may also be provided in at least some embodiments by external nodes that operate as intermediate destinations for some or all communications, such as to manage communications passing between two or more groups of computing nodes of a managed computer network. One or more edge modules and/or other modules (e.g., the system manager module) may also perform various other management tasks related to the tracking and managing of operations in at least some embodiments. For example, the edge modules or other modules may perform metering of a quantity of communications handled by the edge modules that are destined for, forwarded to and/or or received from external nodes, may perform filtering of particular communications to prevent unauthorized communications from being further forwarded or received by the edge modules (e.g., for communications received from external nodes that are intended for other external nodes accessible via an external connection to the substrate network), etc. In some embodiments and situations, the forwarding or other handling of a communication by an edge module may also include otherwise modifying the communication before it is further forwarded or blocking the communication from being further forwarded (e.g., as part of filtering particular communications that are not authorized), as discussed in greater detail elsewhere. In addition, the external nodes may have various forms and provide various types of functionality in various embodiments, including physical computer systems, virtual machines, specialized hardware devices, and other types of network nodes. Additional details related to various techniques for managing communications between computing nodes of a managed virtual computer network and external nodes integrated into the managed virtual computer network are included below.

Furthermore, in at least some embodiments and situations, the substrate network may have multiple edge modules that may alternatively be used to manage communications between the computing nodes of a managed virtual computer network and one or more external nodes integrated into the managed virtual computer network. The selection of a particular one of multiple alternative edge modules for use with a communication may be performed in various manners in various embodiments. For example, in some embodiments, each of the multiple alternative edge modules may be assigned a distinct substrate network address, such as from a CIDR block of contiguous network addresses, or instead from another group of multiple network addresses. If so, a particular one of the multiple alternative edge modules may in some embodiments be selected based on its associated network address, such as by first selecting one of the multiple network addresses associated with the multiple alternative edge modules, and then using the particular edge module associated with the selected network address. As one example, a hashing function may be used in some embodiments to deterministically select a particular edge module using particular information from a communication to be sent (e.g., by a communication manager module that manages a sending node who sends the communication and/or by a system manager module or other edge module), such as based at least in part on a destination network address and/or source network address in the communication, or instead on any other one or more other attributes of the communication (e.g., one or more types of information associated with sending of the communication, such as a networking protocol used to encode the communication, a TCP ("Transmission Control Protocol") port number or other port identifier, etc.; one or more types of information stored in one or more header fields of the communication, such as a protocol identifier, a port number, an indication of content type, etc.; one or more other attributes of the communication, such as a size; etc.). It will be appreciated that various hashing functions may be used in various embodiments, and that a particular edge module may be selected in manners other than via a hashing function (e.g., randomly; based at least in part on factors associated with the alternative edge modules, such as load; etc.). In addition, if the hashing function or other selection of a particular edge module is deterministically based on a combination of a communication's destination network address and source network address, then subsequent communications from that same source network address to that same destination network address may in some embodiments be directed to the same particular edge module (e.g., by dynamically selecting the same edge module for each of the communications, based on each of the communications having the same associated information that is used for the dynamic selecting), thus providing advantages related to communication flow continuity in at least some situations.

Alternatively, in other embodiments, after a particular edge module is selected for a particular communication from a source computing node to a final destination, the described techniques may include performing additional operations to ensure that at least some subsequent communications from that same source node to that same final destination are directed to the same particular edge module, such as by tracking particular edge modules used for particular source/final destination pairs (e.g., to maintain use of a particular edge module for subsequent communications that occur during a particular communication session, or that otherwise satisfy one or more indicated criteria, such as being sent during a specified period of time). In addition, in some embodiments the substrate network may optionally include one or more networking devices or other components (e.g., a networking router device, a load balancer, etc.) that are associated with the multiple alternative edge modules and that operate to direct certain communications to particular edge modules. For example, a router device may be located near two or more edge devices in the substrate computer network that are used as or incorporate edge modules, and may provide functionality that includes selecting between those two or more alternative edge devices for particular communications (e.g., a router device that treats two or more of the edge devices as alternatives for a specified anycast address, that provides equal-cost multi-path routing to two or more of the alternative edge devices, etc.), and that optionally provides flow hashing functionality to maintain use of a particular edge module for a flow of multiple communications between a particular source/final destination pair. Alternatively, a load balancer device may be configured to receive communications directed to a particular network address that is associated with a pool of multiple alternative edge modules, and to select a particular edge module to use for each of the communications based on various criteria (e.g., current load of the various possible edge modules). If such networking devices or other components are used in a particular embodiment, communication manager modules and edge modules in that embodiment may be configured to support such networking devices or other components in various manners, as discussed in greater detail below.

As noted above, in at least some embodiments, the described techniques include managing communications for a managed computer network being provided, including in embodiments in which the managed computer network is a virtual computer network that is overlaid on one or more underlying substrate computer networks. In such embodiments, communications may be encoded in various manners before being sent over an underlying substrate network (e.g., to use substrate network addresses for the communication source and/or final destination in the encoded communication that are distinct from virtual network addresses used for the communication source and/or final destination in the original pre-encoded communication), and the described techniques may be used in conjunction with such encoded communications, as discussed in greater detail below. Before discussing some additional details of managing such communications in particular manners, however, some aspects of such managed computer networks in at least some embodiments are introduced.

In particular, a managed computer network between multiple computing nodes may be provided in various ways in various embodiments, such as in the form of a virtual computer network that is created as an overlay network using one or more intermediate physical networks that separate the multiple computing nodes. In such embodiments, the intermediate physical network(s) may be used as a substrate network on which the overlay virtual computer network is provided, with messages between computing nodes of the overlay virtual computer network being passed over the intermediate physical network(s), but with the existence and use of the intermediate physical network(s) being transparent to the computing nodes (e.g., with the computing nodes being unaware of and/or being unable to detect the intermediate physical networks) in at least some such embodiments. For example, the multiple computing nodes may each have a distinct physical substrate network address that corresponds to a location of the computing node within the intermediate physical network(s), such as a substrate IP ("Internet Protocol") network address (e.g., an IP network address that is specified in accordance with IPv4, or "Internet Protocol version 4," or in accordance with IPv6, or "Internet Protocol version 6," such as to reflect the networking protocol used by the intermediate physical networks). In other embodiments, a substrate network on which a virtual computer network is overlaid may itself include or be composed of one or more other virtual computer networks, such as other virtual computer networks implemented by one or more third parties (e.g., by an operator or provider of Internet or telecom infrastructure).

When computing nodes are selected to participate in a managed computer network that is being provided on behalf of a user or other entity and that is a virtual computer network overlaid on a substrate network, each computing node may be assigned one or more virtual network addresses for the provided virtual computer network that are unrelated to those computing nodes' substrate network addresses, such as from a range of virtual network addresses used for the provided virtual computer network—in at least some embodiments and situations, the virtual computer network being provided may further use a networking protocol that is different from the networking protocol used by the substrate network (e.g., with the virtual computer network using the IPv4 networking protocol, and the substrate computer network using the IPv6 networking protocol). The computing nodes of the virtual computer network inter-communicate using the virtual network addresses (e.g., by sending a communication to another destination computing node by specifying that destination computing node's virtual network address as the destination network address for the communication), but the substrate network may be configured to route or otherwise forward communications based on substrate network addresses (e.g., by physical network router devices and other physical networking devices of the substrate network). If so, the overlay virtual computer network may be implemented from the logical edge of the intermediate physical network(s), by modifying the communications that enter the intermediate physical network(s) to encode the communications for the intermediate physical networks (e.g., to use substrate network addresses that are based on the networking protocol of the substrate network), and by modifying the communications that leave the intermediate physical network(s) to decode the communications (e.g., to use virtual network addresses that are based on the networking protocol of the virtual computer network if the decoded communication is to be provided to a computing node of the virtual computer network, to use external public network addresses if the decoded communication is to be forwarded over one or more external public networks, etc.). Additional details related to the provision of such an overlay virtual computer network are included below.

In at least some embodiments, a network-accessible configurable network service ("CNS") is provided by a corresponding CNS system, and the CNS system provides managed overlay virtual computer networks to remote customers (e.g., users and other entities), such as by providing and using numerous computing nodes that are in one or more geographical locations (e.g., in one or more data centers) and that are inter-connected via one or more intermediate physical networks. The CNS system may use various communication manager modules and/or edge modules at the edge of the one or more intermediate physical networks to manage communications for the various overlay virtual computer networks as they enter and leave the intermediate physical network(s), and may use one or more system manager modules to coordinate other operations of the CNS system. For example, to enable the communication manager modules and/or edge modules to manage communications for the overlay virtual computer networks being provided, the CNS system may track and use various information about the computing nodes and external nodes of each virtual computer network being managed, such as to map the substrate network address of each such computing node to the one or more overlay virtual network addresses associated with the computing node, and such as to map the external network address of each such group of one or more external nodes and the substrate network address of an associated edge module to the one or more overlay virtual network addresses or group of overlay virtual network addresses associated with the external node(s). Such mapping and other information may be stored and propagated in various manners in various embodiments, including centrally or in a distributed manner, as discussed in greater detail below.

Furthermore, in order to provide managed virtual computer networks to users and other entities in a desired manner, the CNS system allows users and other entities to interact with the CNS system in at least some embodiments to configure a variety of types of information for virtual computer networks that are provided by the CNS system on behalf of the users or other entities, and may track and use such configuration information as part of providing those virtual computer networks. The configuration information for a particular managed virtual computer network having multiple computing nodes and external nodes may include, for example, one or more of the following non-exclusive list: a quantity of the multiple computing nodes to include as part of the virtual computer network; one or more particular computing nodes to include as part of the virtual computer network; one or more external nodes to associate with the virtual computer network; a range or other group of multiple virtual network addresses to associate with the multiple computing nodes and/or external nodes of the virtual computer network; particular virtual network addresses to associate with particular computing nodes, particular groups of related computing nodes; a type of at least some of the multiple computing nodes of the virtual computer network, such as to reflect quantities and/or types of computing resources to be included with or otherwise available to the computing nodes; a geographic location at which some or all of the computing nodes of the virtual computer network are to be located; network topology information for the virtual computer network, such as to specify logical subnets and/or other logical topology of the virtual computer network; information about any access restrictions involving particular types of communications and/or particular destinations that are allowed or disallowed for particular computing nodes and/or external nodes; etc. In addition, the configuration information for a virtual computer network may be specified by a user or other entity in various manners in various embodiments, such as by an executing program of the user or other entity that interacts with an API ("application programming interface") provided by the CNS system for that purpose and/or by a user that interactively uses a GUI ("graphical user interface") provided by the CNS system for that purpose.

FIG. 1A is a network diagram illustrating an example of a network-accessible service that provides client-configurable managed computer networks to clients. In particular, in this example, at least some of the managed computer networks may be virtual computer networks, such as virtual computer networks that are created and configured as network extensions to existing remote private computer networks of clients, although in other embodiments the managed computer networks may have other forms and/or be provided in other manners. After configuring such a managed computer network being provided by the network-accessible service, a user or other client of the network-accessible service may interact from one or more remote locations with the provided computer network, such as to execute programs on the computing nodes of the provided computer network, to dynamically modify the provided computer network while it is in use, etc.

In particular, in the illustrated example of FIG. 1A, a configurable network service ("CNS") 105 is available that provides functionality to clients (not shown) over one or more public networks 100 (e.g., over the Internet) to enable the clients to access and use managed computer networks provided to the clients by the CNS 105, including to enable the remote clients to dynamically modify and extend the capabilities of their remote existing private computer networks using cloud computing techniques over the public network 100. In the example of FIG. 1A, a number of clients interact over the public network 100 with a system manager module 110 of the CNS 105 to create and configure various managed computer networks 120 being provided by the CNS 105, with at least some of the provided computer networks 120 optionally being private computer network extensions to remote existing client private networks 130 or otherwise connected to one or more such remote existing client private networks 130, and with at least some such of those provided computer network extensions 120 being configured to enable access from one or more corresponding client private networks 130 over the public network 100 (e.g., private access via VPN connections established over interconnections 100a and 100b, or access via other types of private or non-private interconnections). In this example embodiment, the system manager module 110 assists in providing functionality of the CNS 105 to the remote clients, such as in conjunction with various optional other modules 115 of the CNS 105 (e.g., various communication manager modules, edge modules, etc.), in conjunction with various optional computing nodes 125 and/or networking devices 195 (e.g., substrate network router devices, edge devices, etc.) that are used by the CNS 105 to provide the managed computer networks 120. In at least some embodiments, the CNS system manager module 110 may execute on one or more computing systems (not shown) of the CNS 105, and may provide one or more APIs that enable remote computing systems to programmatically interact with the module 110 to access some or all functionality of the CNS 105 on behalf of clients (e.g., to create, configure, and/or initiate use of managed computer networks 120). In addition, in at least some embodiments, clients may instead manually interact with the module 110 (e.g., via a GUI provided by the module 110) to perform some or all such actions.

The public network 100 in FIG. 1A may be, for example, a publicly accessible network of linked networks, possibly operated by distinct parties, such as the Internet. The remote client private networks 130 may each include one or more existing private networks, such as a corporate or other private network (e.g., home, university, etc.) that is partially or wholly inaccessible to non-privileged users, and that includes computing systems and/or other networked devices (not shown) of a client. In the illustrated example, the provided computer networks 120 each include multiple computing nodes (not shown), at least some of which may be from the plurality of optional computing nodes 125 provided by or otherwise under the control of the CNS 105, while in other embodiments at least some other computing systems 135 may be used to provide some or all computing nodes for one or more of the provided computer networks 120—such other computing systems 135 may, for example, be provided by or under control of the client for whom a computer network 120 that uses those other computing systems 135 is provided, or may be computing systems that are provided by third parties (e.g., for a fee). In addition, one or more of the provided computer networks 120 may each include one or more external nodes that are integrated into the provided computer network, such as an external node that is one of the other computing systems 135 (e.g., operated under control of an entity other than a provider or operator of the configurable network service, such as a client to whom the computer network 120 is provided or instead a third-party to the client and the configurable network service provider) or that is located within one of the private networks 130 for the client to whom the computer network 120 is provided (e.g., operated under control of the client). Each of the provided computer networks 120 may be configured in various ways by the clients for whom they are provided, and may each be a private computer network that is accessible only by the client that creates it, although in other embodiments at least some computer networks provided by the CNS 105 for clients may be publicly accessible. Similarly, while at least some of the provided computer networks 120 in the example may be extensions to or otherwise connected with remote client computer networks 130 that are private networks, in other embodiments the provided computer networks 120 may be standalone computer networks that are not connected to other existing computer networks 130 and/or may be extensions to or otherwise connected with other client computer networks 130 that are not private networks.

Private access between a remote client private computer network 130 and a corresponding private computer network 120 provided for a client may be enabled in various ways, such as by establishing a VPN connection or other private connection between them that allows intercommunication over the public network 100 in a private manner. For example, the CNS 105 may automatically perform appropriate configuration on its computing nodes and other networking devices to enable VPN access to a particular private network 120 of a client, such as by automatically configuring one or more VPN mechanisms hosted by the CNS 105 (e.g., software and/or hardware VPN mechanisms), and/or may automatically provide appropriate configuration information to the client (e.g., credentials, access points, and/or other parameters) to allow a VPN mechanism hosted on the remote client private network 130 (e.g., a software VPN endpoint that is provided by one of the multiple computing nodes of the provided network 120) to establish the VPN access. After VPN access has been appropriately enabled and/or configured, a VPN connection may be established between the remote client private network 130 and the provided private computer network 120, such as initiated by the client using IPsec ("Internet Protocol Security"), or instead a VPN connection or other private connection may be established to or between networks that use MPLS ("Multi Protocol Label Switching") for data transmission or other appropriate communication technologies. In addition, in the illustrated example, various network-accessible remote resource services 140 may optionally be available to remote computing systems over the public network 100, including to computing nodes on the remote client private networks 130. The resource services 140 may provide various functionality to the remote computing nodes, such as for at least some of the resource services 140 to provide remote computing nodes with access to various types of network-accessible computing-related resources (e.g., long-term storage capabilities, such as block storage that is mountable by particular computing nodes of the provided computer networks 120, or storage that is otherwise accessible from particular computing nodes of the provided computer networks 120 using API calls). Furthermore, at least some of the computer networks 120 that are provided by the CNS 105 may be configured to provide access to at least some of the remote resource services 140, with that provided access optionally appearing to computing nodes of the provided computer networks 120 as being locally provided via virtual connections 117 that are part of the provided computer networks 120, although the actual communications with the remote resource services 140 may occur over the public networks 100 (e.g., via interconnections 100b and 100c). In addition, in at least some embodiments, multiple distinct provided computer networks 120 may be configured to enable inter-access with each other.

The provided computer networks 120 may each be configured by clients in various manners. For example, in at least some embodiments, the CNS 105 provides various computing nodes 125 that are available for use with computer networks provided to clients, such that each provided computer network 120 may include a client-configured quantity of multiple such computing nodes that are dedicated for use as part of that provided computer network. In particular, a client may interact with the module 110 to configure a quantity of computing nodes to initially be included in a computer network provided for the client (e.g., via one or more programmatic interactions with an API provided by the CNS 105). In addition, the CNS 105 may provide multiple different types of computing nodes in at least some embodiments, such as, for example, computing nodes with various performance characteristics (e.g., processor speed, memory available, storage available, etc.) and/or other capabilities. If so, in at least some such embodiments, a client may specify the types of computing nodes to be included in a provided computer network for the client. In addition, in at least some embodiments, a client may interact with the module 110 to configure network addresses for a computer network provided for the client (e.g., via one or more programmatic interactions with an API provided by the CNS 105), and network addresses may later be dynamically added, removed or modified for a provided computer network of a client in at least some such embodiments, such as after the provided computer network has already been in use by the client. Furthermore, in at least some embodiments, a client may interact with the module 110 to configure network topology information for a computer network provided for the client (e.g., via one or more programmatic interactions with an API provided by the CNS 105), including to specify one or more external nodes for the provided computer network, and such network topology information may later be dynamically modified for a provided computer network in at least some such embodiments, such as after the provided computer network has already been in use by the client. Moreover, in at least some embodiments, a client may interact with the module 110 to configure various network access constraint information for a computer network provided for the client (e.g., via one or more programmatic interactions with an API provided by the CNS 105), and such network access constraint information may later be dynamically modified for a provided computer network in at least some such embodiments, such as after the provided computer network has already been in use by the client.

Network addresses may be configured for a provided computer network in various manners in various embodiments. For example, the client may specify one or more address ranges (e.g., a Classless Inter-Domain Routing ("CIDR") address block) or other groups of network addresses for the provided computer network, such that at least some of the specified network addresses are used for the computing nodes of the provided computer network, and with those specified network addresses optionally being a subset of network addresses used by an existing remote client computer network if the provided computer network is configured to be an extension to the remote client computer network. Such configured network addresses may in some situations be virtual or private network addresses that are not directly addressable from computing systems on the public network 100 (e.g., if the existing remote client computer network and the corresponding provided network extension use network address translation techniques and/or virtual networking techniques for the client computer network and its provided network extension), while in other situations at least some of the configured network addresses may be external public network addresses that are directly addressable from computing systems on the public network 100 (e.g., a public network address that is a static Internet-routable IP address or other non-changing network address). In other embodiments, the CNS 105 may automatically select network addresses to be assigned to at least some computing nodes of at least some provided computer networks and/or at least some external nodes of at least some provided computer networks, such as based on network addresses that are available for use by the CNS 105, based on selecting network addresses that are related to network addresses used by remote existing computer networks corresponding to the provided computer networks, etc. Furthermore, if two or more of the computer networks provided by the CNS 105 are configured to enable inter-communications between the provided computer networks (e.g., for two or more computer networks provided to a single customer, such as for different departments or groups within a single organization; for two or more computer networks provided to two or more distinct customers; etc.), the CNS 105 may in some embodiments automatically select network addresses to be used for at least some computing nodes of those provided computer networks to facilitate the inter-communications, such as by using different network addresses for the various provided computer networks. In addition, in at least some embodiments in which the CNS 105 provides virtual networks to clients, such as by using overlay networks on a substrate network, each client may be allowed to specify any network addresses to be used for their provided computer networks, even if multiple clients specify the same or overlapping network addresses for their respective provided computer networks—in such embodiments, the CNS 105 manages the network addresses distinctly for each client, such that a first client may have a first computing node associated with a particular specified network address for the first client's provided computer network, while a distinct second client may have a distinct second computing node associated with the same particular specified network address for the second client's provided computer network. Once network addresses are configured or otherwise determined for a provided computer network, the CNS 105 may assign the network addresses to various of the computing nodes selected for the provided computer network, such as in a random manner, by using DHCP ("Dynamic Host Configuration Protocol") or other techniques for dynamic assignment of network addresses, etc.

Network topology information may be configured for a provided computer network in various manners in various embodiments. For example, a client may specify particular types of networking devices (e.g., routers, switches, etc.) and/or other network devices or nodes (e.g., load balancers, firewalls, proxies, network storage devices, printers, etc.) to be part of the provided computer network, and may specify interconnectivity information between networking devices and computing nodes. Furthermore, in at least some embodiments, the CNS 105 may provide available computing nodes in multiple geographical locations (e.g., in multiple geographically distributed data centers), and the configuration information specified by a client for a provided computer network may further indicate one or more geographical locations in which computing nodes of the provided computer network are to be located (e.g., to provide fault tolerance among the computing nodes of a provided computer network by having them located in multiple geographical locations), and/or may otherwise provide information about preferences or requirements of how the computing nodes of the provided computer network are to interoperate that is used by the CNS 105 to select one or more such geographical locations (e.g., minimum or maximum network latency or bandwidth for computing node intercommunications; minimum or maximum network proximity between computing nodes; minimum or maximum geographic proximity between computing nodes; having local access to particular resources or functionality that is not available in all such geographic locations; having specified locations relative to other external computing systems, such as to a remote computer network of the client and/or to a remote resource service; constraints or other preferences based on the cost of obtaining use of particular computing nodes and/or for particular types of interactions with particular computing nodes, such as costs associated with providing data to and/or from those computing nodes; etc.). As discussed in greater detail elsewhere, in at least some embodiments, the interconnections and intercommunications between computing nodes of a provided computer network are managed using an underlying substrate network (not shown) of the CNS 105, and if so, some or all of the configured network topology information may be simulated or otherwise emulated in at least some such embodiments using the underlying substrate network and corresponding modules of the CNS 105. For example, each of the computing nodes provided by the CNS 105 may be associated with a node communication manager module of the CNS 105 that manages communications to and from its associated computing node(s), and if so, the associated communication manager module for a computing node may take various actions to emulate desired functionality of a network with respect to that computing node, as discussed in greater detail elsewhere. Similarly, one or more external nodes may be specified for a particular provided virtual computer network, and each of the external nodes may be associated with an edge module of the CNS 105 that manages communications to and from its associated external node(s), and if so, the associated edge module for an external node may take various actions to emulate desired functionality of a network with respect to that external node, as discussed in greater detail elsewhere.

Network access constraint information may also be configured for a provided computer network in various manners in various embodiments. For example, a client may specify information about whether and how some or all of the computing nodes of a provided computer network are allowed to communicate with other computing nodes of the provided computer network and/or with other computing systems external to the provided computer network, such as based on one or more of the following: directions of communications (incoming versus outgoing); types of communications (e.g., based on the types of content included and/or the types of communication protocols used, such as to allow HTTP requests for text but not images and to not allow FTP requests); locations of other computing systems (e.g., whether part of the provided computer network, part of a remote client computer network corresponding to the provided computer network, part of a remote resource service to which access has been established, external to the provided computer network and any corresponding remote client computer network, etc.); types of other computing systems; etc. In a manner similar to that for network topology information, the CNS 105 may enforce network access constraint information for provided computer networks in various manners.

Thus, managed computer networks may be provided for clients in various manners in various embodiments, and may be configured to have various types of functionality in various embodiments.

In addition, in at least some embodiments, the computing nodes of the managed computer networks may be physical computing systems and/or may be virtual machines that are each hosted on one or more physical computing systems, and the communications that are handled for managed computer networks may include transmissions of data (e.g., messages, packets, frames, streams, etc.) in various formats. As previously noted, some or all computing nodes used for a particular provided overlay virtual computer network may in some embodiments be provided by the CNS system for use by users, while in other embodiments some or all such computing nodes may instead be provided by a user who uses those computing nodes. Similarly, external nodes may have various forms, and be provided by the CNS system or by other entities that are unrelated to the operator of the CNS system in various embodiments. Furthermore, in at least some situations, an embodiment of the CNS system may be part of or otherwise affiliated with a program execution service (or "PES") that executes multiple programs on behalf of multiple customers or other users of the service, such as a program execution service that uses multiple computing systems on multiple physical networks (e.g., multiple physical computing systems and networks within a data center). In at least some such embodiments, virtual computer networks to which computing nodes belong may be selected based on associated users, such as based on the computing nodes executing programs on behalf of a user or other entity.

As previously noted, a virtual computer network may in some embodiments be provided as an overlay network that uses one or more intermediate physical networks as a substrate network, and one or more such overlay virtual computer networks may be implemented over the substrate network in various ways in various embodiments. For example, in at least some embodiments, communications between nodes of an overlay virtual computer network are managed by encoding and sending those communications over the substrate network without encapsulating the communications, such as by embedding virtual network address information for a computing node of the virtual computer network (e.g., the destination computing node's virtual network address) in a larger physical network address space used for a networking protocol of the one or more intermediate physical networks, while in other embodiments the communications are encoded in other manners (e.g., by storing virtual network address information from the pre-encoded communication in one or more header fields of the encoded communication or otherwise in a manner associated with the encoded communications, such as if the overlay virtual computer network and underlying substrate network use the same networking protocol). As one illustrative example, a virtual computer network may be implemented using 32-bit IPv4 network addresses, and those 32-bit virtual network addresses may be embedded as part of 128-bit IPv6 network addresses used by the one or more intermediate physical networks, such as by reheadering communication packets or other data transmissions (e.g., using Stateless IP/ICMP Translation, or SIIT), or otherwise modifying such data transmissions to translate them from a first networking protocol for which they are configured to a distinct second networking protocol. As another illustrative example, both the virtual computer network and substrate computer network may be implemented using the same network addressing protocol (e.g., IPv4 or IPv6), and data transmissions sent via the provided overlay virtual computer network using virtual network addresses may be modified to use different physical network addresses corresponding to the substrate network while the transmissions are sent over the substrate network, but with the original virtual network addresses being stored in the modified data transmissions or otherwise tracked so that the data transmissions may be restored to their original form when they exit the substrate network. In other embodiments, at least some of the overlay computer networks may be implemented using encapsulation of communications. Additional details related to SIIT are available at "Request For Comments 2765—Stateless IP/ICMP Translation Algorithm", February 2000, Internet Engineering Task Force ("IETF"), which is hereby incorporated by reference in its entirety. This document is also available at the time of filing at tools<dot>ietf<dot>org<slash>html<slash>rfc2765 (where <dot> and <slash> are replaced by the corresponding characters with those names, "." and "/", respectively).

Furthermore, in addition to managing configured network topologies for provided virtual computer networks, the CNS system may use the described techniques to provide various other benefits in various situations, such as limiting communications to and/or from computing nodes of a particular virtual computer network to other computing nodes that belong to that virtual computer network. In this manner, computing nodes that belong to multiple virtual computer networks may share parts of one or more intermediate physical networks, while still maintaining network isolation for computing nodes of a particular virtual computer network. In addition, the use of the described techniques also allows computing nodes to easily be added to and/or removed from a virtual computer network, such as to allow a user to dynamically modify the size of a virtual computer network (e.g., to dynamically modify the quantity of computing nodes to reflect an amount of current need for more or less computing resources). Furthermore, the use of the described techniques also supports changes to an underlying substrate network—for example, if the underlying substrate network is expanded to include additional computing nodes at additional geographical locations, existing or new virtual computer networks being provided may seamlessly use those additional computing nodes, since the underlying substrate network will route communications to and from the substrate network addresses for those additional computing nodes in the same manner as for other previously existing substrate network computing nodes. In at least some embodiments, the underlying substrate network may be of any size (e.g., spanning multiple countries or continents), without regard to network latency between computing nodes at different locations.

At least some such benefits may similarly apply for logical sub-networks (or "subnets") that are specified for such a particular provided virtual computer network, with the substrate network functionality used to emulate various functionality corresponding to the specified logical subnets. For example, the use of the underlying substrate network may enable different computing nodes assigned to a particular logical subnet to be located at any position within the substrate network, with the substrate network forwarding communications to destination computing nodes based on those destination computing nodes' substrate network addresses. As such, the substrate network may support specified logical subnets or other configured network topology for a managed computer network, without any configuration for or other use of information about such specified logical subnets, and with the CNS system modules (e.g., communication manager modules) instead managing the corresponding functionality from the logical edges of the substrate network where the CNS system modules connect to the substrate network.

For illustrative purposes, some embodiments are described below in which specific types of computing nodes, networks, communications, network topologies, and configuration operations are performed. These examples are provided for illustrative purposes and are simplified for the sake of brevity, and the inventive techniques may be used in a wide variety of other situations, some of which are discussed below.

FIG. 1B is a network diagram illustrating an example embodiment of configuring and managing communications between computing nodes belonging to a virtual computer network, by overlaying the virtual computer network and the communications on one or more intermediate physical networks in a manner transparent to the computing nodes of the virtual computer network. In this example, the configuring and managing of the communications is facilitated by a system manager module, multiple communication manager modules, and one or more edge modules of an example embodiment of the CNS system. The example CNS system may be used, for example, in conjunction with a publicly accessible program execution service (not shown), or instead may be used in other situations, such as with any use of virtual computer networks on behalf of one or more entities (e.g., to support multiple virtual computer networks for different parts of a business or other organization on a private network of the organization).

The illustrated example includes an example data center 190 with multiple physical computing systems operated on behalf of the CNS system. The example data center 190 is connected via one or more edge devices 108 to an internet 185 external to the data center 190, which provides access to one or more computing systems 145*a* and possible external nodes 175 located within private network 165, to one or more other globally accessible data centers 160 that each have multiple computing systems (not shown) and may include possible external nodes (not shown), and to one or more other computing systems 145*b* that may also be possible external nodes. Some or all of the edge devices 108 may be configured to operate as or otherwise implement one or more edge modules to manage external nodes. The internet 185 may be, for example, a publicly accessible network of networks (possibly operated by various distinct parties), such as the Internet, and the private network 165 may be, for example, a corporate network that is wholly or partially inaccessible from computing systems external to the private network 165. Computing systems 145*b* may be, for example, home computing systems or mobile computing devices that each connects directly to the Internet (e.g., via a telephone line, cable modem, a Digital Subscriber Line ("DSL"), cellular network or other wireless connection, etc.).

The example data center 190 includes a number of physical computing systems 106*a*-106*d* and 155*a*-155*n*, as well as a Communication Manager module 150 that executes on one or more other computing systems or devices (not shown) to manage communications for the associated computing systems 155*a*-155*n*, and a System Manager module 110 that executes on one or more computing systems (not shown). In this example, each physical computing system 106*a*-106*d* hosts multiple virtual machine computing nodes and includes an associated virtual machine ("VM") communication manager module (e.g., as part of a virtual machine hypervisor monitor for the physical computing system), such as VM Communication Manager module 109*a* and multiple virtual machines 107*a* on host computing system 106*a*, and such as VM Communication Manager module 109*d* and multiple virtual machines 107*d* on host computing system 106*d*. Physical computing systems 155*a*-155*n* do not execute any virtual machines in this example, and thus may each act as a computing node that directly executes one or more software programs on behalf of a user. The Communication Manager module 150 that manages communications for the associated computing systems 155*a*-155*n* may be implemented as part of various types of devices separate from the physical computing systems 155*a*-155*n*, such as, for example, a proxy computing device, a firewall device, or a networking device (e.g., a switch, router, hub, etc.) through which communications to and from the physical computing systems travel. In other embodiments, all or none of the physical computing systems at the data center may host virtual machines.

This example data center 190 further includes multiple physical networking devices, such as switches 119*a*-119*b*, edge router devices 127a-127c, and core router devices 132a-132c. Switch 119a is part of a physical sub-network that includes physical computing systems 106a-106c, and is connected to edge router 127a. Switch 119b is part of a distinct physical sub-network that includes physical computing systems 106d and 155a-155n, as well as the computing systems providing the Communication Manager module 150 and the System Manager module 110, and is connected to edge router 127b. The physical sub-networks established by switches 119a-119b, in turn, are connected to each other and other networks (e.g., the internet 185) via an intermediate interconnection network 122, which includes the edge routers 127a-127c and the core routers 132a-132c. The edge routers 127a-127c provide gateways between two or more physical sub-networks or networks. For example, edge router 127a provides a gateway between the physical sub-network established by switch 119a and the interconnection network 122, while edge router 127c provides a gateway between the interconnection network 122 and internet 185 (e.g., via the edge devices 108). The core routers 132a-132c manage communications within the interconnection network 122, such as by routing or otherwise forwarding packets or other data transmissions as appropriate based on characteristics of such data transmissions (e.g., header information including source and/or destination addresses, protocol identifiers, etc.) and/or the characteristics of the interconnection network 122 itself (e.g., routes based on the physical network topology, etc.). In addition, the edge devices 108 may further manage communications between computing nodes at the data center 190 and other external computer systems that are not external nodes integrated into one or more virtual computer networks overlaid on the substrate interconnection network 122 (e.g., external computing systems 145a, external computing systems 145b, computing systems at other external data centers 160, etc.).

The illustrated System Manager module, Communication Manager modules, and edge modules may perform at least some of the described techniques in order to configure, authorize and otherwise manage communications sent to and from associated computing nodes, including to support providing various virtual networking functionality for one or more virtual computer networks that are provided using various of the computing nodes, and/or to support providing various emulated functionality for one or more virtual networking devices that are configured for one or more such provided virtual computer networks. For example, Communication Manager module 109a manages associated virtual machine computing nodes 107a, Communication Manager module 109d manages associated virtual machine computing nodes 107d, and each of the other Communication Manager modules may similarly manage communications for a group of one or more other associated computing nodes. The illustrated Communication Manager modules may configure communications between computing nodes so as to overlay one or more particular virtual networks over one or more intermediate physical networks that are used as a substrate network, such as over the interconnection network 122. Furthermore, a particular virtual computer network may optionally be extended beyond the data center 190 in some embodiments by using the edge modules to assist in integrating one or more external nodes outside of the data center 190 into the virtual computer network. In other embodiments, a particular virtual computer network may optionally be extended beyond the data center 190 in other manners, such as if one or more other data centers 160 also provide computing nodes that are available for use by the example CNS system, and the particular virtual network includes computing nodes at two or more such data centers at two or more distinct geographical locations. Multiple such data centers or other geographical locations of one or more computing nodes may be inter-connected in various manners, including the following: directly via one or more public networks in a non-private manner, or via a private connection, not shown (e.g., a dedicated physical connection that is not shared with any third parties, such as a leased line or other direct circuit; or a VPN or other mechanism that provides the private connection over a public network); etc. In addition, while not illustrated here, other such data centers or other geographical locations may each include one or more other Communication Manager modules that manage communications for computing systems at that data center or other geographical location, as well as over the global internet 135 to the data center 100 and any other such data centers 160.

In addition, a particular virtual computer network may optionally be extended beyond the data center 190 in other manners in other embodiments, such as if one or more other Communication Manager modules at the data center 100 are placed between edge router 127c and the global internet 135 (e.g., if the edge devices 108 each provide at least some of the functionality of a Communication Manager module in encoding and decoding communications for virtual computer networks to use the underlying substrate network 122), or instead based on one or more other Communication Manager modules external to the data center 190 (e.g., if another Communication Manager module, not shown, is made part of private network 165, so as to manage communications for computing systems 145a over the internet 185 and private network 165; etc.). Thus, for example, if an organization operating private network 165 desires to virtually extend its private computer network 165 to one or more of the computing nodes of the data center 190, it may do so by implementing one or more Communication Manager modules as part of the private network 165 (e.g., as part of the interface between the private network 165 and the internet 185)—in this manner, computing systems 145a within the private network 165 may communicate with those data center computing nodes as if those data center computing nodes were part of the private network. In other embodiments, the private computer network 165 may instead be extended to one or more computing nodes of the data center 190 by the edge device 108 of the data center 190 managing the communications between computing nodes of the private network 165 and particular data center 190 computing nodes.

Thus, as one illustrative example, one of the virtual machine computing nodes 107a on computing system 106a (in this example, virtual machine computing node 107a1) may be part of the same provided virtual computer network as one of the virtual machine computing nodes 107d on computing system 106d (in this example, virtual machine computing node 107d1), and may further both be assigned to a specified logical subnet of that virtual computer network that includes a subset of the computing nodes for that virtual computer network, such as with the IPv4 networking protocol being used to represent the virtual network addresses for the virtual computer network. The virtual machine 107a1 may then direct an outgoing communication (not shown) to the destination virtual machine computing node 107d1, such as by specifying a virtual network address for that destination virtual machine computing node (e.g., a virtual network address that is unique for the local broadcast domain of the specified logical subnet). The Communication Manager module 109a receives the outgoing communication, and in at least some embodiments determines whether to authorize the sending of the outgoing communication, such as based on previously obtained information about the sending virtual machine computing node 107*a*1 and/or about the destination virtual machine computing node 107*d*1 (e.g., information about virtual computer networks and/or entities with which the computing nodes are associated, information about any specified logical subnets to which the computing nodes belong, etc.), and/or by dynamically interacting with the System Manager module 110 (e.g., to obtain an authorization determination, to obtain some or all such information, etc.). By not delivering unauthorized communications to computing nodes, network isolation and security of entities' virtual computer networks is enhanced.

Figure 2A:
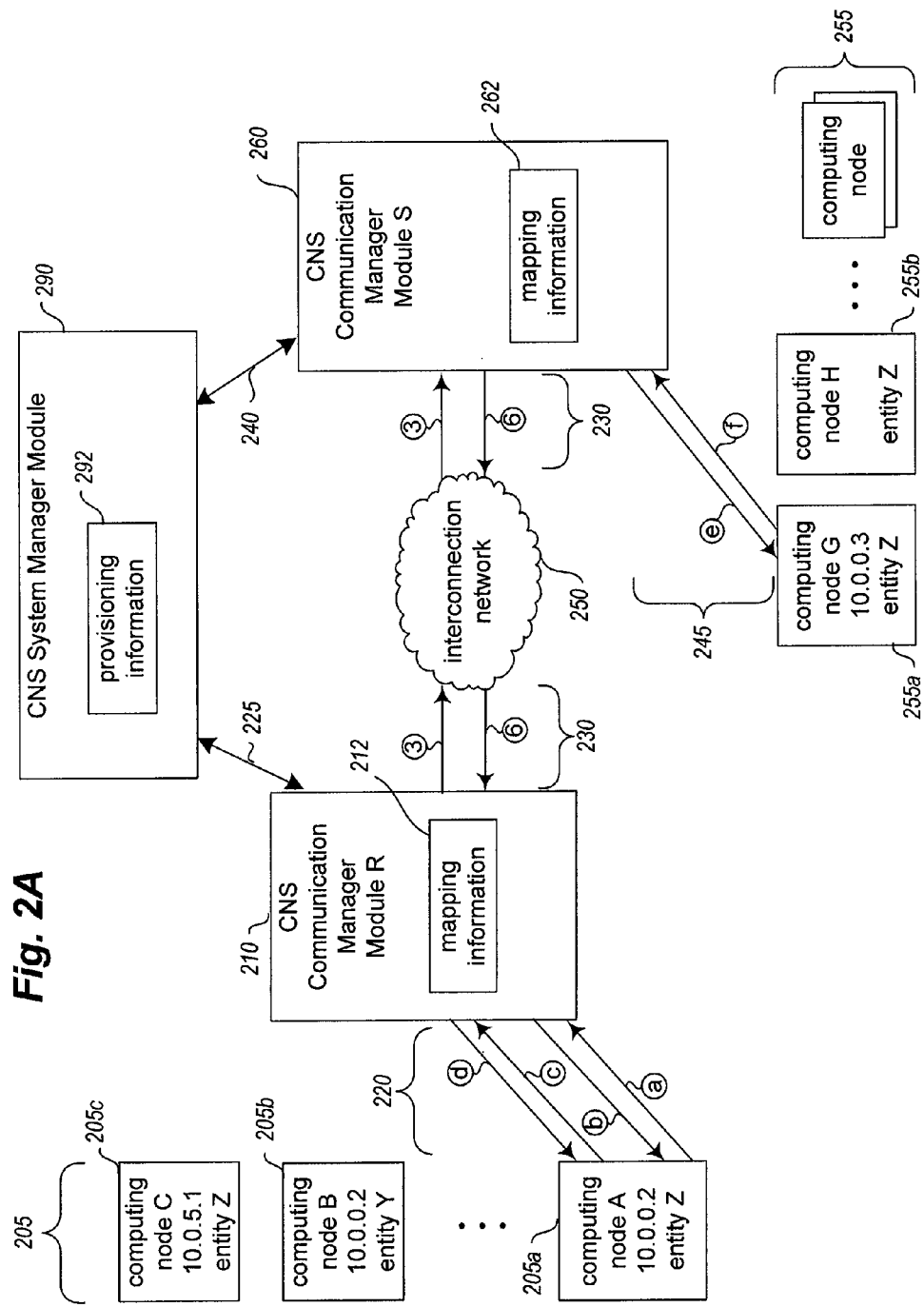
Figure 2B:
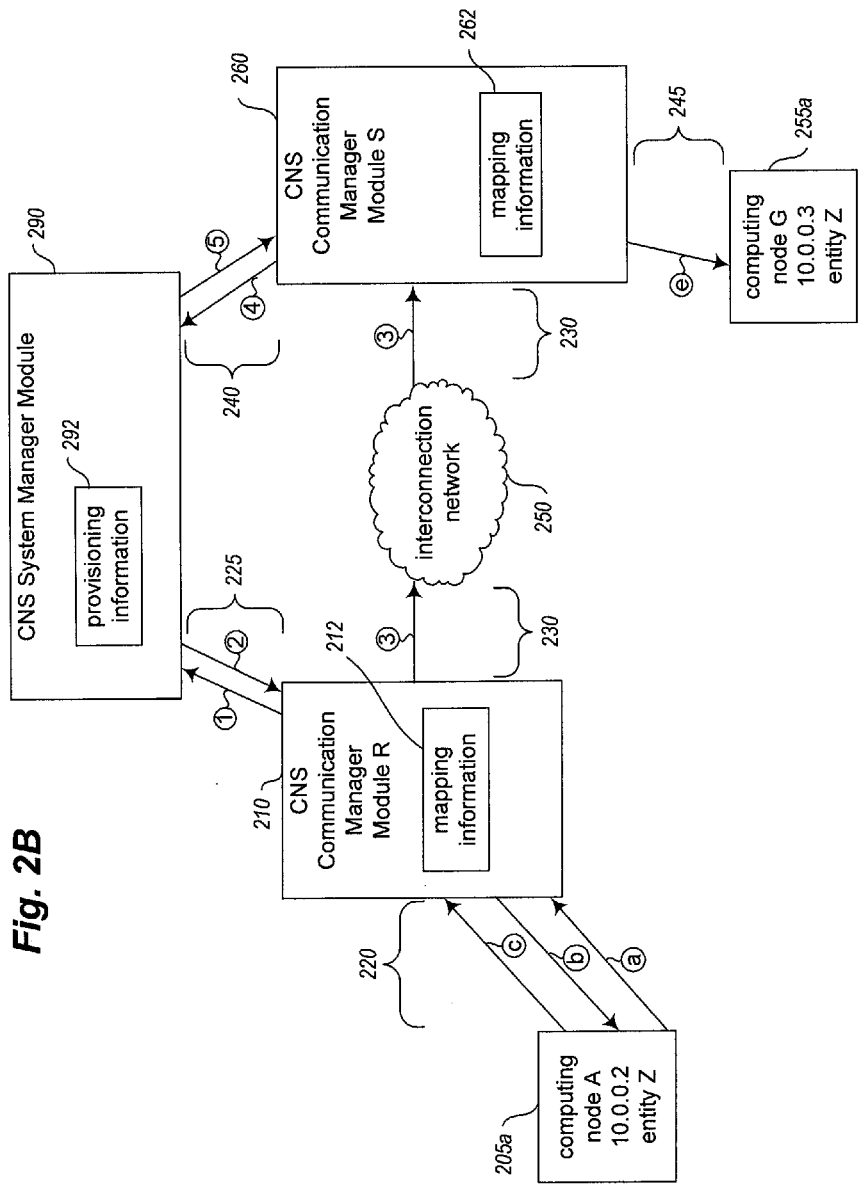

If the Communication Manager module 109*a* determines that the outgoing communication is authorized (or does not perform such an authorization determination), the module 109*a* determines the actual physical network location corresponding to the destination virtual network address for the communication. For example, the Communication Manager module 109*a* may determine the actual destination network address to use for the virtual network address of the destination virtual machine 107*d*1 by dynamically interacting with the System Manager module 110, or may have previously determined and stored that information (e.g., in response to a request from the sending virtual machine 107*a*1 for information about that destination virtual network address, such as a request that the virtual machine 107*a*1 specifies using Address Resolution Protocol, or ARP). The Communication Manager module 109*a* then re-headers or otherwise modifies the outgoing communication so that it is directed to Communication Manager module 109*d* using an actual substrate network address, such as if Communication Manager module 109*d* is associated with a range of multiple such actual substrate network addresses. FIGS. 2A-2B provide examples of doing such communication management in some embodiments.

When Communication Manager module 109*d* receives the communication via the interconnection network 122 in this example, it obtains the virtual destination network address for the communication (e.g., by extracting the virtual destination network address from the communication), and determines to which of the virtual machine computing nodes 107*d* managed by the Communication Manager module 109*d* that the communication is directed. The Communication Manager module 109*d* next determines whether the communication is authorized for the destination virtual machine computing node 107*d*1, with examples of such authorization activities discussed in further detail in the examples of FIGS. 2A-2B. If the communication is determined to be authorized (or the Communication Manager module 109*d* does not perform such an authorization determination), the Communication Manager module 109*d* then re-headers or otherwise modifies the incoming communication so that it is directed to the destination virtual machine computing node 107*d*1 using an appropriate virtual network address for the virtual computer network, such as by using the sending virtual machine computing node 107*a*1's virtual network address as the source network address and by using the destination virtual machine computing node 107*d*1's virtual network address as the destination network address. The Communication Manager module 109*d* then forwards or otherwise provides the modified communication to the destination virtual machine computing node 107*d*1, such as via shared memory (not shown) of the computing system 106*d* that is used to provide a logical network interface for the destination virtual machine computing node 107*d*1. In at least some embodiments, before forwarding the incoming communication to the destination virtual machine, the Communication Manager module 109*d* may also perform additional steps related to security, as discussed in greater detail elsewhere.

In addition, while not illustrated in FIG. 1B, in some embodiments the various Communication Manager modules may take further actions to provide virtual networking functionality corresponding to a specified network topology for the provided virtual computer network (e.g., for one or more virtual networking devices for the provided virtual computer network), such as by managing communications between computing nodes of the provided virtual computer network in specified manners and by responding to other types of requests sent by computing nodes of the virtual computer network. For example, although being separated from computing node 107*a*1 on physical computing system 106*a* by the interconnection network 122 in the example embodiment of FIG. 1B, virtual machine computing node 107*d*1 on physical computing system 106*d* may be configured to be part of the same logical sub-network of the virtual computer network as computing node 107*a*1 (e.g., to not be separated by any logical router devices specified for the provided virtual computer network). Conversely, despite the physical proximity of virtual machine computing node 107*c*1 on physical computing system 106*c* to virtual machine computing node 107*a*1 on physical computing system 106*a* (i.e., being part of the same physical sub-network without any intervening physical substrate router devices) in the example embodiment of FIG. 1B, computing node 107*c*1 may be configured to be part of a distinct logical sub-network of the virtual computer network from that of computing node 107*a*1 (e.g., may be configured to be separated by one or more specified router devices of the provided virtual computer network, not shown, which in this example are virtual router devices that are not physically provided for the virtual computer network). If computing nodes 107*a*1 and 107*d*1 are configured to be part of the same logical sub-network, the previous example of sending a communication from computing node 107*a*1 to computing node 107*d*1 may be performed in the manner previously described, without emulating the actions of any intervening virtual router devices (despite the use of multiple physical router devices in the substrate interconnection network 122 for forwarding the communication), since computing nodes 107*a*1 and 107*d*1 are configured to be part of single sub-network in the specified network topology.

However, if computing node 107*a*1 sends an additional communication to computing node 107*c*1, the Communication Manager modules 109*a* and/or 109*c* on the host computing systems 106*a* and 106*c* may perform additional actions that correspond to one or more virtual specified router devices configured in the specified network topology for the provided virtual computer network to separate the computing nodes 107*a*1 and 107*c*1. For example, the source computing node 107*a*1 may send the additional communication in such a manner as to initially direct it to a first of the virtual specified router devices that is configured to be local to computing node 107*a*1 (e.g., by including a virtual hardware address in the header of the additional communication that corresponds to that first virtual specified router device), with that first virtual specified router device being expected to forward the additional communication on toward the destination computing node 107*c*1 via the specified logical network topology. If so, the source Communication Manager module 109*a* may detect that forwarding of the additional communication to the virtual first router device (e.g., based on the virtual hardware address used in the header of the additional communication), or otherwise be aware of the configured network topology for the virtual computer network, and may take actions to emulate functionality of some or all of the virtual specified router devices that are configured in the specified network topology to separate the computing nodes 107a1 and 107c1. For example, each virtual router device that forwards the additional communication may be expected to take actions such as modifying a TTL ("time to live") hop value for the communication, modify a virtual destination hardware address that is specified for the communication to indicate the next intended destination of the additional communication on a route to the destination computing node, and/or otherwise modify the communication header. If so, the source Communication Manager module 109a may perform some or all of those actions before forwarding the additional communication directly to the destination Communication Manager module 109c over the substrate network (in this case, via physical switch device 119a) for provision to destination computing node 107c1. Alternatively, some or all such additional actions to provide the virtual networking functionality for the sent additional communication may instead be performed by the destination Communication Manager module 109c after the additional communication is forwarded to the Communication Manager module 109c by the Communication Manager module 109a.

Furthermore, as part of the prior continuing example, computing node 107a1 may determine to send a third communication to a final destination computer system external to the data center and the interconnection network 122, such as to a particular external node 175 that is integrated into the computer network to which computing node 107a1 belongs, or such as to a particular computing system 145a (e.g., with the particular computing system 145a not being part of the virtual computer network to which computing node 107a1 belongs). In this situation, the Communication Manager module 109a on the host computing system 106a that is associated with the source computing node 107a1 may further perform additional actions to support the use of an intermediate destination for the communication. If the third communication is being sent to a particular external node 175, the Communication Manager module 109a determines that the external node 175 is associated with one of the edge devices 108, and encodes the outgoing third communication from the source computing node 107a1 for forwarding over the substrate network 122 from the host computing system 106a to that edge device 108. That edge device 108 may be or have an edge module that receives the encoded third communication, decodes the received communication by removing substrate-specific information and/or formatting, determines a particular external network address of the destination external node 175 (e.g., based on a mapping of that external network address to a virtual network address assigned to the destination external node 175), optionally adds network-identifying information to the decoded communication, and forwards the decoded communication over the internet 185 to the destination external node 175. For example, in order to determine how to forward the third communication to the destination external node 175, the edge device edge module 108 may identify the type of encoding to use for that destination external node 175 (e.g., a particular publicly routable external network address associated with the destination external node 175, such as to direct the communication to the edge of the private network 165, and/or various information specific to the private network 165, such as information about a VLAN identifier or MPLS label that the private network 165 uses to represent the managed virtual computer network) and encode the communication accordingly, and may further use a particular external connection (e.g., a VPN connection over the internet 185). By providing virtual networking functionality using the described techniques, the CNS system provides various benefits. For example, because the various Communication Manager modules and edge modules manage the overlay virtual network, specified networking devices and other network topology do not need to be physically implemented for virtual computer networks being provided, and thus corresponding modifications are not needed to the interconnection network 122 to support particular configured network topologies. Nonetheless, if the computing nodes and software programs of a virtual computer network have been configured to expect a particular network topology for the provided virtual computer network, the appearance and functionality of that network topology may nonetheless be transparently provided for those computing nodes by the described techniques. In addition, the use of the described techniques by the CNS system enables external nodes to be integrated into virtual computer networks and used in specified manners, such as to enable the virtual computer network to obtain access to functionality that may not otherwise be available.

Thus, various aspects of providing managed computer networks are described above, as well as elsewhere in this document, including support for virtual computer networks that are overlaid on an underlying substrate network. In addition, in at least some embodiments, the CNS system may use multiple communication manager modules in additional manners, such as to emulate responses to networking requests made by computing nodes in the manner of a local physical networking device, including to respond to ping requests, SNMP ("Simple Network Management Protocol") queries, etc. Furthermore, as described in greater detail below, in at least some embodiments, multiple modules of the CNS system may operate together in a distributed manner to provide a particular type of functionality (e.g., functionality corresponding to a particular logical networking device), such that no single module or physical device is singly responsible for emulating that particular type of functionality, as well as to provide functionality corresponding to integrating external nodes into virtual computer networks.

Figure 2C:
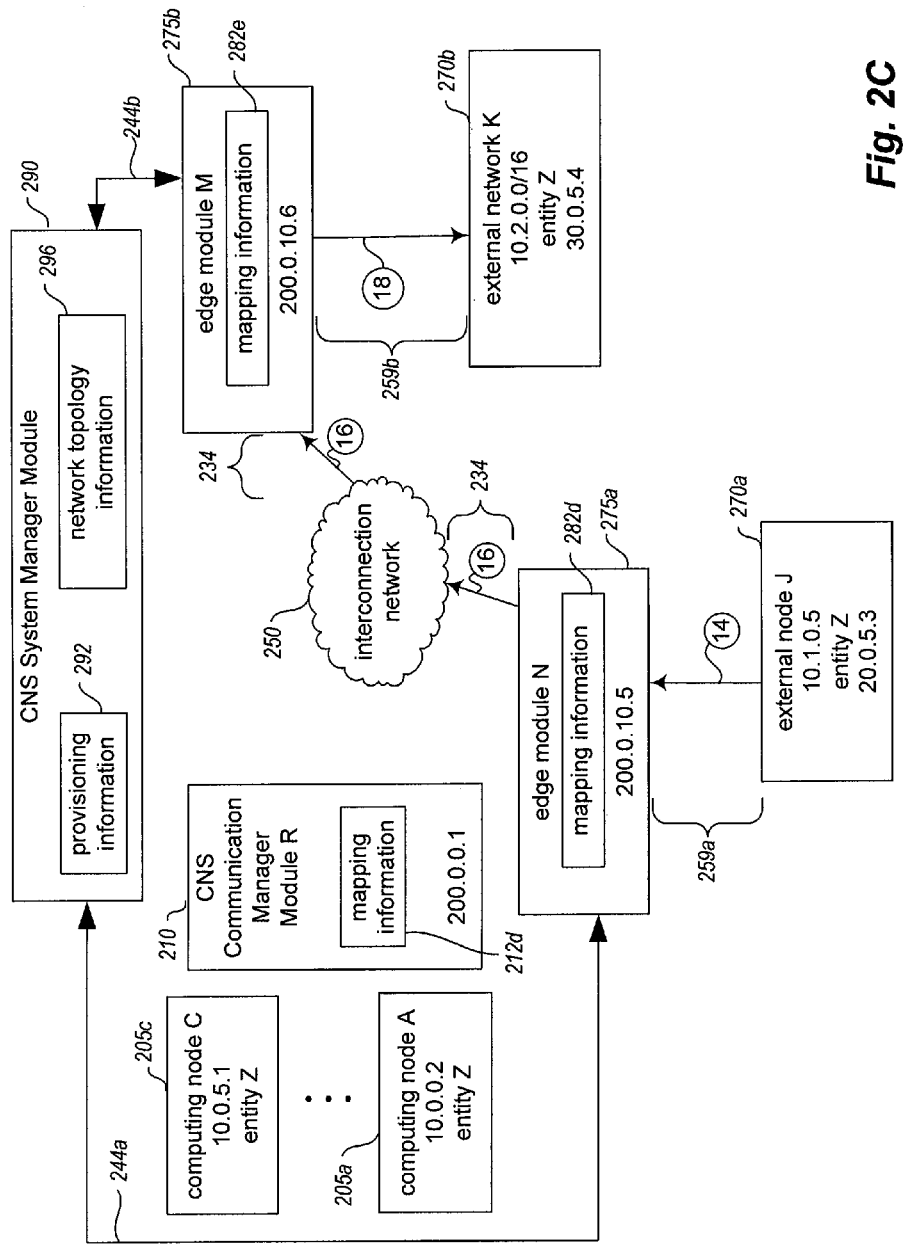
Figure 2E:
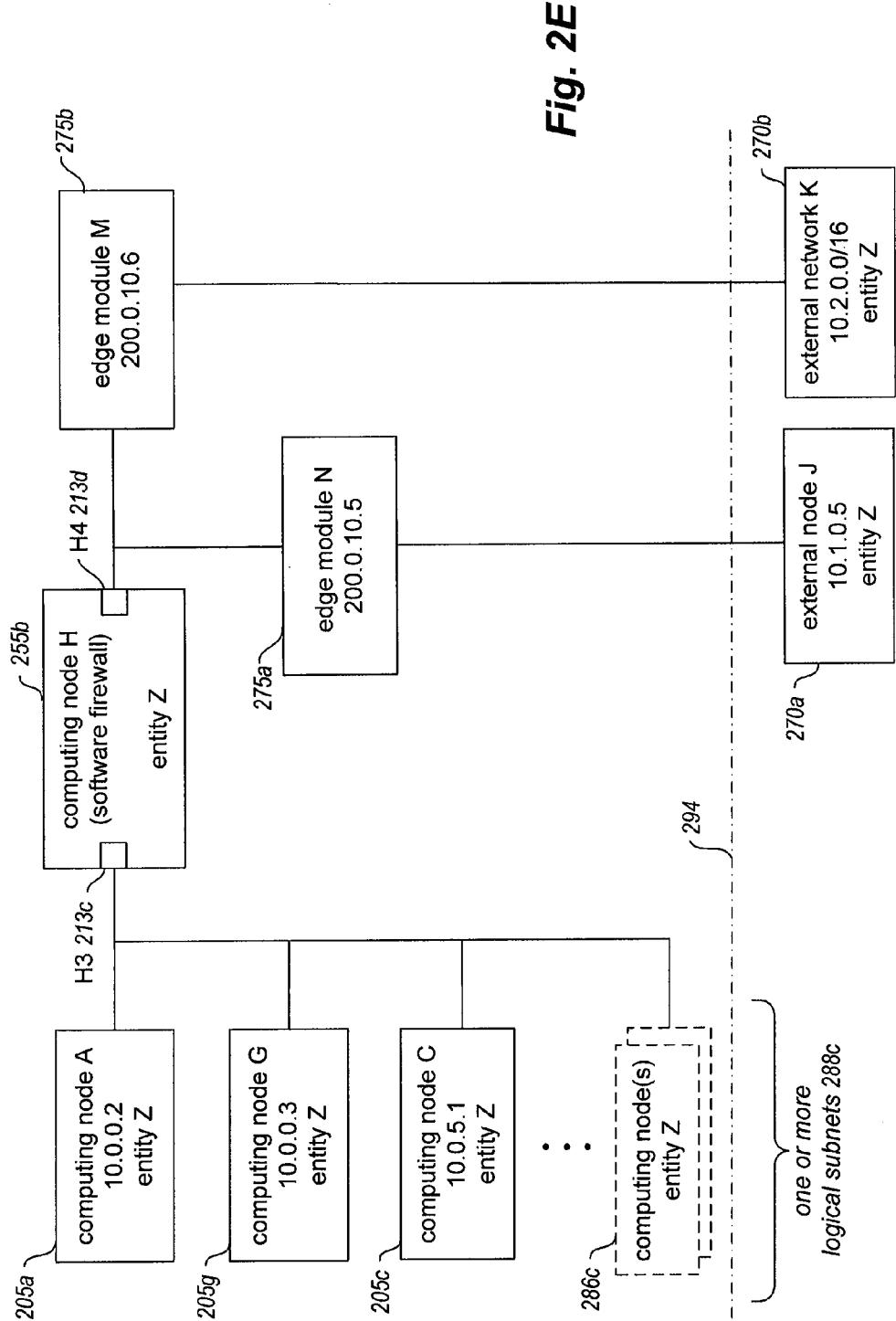

FIGS. 2A-2E illustrate further examples with additional illustrative details related to managing communications involving computing nodes and external nodes that occur via an overlay network over one or more physical networks, such as may be used by the nodes and networks of FIGS. 1A and/or 1B, or in other situations. In these examples, FIGS. 2A and 2B illustrate details regarding actions of various modules of an example CNS system in managing communications for computing nodes of a managed computer network that are sent directly to their final destinations, while FIGS. 2C-2E illustrate additional details regarding managing communications that are sent to final destinations via intermediate edge modules.

In particular, FIG. 2A illustrates various example computing nodes 205 and 255 that may communicate with each other by using one or more intermediate interconnection networks 250 as a substrate network. In this example, IPv4 virtual computer networks are overlaid on an underlying substrate interconnection network 250, with the substrate network being, for example, a distinct IPv4 network or an IPv6 substrate network; although in other embodiments the interconnection network 250 and overlay virtual computer networks may use other networking protocols. In addition, in this example embodiment, the computing nodes are operated on behalf of multiple distinct entities to whom managed computer networks are provided, and a System Manager module 290 manages the association of particular computing nodes with particular entities and managed virtual computer networks, and tracks various configuration information specified for the managed virtual computer networks. The example computing nodes of FIG. 2A include four computing nodes that are executed on behalf of an example entity Z and that are part of a corresponding first managed virtual computer network provided for client entity Z, those being computing nodes 205a, 205c, 255a and 255b. In addition, other computing nodes are operated on behalf of other entities and belong to other provided virtual computer networks, such as computing node 205b that is part of a second managed virtual computer network provided for client entity Y, as well as other computing nodes 255.

In this example, the computing nodes 205 are managed by and physically connected to an associated Communication Manager module R 210, and the computing nodes 255 are managed by and physically connected to an associated Communication Manager module S 260. The CNS Communication Manager modules 210 and 260 are physically connected to an interconnection network 250, as is the System Manager module 290, although the physical interconnections between computing nodes, modules and the interconnection network are not illustrated in this example. As one example, computing nodes 205 may each be one of multiple virtual machines hosted by a single physical computing system, and Communication Manager module R may be part of a hypervisor virtual machine monitor for that physical computing system—if so, communications between the computing nodes 205 and the Communication Manager module R may be passed within that physical computing system without using any intervening computer network, such as via memory of the physical computing system, an internal bus of the physical computing system, etc. For example, with reference to FIG. 1B, computing nodes 205 may represent the virtual machines 107a, and computing nodes 255 may represent the virtual machines 107d. If so, Communication Manager module R would correspond to Communication Manager module 109a of FIG. 1B, Communication Manager module S would correspond to Communication Manager module 109d of FIG. 1B, the interconnection network 250 would correspond to interconnection network 122 of FIG. 1B, and the System Manager module 290 would correspond to System Manager module 110 of FIG. 1B. Alternatively, computing nodes 205 or 255 may instead each be a distinct physical computing system, such as to correspond to computing systems 155a-155n of FIG. 1, or to computing nodes at other data centers or geographical locations (e.g., computing systems at another data center 160, computing systems 145a, etc.).

In this example, each of the Communication Manager modules of FIG. 2A is associated with a group of multiple physical substrate network addresses, which the Communication Manager modules manage on behalf of their associated computing nodes, although in other embodiments each Communication Manager module may instead use a single substrate network address that it shares among two or more associated computing nodes. For example, if the interconnection network 250 is an IPv4 network, Communication Manager module R may be associated with the IPv4 CIDR block 200.0.0.0/29, so as to enable at least some of the IPv4 addresses from 200.0.0.0 to 200.0.0.7 to each be treated as a substrate network address associated with one of the computing nodes, and Communication Manager module S may similarly be associated with the 16 IPv4 network addresses in the IPv4 CIDR block 200.0.10.0/28. Alternatively, if the interconnection network 250 is an IPv6 network, Communication Manager module R may, for example, be associated with the IPv6 network address range of "::0A:01/72", which corresponds to the 128-bit addresses (in hexadecimal) from XXXX:XXXX:XXXX:XXXA:0100:0000:0000:0000 to XXXX:XXXX:XXXX:XXXA: 01FF:FFFF:FFFF:FFFF (representing 2 to the power of 56 unique IPv6 addresses), where each "X" may represent any hexadecimal character that is appropriate for a particular situation—if so, the interconnection network 250 will forward any communication with a destination network address in that range to Communication Manager module R, and with the initial 72 bits of the range specified, the Communication Manager module R may use the remaining available 56 bits to represent the computing nodes that it manages and to determine how to process incoming communications whose destination network addresses are in that range. If the interconnection network 250 is an IPv6 network, the Communication Manager module S may similarly be associated with an IPv6 network address range such as "::0B:02/72".

For purposes of the example shown in FIG. 2A, computing nodes 205a, 205c, 255a, and 255b are part of a single managed virtual computer network provided for entity Z, and computing nodes 205a, 205c and 255a have assigned IPv4 virtual network addresses of "10.0.0.2", "10.0.5.1" and "10.0.0.3", respectively. Because computing node 205b is part of a distinct managed virtual computer network that is provided for entity Y, it can share the same virtual network address as computing node 205a without confusion. In this example, computing node A 205a intends to communicate with computing node G 255a, with the two computing nodes configured in this example to be part of a single common physical local area sub-network (not shown) in a configured network topology for the managed virtual computer network, and the interconnection network 250 and Communication Manager modules are transparent to computing nodes A and G in this example. In particular, despite the physical separation of computing nodes A and G, the Communication Manager modules 210 and 260 operate so as to overlay the managed virtual computer network for entity Z over the physical interconnection network 250 for communications between those computing nodes, including to emulate functionality corresponding to the configured local area sub-network of the managed virtual computer network, so that the lack of an actual local area sub-network is transparent to the computing nodes A and G.

In order to send the communication to computing node G, computing node A exchanges various messages 220 with Communication Manager module R 210, despite in the illustrated embodiment being unaware of the existence of Communication Manager module R (i.e., computing node A may believe that it is transmitting a broadcast message to all other nodes on the local sub-network, such as via a specified switching device that computing node A believes connects the nodes on the local sub-network). In particular, in this example, computing node A first sends an ARP message request 220-a that includes the virtual network address for computing node G (i.e., "10.0.0.3") and that requests the corresponding hardware address for computing node G (e.g., a 48-bit MAC address). Communication Manager module R intercepts the ARP request 220-a, and responds to computing node A with a spoofed ARP response message 220-b that includes a virtual hardware address for computing node G.

To obtain the virtual hardware address for computing node G to use with the response message, the Communication Manager module R first checks a local store 212 of information that maps virtual hardware addresses to corresponding actual physical substrate network addresses, with each of the virtual hardware addresses also corresponding to an IPv4 virtual network address for a particular entity's managed virtual computer network. If the local store 212 does not contain an entry for computing node G (e.g., if none of the computing nodes 205 have previously communicated with computing node G and the System Manager module 290 does not push mapping information to the Communication Manager Module R without request; if a prior entry in local store 212 for computing node G has expired based on an associated expiration time; etc.), the Communication Manager module R interacts 225 with System Manager module 290 to obtain the corresponding actual physical substrate network address for computing node G on behalf of computing node A. In particular, in this example, the System Manager module 290 maintains provisioning information 292 that identifies where each computing node is actually located and to which entity and/or managed virtual computer network the computing node belongs, such as by initiating execution of programs on computing nodes for entities and virtual computer networks or by otherwise obtaining such provisioning information. As discussed in greater detail with respect to FIG. 2B, the System Manager module may determine whether the request from Communication Manager module R on behalf of computing node A for computing node G's actual physical substrate network address is valid, including whether computing node A is authorized to communicate with computing node G (e.g., such as based on being part of the same configured local area sub-network), and if so provides that actual physical substrate network address.

Communication Manager module R receives the actual physical substrate network address for computing node G from the System Manager module 290, and stores this received information as part of an entry for computing node G as part of mapping information 212 for later use (optionally with an expiration time and/or other information). In addition, in this example, Communication Manager module R determines a virtual hardware address to be used for computing node G (e.g., by generating a dummy identifier that is locally unique for the computing nodes managed by Communication Manager module R), stores that virtual hardware address in conjunction with the received actual physical substrate network address as part of the mapping information entry, and provides the virtual hardware address to computing node A as part of response message 220-b. By maintaining such mapping information 212, later communications from computing node A to computing node G may be authorized by Communication Manager module R without further interactions with the System Manager module 290, based on the use of the virtual hardware address previously provided by Communication Manager module R. In some embodiments, the hardware address used by Communication Manager module R for computing node G may not be a dummy address, such as if System Manager module 290 further maintains information about hardware addresses used by the various computing nodes (e.g., virtual hardware addresses assigned to virtual machine computing nodes, actual hardware addresses assigned to computing systems acting as computing nodes, etc.) and provides the hardware address used by computing node G to Communication Manager module R as part of the interactions 225. In such embodiments, the Communication Manager module R may take further actions if computing nodes on different virtual networks use the same virtual hardware address, such as to map each combination of computing node hardware address and managed virtual computer network to a corresponding substrate network address.

In other embodiments, Communication Manager module R may interact with System Manager module 290 to obtain a physical substrate network address for computing node G or otherwise determine such a physical substrate network address at times other than upon receiving an ARP request, such as in response to any received communication that is directed to computing node G using the virtual network address "10.0.0.3" as part of entity Z's virtual computer network, or if the System Manager module provides that information to Communication Manager module R without request (e.g., periodically, upon changes in the information, etc.). Furthermore, in other embodiments, the virtual hardware addresses that are used may differ from this example, such as if the virtual hardware addresses are specified by the System Manager module 290, if the virtual hardware addresses are not random and instead store one or more types of information specific to the corresponding computing nodes, etc. In addition, in this example, if computing node A had not been determined to be authorized to send communications to computing node G, whether by the System Manager module 290 and/or Communication Manager module R, Communication Manager module R would not send the response message 220-b with the virtual hardware address (e.g., instead sends no response or an error message response).

In this example, if the interconnection network 250 is an IPv4 network, the returned actual physical substrate network address corresponding to computing node G in interactions 225 may be, for example, "200.0.10.2", such as if the System Manager module 290 and/or the Communication Manager module S 260 has selected that substrate network address to represent computing node G from the substrate network address range associated with Communication Manager module S 260—thus, a communication sent over the interconnection network 250 to "200.0.10.2" will be routed to Communication Manager module S for handling. Alternatively, if the interconnection network 250 is an IP64 network, the returned IPv6 actual physical substrate network address corresponding to computing node G in interactions 225 may be "::0B:02:<Z-identifier>:10.0.0.3", where "10.0.0.3" is stored in the last 32 bits of the 128-bit IPv6 address, and where "<Z-identifier>" is a 24-bit entity network identifier for computing node G corresponding to the managed virtual computer network for entity Z (e.g., as previously assigned by the System Manager module to that network to reflect a random number or some other number corresponding to the entity). In this example, the initial 72 bits of the IPv6 network address store the "::0B:02" designation, corresponding to the sub-network or other portion of the physical interconnection network with a network address range of "::0B:02/72" to which Communication Manager module S corresponds—thus, a communication sent over the interconnection network 250 to IPv6 destination network address "::0B:02:<Z-identifier>:10.0.0.3" will similarly be routed to Communication Manager module S for handling. In other embodiments, the entity network identifier may be other lengths (e.g., 32 bits, if Communication Manager module S has an associated network address range of 64 bits rather than 56 bits) and/or may have other forms (e.g., may be random, may store various types of information, etc.), and the remaining 56 bits used for the network address range after the "::0B:02" designation may store other types of information (e.g., an identifier for a particular entity, a tag or label for the virtual computer network, an identifier for a particular specified VLAN to which computing node G is assigned, etc.). In addition, some or all such information may instead be stored and/or transmitted with a communication to computing node G in other manners in other embodiments, such as by including the information in a header of the communication, including in situations in which the substrate network uses the IPv4 networking protocol.

After receiving the response message 220-b from Communication Manager module R, computing node A creates and initiates the sending of a communication to computing node G, shown in FIG. 2A as communication 220-c. In particular, the header of communication 220-c includes a destination network address for destination computing node G that is "10.0.0.3", a destination hardware address for destination computing node G that is the virtual hardware address provided to computing node A in message 220-b, a source network address for sending computing node A that is "10.0.0.2", and a source hardware address for sending computing node A that is an actual or dummy hardware address that was previously identified to computing node A (e.g., by Communication Manager module R, based on a configuration of computing node A, etc.). Since computing node A believes that computing node G is part of the same local sub-network as itself, computing node A does not need to direct the communication 220-c to any intermediate logical router devices that are configured in a network topology for the managed virtual computer network to separate the computing nodes.

Communication Manager module R intercepts the communication 220-c, modifies the communication as appropriate, and forwards the modified communication over the interconnection network 250 to computing node G. In particular, Communication Manager module R extracts the virtual destination network address and virtual destination hardware address for computing node G from the header, and then retrieves the actual physical substrate network address corresponding to that virtual destination hardware address from mapping information 212. As previously noted, the actual physical substrate network address may be, for example, "200.0.10.2" or "::0B:02:<Z-identifier>:10.0.0.3", and Communication Manager module R creates a new IPv4 or IPv6 header for the encoded new communication (depending on whether the interconnection network is an IPv4 or IPv6 network, respectively) that includes that actual physical substrate network address as the destination address. Similarly, the Communication Manager module R extracts the virtual source network address and virtual source hardware address for computing node A from the header of the received communication, obtains an actual physical substrate network address corresponding to that virtual source hardware address (e.g., from a stored entry in mapping information 212, by interacting with the System Manager module 290 to obtain that information if not previously obtained, etc.), and includes that actual physical substrate network address as the source network address for the new header of the new encoded communication. In this example, the actual physical substrate network address for computing node A may be "200.0.0.1" (if the interconnection network is an IPv4 network) or "::0A:01:<Z-identifier>:10.0.0.2" (if the interconnection network is an IPv6 network), which if used in a reply by Communication Manager module S on behalf of computing node G will be routed to Communication Manager module R for forwarding to computing node A. The Communication Manager module R then creates communication 230-3 by modifying communication 220-c so as to replace the prior IPv4 header with the new header (e.g., in accordance with SIIT), including populating the new header with other information as appropriate for the encoded modified communication (e.g., payload length, traffic class packet priority, etc.). Thus, the communication 230-3 includes the same content or payload as communication 220-c, without encapsulating the communication 220-c within the communication 230-3 in this example. Furthermore, access to the specific information within the payload is not needed for such reheadering, such as to allow Communication Manager module R to handle communications in which the payload is encrypted without needing to decrypt that payload.

In at least some embodiments, before forwarding communication 230-3 to Communication Manager module S, Communication Manager module R may perform one or more actions to determine that communication 220-c is authorized to be forwarded to computing node G as communication 230-3, such as based on the mapping information 212 including a valid entry for the destination virtual hardware address used in communication 220-c (e.g., an entry specific to sending computing node 205a in some embodiments, or instead an entry corresponding to any of the computing nodes 205 in other embodiments). In other embodiments, such an authorization determination may not be performed by Communication Manager module R for each outgoing communication, or instead may be performed in other manners (e.g., based on a determination that the sending node and destination node are part of the same managed virtual computer network, are associated with the same entity, or are otherwise authorized to inter-communicate; based on an interaction with System Manager module 290 to obtain an authorization determination for the communication; etc.).

After Communication Manager module R forwards the modified communication 230-3 to the interconnection network 250, the interconnection network uses the physical destination substrate network address of the encoded communication to route the communication to Communication Manager module S. In doing so, the devices of the interconnection network 250 do not use information about the overlay virtual network addresses for computing nodes A or G or the entity network identifier for their virtual computer network, and thus do not need any special configuration to forward such a communication, nor even awareness that a managed virtual computer network is being overlaid on the physical interconnection network.

When Communication Manager module S receives communication 230-3 via the interconnection network 250, it performs actions similar to those of Communication Manager module R, but in reverse. In particular, in at least some embodiments, the Communication Manager module S verifies that communication 230-3 is legitimate and authorized to be forwarded to computing node G, such as via one or more interactions 240 with the System Manager module. If the communication is determined to be authorized (or if the authorization determination is not performed), the Communication Manager module S then modifies communication 230-3 as appropriate and forwards the modified communication to computing node G. Additional details related to the verification of the communication 230-3 are discussed with respect to FIG. 2B.

In particular, to modify communication 230-3, Communication Manager module S retrieves information from mapping information 262 that corresponds to computing node G, including the virtual hardware address used by computing node G (or generates such a virtual hardware address if not previously available, such as for a new computing node). Communication Manager module S then creates communication 245-e by modifying communication 230-3 so as to replace the prior header of the communication 230-3 encoded for the substrate network with a new IPv4 header for the overlay virtual computer network (e.g., in accordance with SIIT). The new IPv4 header includes the virtual network address and virtual hardware address for computing node G as the destination network address and destination hardware address for the new IPv4 header, the virtual network address and a virtual hardware address for computing node A as the source network address and source hardware address for the new IPv4 header, and includes other information as appropriate for the communication (e.g., total length, header checksum, etc.). The virtual hardware address used by Communication Manager module S for computing node A may be the same as the hardware address used by Communication Manager module R for computing node A, but in other embodiments each Communication Manager module may maintain separate hardware address information that is not related to the information used by the other Communication Manager modules (e.g., if Communication Manager module S generated its own dummy virtual hardware address for computing node A in response to a prior ARP request from one of the computing nodes 255 for computing node A's hardware address). Thus, the communication 245-*e* includes the same content or payload as communications 220-*c* and 230-3. Communication Manager module S then provides communication 245-*e* to computing node G.

After receiving communication 245-*e*, computing node G determines to send a response communication 245-*f* to computing node A, using the source virtual network address and source virtual hardware address for computing node A from communication 245-*e*. Communication Manager module S receives response communication 245-*f*, and processes it in a manner similar to that previously described with respect to communication 220-*c* and Communication Manager module R. In particular, Communication Manager module S optionally verifies that computing node G is authorized to send communications to computing node A (e.g., based on being a response to a previous communication, or otherwise based on configuration information for computing nodes A and G as previously described), and then modifies communication 245-*f* to create communication 230-6 by generating a new substrate network communication header using mapping information 262. After forwarding communication 230-6 to the interconnection network 250, the communication is sent to Communication Manager module R, which processes the incoming communication in a manner similar to that previously described with respect to communication 230-3 and Communication Manager module S. In particular, Communication Manager module R optionally verifies that computing node G is authorized to send communications to computing node A and that communication 230-6 actually was sent from the substrate network location of computing node G, and then modifies communication 230-6 to create response communication 220-*d* by generating a new IPv4 header for the overlay virtual computer network using mapping information 212. Communication Manager module R then provides response communication 220-*d* to computing node A. In some embodiments and situations, Communication Manager modules R and/or S may handle response communications differently from initial communications, such as to assume that response communications are authorized in at least some situations, and to not perform some or all authorization activities for response communications in those situations.

In this manner, computing nodes A and G may inter-communicate using a IPv4-based managed virtual computer network, without any special configuration of those computing nodes to handle the actual intervening one or more substrate networks, and substrate interconnection network 250 may forward communications encoded for it without any special configuration of any physical networking devices of the substrate interconnection network, based on the Communication Manager modules overlaying the virtual computer network over the actual physical interconnection network.

In addition, while not illustrated with respect to FIG. 2A, in at least some embodiments the Communication Manager modules may receive and handle other types of requests and communications on behalf of associated computing nodes. For example, Communication Manager modules may take various actions to support broadcast and multicast capabilities for computing nodes that they manage, including to optionally use various special reserved multicast group virtual network addresses. When a computing node sends a broadcast/multicast communication, any Communication Manager module with an associated computing node that has subscribed to that multicast/broadcast group would be identified (e.g., based on those Communication Manager modules having subscribed to the group, such as in response to prior join communications sent by those associated computing nodes), and the Communication Manager module for the sending computing node would forward the communication to each of the identified Communication Manager modules of the group, for forwarding to their appropriate managed computing nodes. In addition, in some embodiments and situations, at least some broadcast or multicast communications may not be forwarded by Communication Manager modules, such as communications with an IPv4 prefix of 224.0/16 or another designated prefix or other label or identifier. In addition to supporting broadcast and multicast capabilities for managed computing nodes, the Communication Manager modules may receive and handle other types of requests and communications on behalf of associated computing nodes that correspond to configured network topologies for the virtual computer networks to which the computing nodes belong. For example, computing nodes may send various requests that a specified local router device or other specified networking device would be expected to handle (e.g., ping requests, SNMP queries, etc.), and the associated Communication Manager modules may intercept such requests and take various corresponding actions to emulate the functionality that would have been provided by the specified networking device if it was physically implemented.

In addition, it will be appreciated that a Communication Manager module may facilitate communications between multiple of the computing nodes that are associated with that Communication Manager module. For example, with respect to FIG. 2A, computing node 205*a* may wish to send an additional communication (not shown) to computing node 205*c*. If so, Communication Manager module R would perform actions similar to those previously described with respect to the handling of outgoing communication 220-*c* by Communication Manager module R and the handling of incoming communication 230-3 by Communication Manager module S, but without reheadering of the additional communication to use an header for the substrate network since the communication will not travel over the interconnection network. However, if computing nodes 205*a* and 205*c* are configured in a network topology for the virtual computer network to be separated by one or more logical networking devices, the Communication Manager module R may take additional actions to emulate the functionality of those logical networking devices.

While not illustrated with respect to FIG. 2A, in at least some embodiments other types of requests and communications may also be handled in various ways. For example, in at least some embodiments, an entity may have one or more computing nodes that are managed by Communication Manager module(s) and that are part of a managed virtual computer network for that entity, and may further have one or more other non-managed computing systems (e.g., computing systems that are directly connected to the interconnection network 250 and/or that natively use the same network addressing protocol as that of the interconnection network) that do not have an associated Communication Manager module that manages their communications. If the entity desires that those non-managed computing systems be part of that virtual computer network or otherwise communicate with the managed computing nodes of the virtual computer network, such communications between managed computing nodes and non-managed computing systems may be handled by the Communication Manager module(s) that manage the one or more computing nodes in at least some such embodiments. For example, in such situations, if such a non-managed computing system is provided with an actual destination substrate network address for such a managed computing node, the non-managed computing system may send communications to the associated Communication Manager module for that managed computing node via interconnection network 250 using that destination substrate network address, and that Communication Manager module would forward those communications to that computing node (e.g., after reheadering the communications in a manner similar to that previously described) if the Communication Manager module is configured to accept communications from that non-managed computing system (or from any non-managed computing system). Furthermore, the Communication Manager module may generate a dummy virtual network address to correspond to such a non-managed computing system, map it to the actual substrate network address for the non-managed computing system, and provide the dummy virtual network address to its managed computing node (e.g., as the source address for the communications forwarded to the computing node from the non-managed computing system), thus allowing the computing node to send communications to the non-managed computing system.

In addition, as previously noted, a communication manager module manages communications for associated computing nodes in various ways, including in some embodiments by assigning virtual network addresses to computing nodes of a provided virtual computer network, and/or by assigning substrate physical network addresses to managed computing nodes from a range of substrate physical network addresses that correspond to the communication manager module. In other embodiments, some such activities may instead be performed by one or more computing nodes of the virtual computer network, such as to allow a DHCP (Dynamic Host Configuration Protocol) server or other device of a virtual computer network to specify virtual network addresses for particular computing nodes of the virtual network. In such embodiments, the communication manager module obtains such configuration information from the virtual computer network device(s), and updates its mapping information accordingly (and in some embodiments may further update one or more system manager modules that maintain information about computing nodes associated with virtual networks). In yet other embodiments, a user or other entity associated with a virtual computer network may directly configure particular computing nodes to use particular virtual network addresses. If so, the communication manager modules and/or system manager module may track which virtual network addresses are used by particular computing nodes, and similarly update stored mapping information accordingly.

FIG. 2B illustrates some of the computing nodes and communications discussed with respect to FIG. 2A, but provides additional details with respect to some actions taken by the Communication Manager modules 210 and 260 and/or the System Manager module 290 to authorize communications between computing nodes. For example, after computing node A sends message 220-a to request a hardware address for computing node G, Communication Manager module R may perform one or more interactions 225 with the System Manager module 290 in order to determine whether to provide that information, such as based on whether computing node A is authorized to communicate with computing node G, as well as to determine a corresponding substrate physical network address for computing node G based on interconnection network 250. If the Communication Manager module R has previously obtained and stored that information and it remains valid (e.g., has not expired), then the interactions 225 may not be performed. In this example, to obtain the desired physical network address corresponding to computing node G, Communication Manager module R sends a message 225-1 to the System Manager module 290 that includes the virtual network addresses for computing nodes A and G, and that includes an entity network identifier for each of the computing nodes, which in this example is an entity network identifier for the managed virtual computer network of entity Z (e.g., a 32-bit or 24-bit unique identifier). In at least some embodiments, Communication Manager module R may send message 225-1 to the System Manager module 290 using an anycast addressing and routing scheme, so that multiple System Manager modules (not shown) may be implemented (e.g., one for each data center that includes Communication Manager modules and associated computing nodes) and an appropriate one of those (e.g., the nearest, the most underutilized, etc.) is selected to receive and handle the message.

After the System Manager module 290 determines that computing node A is authorized to communicate with computing node G (e.g., based on having the same entity network identifier, based on computing node A having an entity network identifier that is authorized to communicate with computing nodes of the entity network identifier for computing node G, based on other information provided by or associated with computing node A indicating that computing node A is authorized to perform such communications, based on information provided by or associated with computing node G indicating that computing node A is authorized to perform such communications, etc.), the System Manager module 290 returns a response message 225-2 that includes the desired actual physical substrate network address corresponding to computing node G. In addition, in at least some embodiments, before sending the desired actual physical network address, the System Manager module 290 may further verify that Communication Manager module R is authorized to send the message 225-1 on behalf of computing node A, such as based on computing node A being determined to be one of the computing nodes to which Communication Manager module R is associated.

In other embodiments, Communication Manager module R may perform some or all of the actions described as being performed by System Manager module 290, such as to maintain provisioning information for the various computing nodes and/or to determine whether computing node A is authorized to send communications to computing node G, or instead no such authorization determination may be performed in some or all situations. Furthermore, in other embodiments, other types of authorization determinations may be performed for a communication between two or more computing nodes, such as based on one or more criteria associated with the communication (e.g., a type of the communication, a size of the communication, a time of the communication, etc.).

As previously noted with respect to FIG. 2A, after Communication Manager module S receives communication 230-3 intended for computing node G via the interconnection network 250, Communication Manager module S may perform one or more interactions 240 with the System Manager module 290 in order to determine whether to authorize that communication. In particular, in this example, to verify that the communication 230-3 is valid and authorized to be forwarded to computing node G, Communication Manager module S first extracts information from the encoded communication 230-3 that indicates the overlay virtual computer network source and destination virtual network addresses for computing nodes A and G and optionally the entity network identifier(s) for those computing nodes (e.g., from header fields in the encoded communication, or by extracting embedded information in the actual destination substrate network address and actual source substrate network address of the encoded communication 230-3). The Communication Manager module S next exchanges messages 240 with System Manager module 290 to obtain the corresponding actual substrate physical network address for the sending computing node A on behalf of computing node G, including a message 240-4 that includes the extracted virtual network addresses for computing nodes A and G in the overlay virtual computer network, as well as the entity network identifier for each of the computing nodes. In at least some embodiments, Communication Manager module S may send message 240-4 to the System Manager module 290 using an anycast addressing and routing scheme as previously described.

The System Manager module 290 receives message 240-4, and returns a response message 240-5 that includes the actual physical substrate network address corresponding to computing node A (e.g., "200.0.0.1" or "::0A:01:<Z-identifier>:10.0.0.2"). As previously discussed with respect to messages 225-1 and 225-2, in some embodiments the System Manager module 290 and/or Communication Manager module S may further perform one or more other types of authorization determination activities, such as to determine that computing node G is authorized to communicate with computing node A, that Communication Manager module S is authorized to send the message 240-4 on behalf of computing node G, etc. Communication Manager module S then verifies that the returned physical substrate network address in response message 240-5 matches the source substrate network address used to send the encoded communication 230-3 over the substrate network, so as to prevent attempts to spoof messages as being from computing node A that are actually sent from other computing nodes in other locations. Communication Manager module S optionally stores this received information from response message 240-5 as part of an entry for computing node A in mapping information 262 for later use, along with computing node A's virtual network address and a virtual hardware address for computing node A.

FIG. 2C illustrates a further example of managing ongoing communications for the overlay virtual computer network described with respect to FIGS. 2A and 2B for client entity Z, but with communications being managed to support communications involving nodes external to the substrate network 250. In particular, FIG. 2C illustrates computing nodes A and C, Communication Manager module R, System Manager module 290, and interconnection network 250 in a manner similar to that shown in FIGS. 2A and 2B. However, FIG. 2C further illustrates additional information regarding external node J 270a that is located external to the substrate network 250 and is part of the virtual computer network, as well as an associated edge module N 275a that manages communications for the virtual computer network between the underlying substrate network and external node J. FIG. 2C further illustrates additional information regarding external network K 270b (which may include one or more external nodes, not shown) that is located external to the substrate network 250 and that is part of the virtual computer network, as well as an associated edge module M 275b that manages communications for the virtual computer network between the underlying substrate network and external network K. The edge modules 275a and 275b may, for example, be some of multiple edge modules that support one or more virtual computer networks overlaid on the interconnection network 250 for the configurable network service, and may be implemented in various manners (e.g., as part of or in conjunction with one or more edge devices at a data center or other geographical location that includes the substrate network and computing nodes of the one or more virtual computer networks), as discussed in greater detail elsewhere. In addition, the System Manager module 290 maintains and uses additional information 296 in FIG. 2C regarding configured network topology for the one or more virtual computer networks being managed, including information regarding how to integrate external node J and external network K into the virtual computer network provided for client entity Z.

In this example, computing nodes A and C, Communication Manager module R, System Manager module 290, interconnection network 250, edge module 275a and edge module 275b are co-located at one or more first locations (e.g., at a single data center), and external node J 270a has initiated sending one or more communications to a destination within external network K 270b. The external node J and/or external network K may optionally be located at one or more other locations remote from the first location (e.g., with external node J at a second geographical location that is remote from the first location, and with some or all of external network K being at one or more third geographical locations that are remote from the first and second locations), although in other embodiments one or more of the external node J and/or external network K may instead be located proximate to the first location (e.g., external node J may be located at a co-location facility that is at or near the first location, but that is not part of the substrate network). For the purposes of this example, the edge module N 275a manages communications sent between external node J 270a and other nodes (including external nodes of external network K) of the overlay virtual computer network. Such managing of communications by edge module N may include receiving a communication from external node J over an external connection (not shown), determining a destination within the substrate network to which to forward the communication (e.g., a particular final destination computing node, a particular intermediate destination computing node, edge module M if the communication is intended for external network K, etc.), encoding the communication in a manner specific to the substrate network, and forwarding the communication over the substrate network to the determined destination. The managing of communications by edge module N may further optionally include receiving and modifying communications that are encoded for and forwarded over the substrate network to edge module N from other nodes, by decoding the communications and removing any substrate-specific information before forwarding them over the external connection to external node J, optionally adding one or more types of information specific to the virtual computer network before the forwarding. Edge module M 275b may provide similar functionality with respect to communications to and from associated external network K 270b. The edge modules N and M may further provide a variety of types of other functionality in at least some embodiments, as described in greater detail elsewhere. In this example, edge module N 275a is associated with the IPv4 substrate network address of 200.0.10.5, to which communications destined for external node J 270a from the multiple computing nodes or the external nodes of the external network K are initially forwarded. In this example, edge module M 275b is associated with the IPv4 substrate network address of 200.0.10.6, to which communications destined for external network K 270b from the multiple computing nodes or from external node J are initially forwarded.

In this example, external node J 270a determines to send a communication to a destination within external network K 270b, and accordingly sends outgoing communication 259a-14 with a destination virtual network address within the virtual network address range associated with the external network K (in this example, "10.2.0.0/16"). The communication 259a-14 is received and handled by edge module N in a manner similar to that described in FIG. 2A for communication 220-c, including to modify the communication to encode it for the substrate network as appropriate, and to forward the modified encoded communication over the interconnection network 250 toward its intended final destination, which in this example is external network K via edge module M. The edge module N may optionally verify that external node J is authorized to send communications to external network K, and if so, then modify communication 259a-14 to create communication 234-16 by using mapping information 282d, such as to specify a destination substrate network address for communication 234-16 corresponding to edge module M (e.g., the substrate network address "200.0.10.6") from a mapping of that substrate network address to the virtual network address range assigned to external network K to which the destination virtual network address belongs. If edge module N does not already have stored substrate network address information for use with communications from external node J to external network K, edge module N may perform one or more interactions 244a with the System Manager module 290 to obtain such information. In addition, in some embodiments and situations, the destination virtual network address may be or correspond to a public globally routable network address that is currently mapped to a particular external destination node or external destination network (e.g., to external network K) as part of the CNS service, but with the mapped destination being dynamically modifiable while the virtual computer network and public globally routable network address are in use. In this example, the mapping information 282d configures the edge module N to determine that a communication to the indicated destination virtual network address falls within the virtual network address range "10.2.0.0/16" and thus is to be forwarded via the edge module M 275b as an intermediate destination, and accordingly selects the substrate network address specific to edge module M for use with communications sent from external node J to external network K. It will be appreciated that there may be one or more associated edge modules in the substrate network 250 that are able to manage communications sent between the external network K and the substrate network in other embodiments, and selection of a particular associated edge module for a particular communication between particular nodes may be performed in various manners (e.g., based at least in part on the source node's virtual address and/or on the destination node's virtual address). While not illustrated here, in other embodiments the edge module N may further be configured to optionally perform additional functionality, such as to determine if the communication is authorized and to block or otherwise filter the communication if unauthorized, to perform metering of some or all communications handled by the edge module N that are destined for and/or received from external node J, to enforce a maximum rate or maximum quantity or other threshold of use of external node J, etc.

The encoded communication 234-16 is then forwarded over the interconnection network 250 directly to edge module M based on the destination substrate network address included in the encoded communication. When edge module M receives communication 234-16 via the substrate interconnection network 250, it performs actions similar to those described in FIG. 2A with respect to Communication Manager module S for communication 230-3. Such actions may include decoding the communication 234-16, such as by using stored mapping information 282e and/or performing interactions 244b with the System Manager Module 290 to retrieve information for use in replacing the substrate network header of the communication 234-16 with a new communication header that corresponds to the type of external connection (not shown) between edge module M and external network K. Also, edge module M may similarly optionally verify whether the communication is valid and/or authorized. In this example, external network K is accessible via an associated publicly routable external network address via one or more intervening external connections or networks, and the new communication header added by edge module M for corresponding communication 259b-18 indicates the destination external public network address of the intended final destination, which in this example is external network address "30.0.5.4" for external network K. The new communication header may similarly include a source network address that represents external node J to other external nodes or networks (e.g., the publicly routable network address and/or port associated that is used to represent external node J, such as if edge modules N and M perform NAT/PAT functionality for external nodes). The edge module M 275b may instead or also optionally add network identifying information for the managed virtual computer network (e.g., an identifier for a particular entity, a tag or label for the virtual computer network, an identifier for a particular specified VLAN to which external network K is assigned, etc.) to the communication 259b-18 before it is forwarded from edge module M towards external network K. The edge module M then forwards the modified communication as communication 259b-18 over one or more external connections between the substrate network and the external network K. While not illustrated here, in other embodiments the edge module M may further be configured to optionally perform additional functionality, such as to determine if the communication is authorized and to block or otherwise filter the communication if unauthorized, to perform metering of some or all communications handled by the edge module M that are destined for and/or received from external network K, to enforce a maximum rate or maximum quantity or other threshold of use of external network K (e.g., based on a capacity of external network K and/or of one or more parts of the intervening networks or other external connection to external network K, and/or based on configuration information specified by entity Z for the managed virtual computer network or by another external entity who controls external network K), etc. Communications sent from external network K to other destinations of the virtual computer network external to the substrate network 250 (e.g., external node J), may be handled in a similar manner to that described above, but in a reverse fashion.

While not explicitly shown in FIG. 2C, when external node J sends a communication directed to a particular computing node of the virtual network that is not external to the substrate network (e.g., computing node A), the communication may be directed over the external connection to and handled by the edge module N in a similar manner. In particular, edge module N receives the incoming communication, optionally verifies that external node J is authorized to send communications to computing node A, and then modifies the communication to create a new communication to forward over the substrate network. For example, edge module N may encode the incoming communication for forwarding over the substrate network by generating a new substrate network communication header using mapping information 282d, such as to specify a destination substrate network address corresponding to computing node A (e.g., the substrate network address "200.0.0.2", which is one of a range of multiple substrate network addresses associated with Communication Manager module R). After forwarding encoded communication to the interconnection network 250, the communication is forwarded to Communication Manager module R, which processes the incoming communication in a manner similar to that previously described with respect to communication 230-6 and Communication Manager module R in FIG. 2A. Alternatively, in other situations, edge module N may be configured to use an intermediate destination computing node for some or all communications from external node J to computing nodes connected to the substrate network. In such a situation, the communication from external node J to the final intended destination of computing node A may first be forwarded to another intermediate destination computing node, such as computing node C by forwarding the communication from edge module N over the substrate network to the substrate network address associated with computing node C (e.g., the substrate network address "200.0.0.4", which is another of a range of multiple substrate network addresses associated with Communication Manager module R), as discussed in greater detail with respect to FIG. 2D and elsewhere.

In this manner, the CNS system may provide functionality corresponding to the integration of external nodes into the virtual computer network, without any special configuration of the computing nodes of the managed virtual computer network or of the substrate network physical networking devices or of the external nodes, based on the Communication Manager modules and edge module(s) overlaying the virtual computer network on the actual substrate interconnection network in such a manner as to provide the desired functionality. Various other types of actions than those discussed with respect to FIGS. 2A-2C may be performed in other embodiments, including for types of network addressing protocols other than IPv4 and/or IPv6.

FIG. 2D illustrates examples of portions of the mapping information 282d and 282e that may be used by the edge modules N and M of FIG. 2C, respectively, with the example mapping information 282d and 282e of FIG. 2D further corresponding to the example network topology information discussed with respect to FIG. 2C. Each of the groups of mapping information 282d and 282e may include multiple entries (with two example entries shown for mapping information 282e, and four example entries shown for mapping information 282d) having information that has some similarities to a routing table entry.

In particular, in this example, mapping information 282d used by the edge module N includes information for each entry that includes the following: a virtual computer network identifier 213a, which in this example is a network identifier corresponding to the overlay virtual computer network provided for entity Z; a source node interface identifier 213b, which in this example includes "U" and "V" to correspond to the two logical network interfaces for edge module N facing external node J and the substrate network, respectively; a destination virtual network address identifier 213c; an associated destination substrate network address or other destination information 213d related to a type of encoding and corresponding information to use; and optionally various other information 213e. The optional other information may include, for example, a destination hardware address provided to associated computing nodes for use in representing particular destination computing nodes, information about expiration times or other use criteria for particular entries, etc.

Thus, in the example of FIG. 2D, when external node J initiates the sending of a communication to external network K via the edge module N, the sent communication may include a particular destination virtual network address of "10.2.0.5" for a destination within external network K. In FIG. 2D, the entry 213x provides a match for the indicated destination virtual network address and logical network interface, with the associated substrate network address for entry 213x in this example being "200.0.10.6" for edge module M to which the communication will be initially directed. In this example, edge module N is configured with a "U" logical network interface facing the external connection and a "V" network interface facing the substrate interconnection network 250. Thus, entry 213x will be used for communications arriving at the "U" interface of edge module N that are destined for external network K. In the present example, a range of multiple virtual network addresses is associated with external network K. For example, the information in column 213c of entry 213x denotes a CIDR block such as "10.2.0.0/16" to correspond to a range of virtual network addresses, such that according to a longest prefix matching (LPM) technique, the destination virtual network address of "10.2.0.5" falls within the CIDR block "10.2.0.0/16" in column 213c and entry 213x is selected. Other matching and mapping techniques may be optionally employed, such as first attempting to find an exact one-to-one match in the mapping information and then employing longest prefix matching if an exact match cannot be found. Different criteria may also be used in particular situations and embodiments to determine whether to attempt to use one-to-one matching, longest prefix matching, or a combination of the two approaches (e.g., determining whether to find a one-to-one match first or employ longest prefix matching first). This criteria may be based on the source or destination of the communication (e.g., when the source is a computing node of the virtual computer network and the destination is an external network or node), the network traffic volume of communication going to or coming from a particular external node or network, the number of virtual network addresses associated with a particular external network, etc.

In one example, when the edge module N receives a communication from external network K that is intended for external node J over logical network interface V, the received communication includes the destination virtual network address of "10.1.0.5" corresponding to external node J. In this example, the entry 213y provides a match for the indicated destination virtual network address and logical network interface, and the information for the entry will indicate to use a publicly routable external network address (in this example, the external network address of "20.0.5.3"), which edge module N will use to direct the further forwarded outgoing communication to external node J. Thus, entry 213y will be used for communications arriving at interface "V" having a destination virtual network address of "10.1.0.5".

In addition, if external node J initiates a communication to computing node G using a destination virtual network address of "10.0.0.3", in this example the entry 213m of mapping information 282d may provide a best match (with entry 213n also providing a match in this example), with the substrate network address of "200.50.0.2" for matching entry 213m corresponding directly to computing node G. Thus, edge module N will encode and forward the communication directly over the substrate network to computing node G, via its associated Communication Manager module S. Alternatively, in this example, communications directed to other virtual network addresses for the virtual computer network in the range of 10.0.0.0/8 will be forwarded initially to intermediate destination computing node C for further handling, as discussed with respect to FIG. 2C. Thus, if external node J initiates another communication to computing node A using a destination virtual network address of "10.0.0.2", in this example the entry 213n of mapping information 282d will provide a best match, and the indicated substrate network address of "200.0.0.4" for matching entry 213n will be used by edge module N to forward the encoded communication over the substrate network to intermediate destination computing node C via associated Communication Manager module R.

The example mapping information 282e used by the edge module M includes information similar to that displayed for mapping information 282d, and in particular includes information for each of its entries that includes the following: a virtual computer network identifier 214a, which in this example is a network identifier corresponding to the overlay virtual computer network provided for entity Z; a source network interface identifier 214b (e.g., in this example, edge module M is also configured with a "W" network interface facing the external connection and a "X" network interface facing the substrate interconnection network 250); a destination virtual network address identifier 214c; an associated destination substrate network address or other information 214d related to a type of encoding and corresponding information to use; and optionally various other information 214e. For example, in some embodiments and situations, a particular entry may indicate for a particular external connection to use a particular VLAN identifier or MPLS label. Accordingly, in this example, when the edge module M receives the communication from external node J that is intended for external network K, the received communication includes the destination virtual network address of "10.2.0.5" for a destination within external network K. In this example, the entry 214z provides a match for the indicated destination virtual network address, and the information for the entry will indicate to use a publicly routable external network address (in this example, the external network address of "30.0.5.4") and optionally additional information related to the encoding for the external connection to external network K, which edge module M will use to direct the further forwarded outgoing communication to external network K. Thus, entry 214z will be used for communications arriving at interface "X" having a destination virtual network address of "10.2.0.5" corresponding to external network K. As with mapping information 282d, longest prefix matching and/or one-to-one matching techniques may be used.

In some embodiments and situations, two different external networks may use the same edge module, in which case the particular edge module may include appropriate mapping information to handle the communication accordingly. For example, external network K and another different external network, say external network C (not shown), may both be associated with edge module M, and may optionally share a single external connection or instead have distinct external connections. External network C may, for example, have a range of virtual network addresses associated with it of "10.3.0.0/16". Thus, in this example, if external network K initiates the sending of a communication to external network C via the edge module M that includes the destination virtual network address of "10.3.0.5", and the communication is received over an external connection associated with logical network interface W of edge module M, the entry 214y in FIG. 2D may be used to provide a match for the indicated destination virtual network address, and the information in column 214d related to the type of encoding for and corresponding information for the external connection to the external network C will be used to forward the communication to external network C without having to forward such a communication over the substrate network. Thus, entry 214y will be used for communications arriving at interface "V" having a destination virtual network address within the range "10.3.0.0/16" corresponding to external network C.

In this manner, the CNS system may provide functionality that supports the use of one or more edge modules within a substrate network, without any special configuration of the other computing nodes of the managed virtual computer network or of the physical networking devices of the substrate network or of the devices external to substrate interconnection network, based on communication manager modules and edge modules overlaying the virtual computer network on the actual physical interconnection network in such a manner as to provide the desired functionality, including to support nodes external to the substrate network as being part of the virtual computer network.

FIG. 2E includes information with some similarities to that of FIG. 2C, but illustrates an example alternative logical network topology of the overlay virtual computer network provided for entity Z. In particular, with respect to FIG. 2E, the provided overlay virtual computer network is illustrated as including one or more logical subnets 288c, and with those logical subnets being separated from external network K 270b by edge module M 275b and from external node J 270a by edge module N 270a, as well as an intermediate destination computing node 255b of the provided overlay virtual computer network. In this example, the one or more logical subnets include computing nodes A 205a, C 205c and G 205g, as well as optionally including other computing nodes 286C of entity Z's virtual computer network that were not illustrated in FIGS. 2A and 2B. In addition, computing node H is configured to have two logical network interfaces 213, including a first logical network interface H3 213c that corresponds to the logical subnet(s) of the provided overlay virtual computer network, and a second logical network interface H4 213d that is configured in this example to support only communications with edge modules M and N.

Thus, if external node K sends a communication to one of the computing nodes in the logical subnet(s) of the provided overlay virtual computer network that are not external to the substrate network (e.g. computing node A), the sent communication will be directed first to edge module M in a similar manner to that described above with reference to FIG. 2D, which may then forward the communication to logical network interface H4 213d of computing node H, so as to enable computing node H to perform configured firewall-related activities and/or other operations for the communication. This forwarding may be accomplished, for example, by use of mapping information at or available to edge module M that maps the destination virtual network address of computing node A (or all destination virtual network addresses associated with logical subnet 288c) to the substrate network address of intermediate destination computing node H for logical network interface 213d. Assuming that computing node H forwards the communication on, it will be sent from logical network interface H3 of computing node H to the destination computing node A.

If one of the computing nodes in the logical subnet(s) of the provided overlay virtual computer network that are not external to the substrate network (e.g. computing node A) sends a communication to external network K, the sent communication will be directed first to logical network interface H3 of computing node H, to enable computing node H to perform configured firewall-related activities for the communication. Assuming that computing node H forwards the communication on, it will be sent from logical network interface H4 of computing node H to edge module M, to enable edge module M to perform activities as described above with reference to FIG. 2D for outgoing communications to external network K. In this example edge module M will perform activities to forward the communication on to the indicated destination external network K, including to optionally perform activities analogous to those of a communication manager module to decode the communication that it receives in a form specific to the substrate network, as discussed in greater detail elsewhere. Also, edge module M may perform configured VPN-related activities for the communication in this example—in particular, the particular destination external network K in this example may be at a remote location that includes one or more computing systems under control of entity Z that are configured to interoperate with the provided overlay virtual computer network, including to maintain a VPN connection between the locations. It will be appreciated that communications sent from the external network K to computing nodes of the provided overlay virtual computer network or other external nodes (e.g., external node J) of logical subnet 288c may pass in through the edge module M in a manner similar to that previously described above. Similarly, communications to and/or from external node J may similarly be handled in a manner similar to that discussed above, including by routing communications between external node J and external network K between edge modules N and M without passing through computing node H in this example network topology.

Various other types of actions than those discussed with respect to FIGS. 2A-2E may be performed in other embodiments, including for types of network addressing protocols other than IPv4 and/or IPv6.

In some embodiments, one or more modules of the configurable network service may further be configured to perform one or more additional types of functionality in at least some situations, such as by the multiple edge modules in a distributed manner, optionally in conjunction with multiple communication manager modules and/or the system manager module. As one example, the one or more modules may be configured in at least some embodiments to perform metering or other tracking of the use of one or more external nodes for a managed virtual computer network, and to provide information about such tracking for various purposes (e.g., to enable fees to be charged to a client associated with the managed virtual computer network if the corresponding tracked activities are fee-based activities; to provide information to a client associated with the managed virtual computer network and/or to another entity regarding an amount of use of one or more intermediate destination computing nodes or edge modules, such as to enable corresponding monitoring activities; etc.). As another example, the one or more edge modules may be configured in at least some embodiments to filter at least some communications forwarded to and/or from one or more external nodes of a managed virtual computer network, including to limit the rate or total quantity of such communications to be below a specified or determined threshold of use—such rate/quantity limiting or other filtering may be configured in various manners, such as based on configuration information received by a client associated with the managed virtual computer network (e.g., to limit use of a fee-based feature of the managed virtual computer network, to correspond to limitations of the one or more external nodes and/or of other associated nodes or networking components, etc.), based on a capacity or other aspects of a particular external node; etc. The one or more edge modules may further be configured to filter communications received from one or more external nodes of a managed virtual computer network in at least some embodiments, such as to ensure that the communications are authorized for or otherwise allowed for the managed virtual computer network before those communications are provided to an indicated destination within the managed virtual computer network. In addition, the one or more edge modules may be configured in at least some embodiments to perform signaling activities if the unavailability of a particular external node is detected (e.g., based on the external node failing or on an external connection to the external node being unavailable, and as may be detected based on a lack of response or other information from the external node for a period of time or to one or more forwarded communications or other messages), such as to notify other computing nodes of the managed virtual computer network of the unavailability to inhibit future communications from being forwarded to the external node while it is unavailable, as well as to optionally perform other related activities (e.g., to initiate providing a replacement for the unavailable external node).

In addition, in some situations, a communication manager module tracks or otherwise determines the virtual computer networks to which the module's associated computing nodes belong (e.g., based on entities on whose behalf the virtual computer networks operate) as part of managing the communications for the virtual computer networks, and an edge module may similarly track or otherwise determines the one or more virtual computer networks to which the module's associated external nodes belong as part of managing the communications sent to and/or from those external nodes. The determination by a communication manager module of a corresponding virtual computer network for an associated computing node and/or the determination by a edge module of a corresponding virtual computer network for an associated external node may be performed in various ways in various embodiments, such as by interacting with a system manager module that provides that information, by tracking software modules or other programs executing on such computing nodes, by tracking entities associated with such computing nodes, based on communications sent by and/or to the nodes, etc. For example, when a particular computing node begins to execute one or more software programs on behalf of a user, and that user also has other software programs executing on other computing nodes, the new computing node executing the user's program(s) may be selected to be associated with a virtual computer network for the user that includes those other computing nodes. Alternatively, a user or other entity may specify a particular managed computer network to which a computing node belongs, such as if the entity maintains multiple distinct managed computer networks between different groups of computing nodes. In addition, in at least some embodiments, one or more system manager modules of the CNS system may facilitate configuring communications between computing nodes and external nodes, such as by tracking and/or managing which computing nodes and external nodes belong to which virtual computer networks (e.g., based on executing programs on behalf of a customer or other entity), by tracking and/or managing which external nodes operate as logical nodes of which virtual computer networks, and by providing information about actual substrate network addresses or actual public external network addresses that correspond to virtual network addresses used for a particular virtual computer network (e.g., by a particular customer or other entity).

In addition, as previously noted, configuration information that is specified for a virtual computer network may include various network topology information 296, and various computing nodes and external nodes in various locations may be selected for the virtual computer network and configured in accordance with the network topology in various manners. For example, in some embodiments, the selection of a computing node to be used in a managed virtual computer network and/or to be assigned a particular role in a configured network topology may be based at least in part on a geographical and/or network location of the computing node, such as an absolute location, or instead a location relative to one or more other computing resources of interest (e.g., other computing nodes of the same managed virtual computer network, storage resources to be used by the computing node, etc.), such as within a minimum and/or maximum specified geographical distance or other degree of proximity to an indicated other computing resource or other location. In addition, in some embodiments, factors used when selecting a computing node may perhaps not be based on location, such as to include one or more of the following: constraints related to capabilities of a computing node, such as resource-related criteria (e.g., an amount of memory, an amount of processor usage, an amount of network bandwidth, and/or an amount of disk space), and/or specialized capabilities available only on a subset of available computing nodes (e.g., database services and storage); constraints related to costs, such as based on fees or operating costs associated with use of particular computing nodes; etc.

As previously noted, in some embodiments, a program execution service executes third-party customers' programs using multiple physical computing systems (e.g., in one or more data centers) that each host multiple virtual machines, with each virtual machine being able to execute one or more programs for a customer. In some such embodiments, customers may provide programs to be executed to the program execution service, and may reserve execution time and other resources on physical or virtual hardware facilities provided by the program execution service. In addition, customers and/or the program execution service may define virtual computer networks that will be used by the program execution service for computing nodes or external nodes of the customer, so as to transparently provide computing nodes of a virtual computer network (including nodes located remote from the substrate network) with the appearance of operating on a dedicated physical network.

Figure 3:
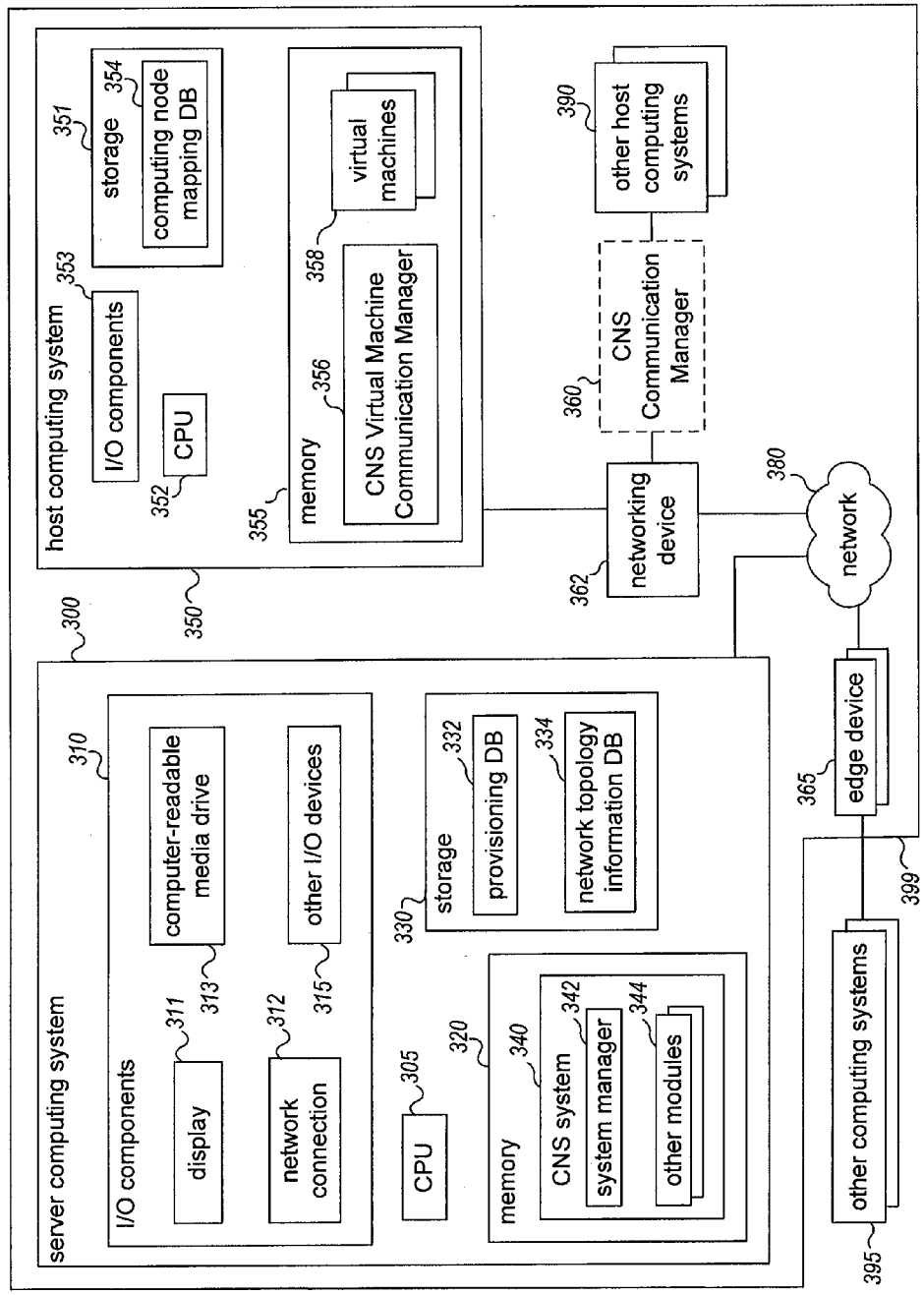
FIG. 3 is a block diagram illustrating example computing systems suitable for executing an embodiment of a system for managing communications involving computing nodes and external nodes.

FIG. 3 is a block diagram illustrating example computing systems suitable for executing an embodiment of a system for managing communications involving computing nodes and external nodes. In particular, FIG. 3 illustrates a group 399 of computing systems and inter-network(s), such as a data center or other group of co-located computing nodes. In some embodiments, some or all of the computing systems of the group 399 may be used by an embodiment of the CNS system to provide managed virtual computer networks to users or other entities. The group 399 includes a server computing system 300, a host computing system 350 capable of executing one or more virtual machines, other host computing systems 390 that are similar to host computing system 350, and an optional Communication Manager module 360 that manages host computing systems 390 and that executes on one of the computing systems 390 or on another computing system (not shown). The server computing system 300 and host computing systems 350 and 390 are connected to one another via an internal network 380, which includes a networking device 362 and other networking devices (not shown). The network 380 may be an interconnection network that joins multiple disparate physical networks (not shown) for the group 399 and possibly provides access to external networks (not shown) and/or systems, such as other computing systems 395. In the illustrated example, the networking device 362 provides a gateway between the network 380 and host computing systems 350 and 390. In some embodiments, networking device 362 may, for example, be a router or a bridge. In addition, in this example, one or more edge devices 365 may operate as or be associated with one or more edge modules (not shown) to facilitate integration of external nodes into the managed virtual computer network, such as one or more of the external computing systems 395 or other external nodes (not shown).

The computing system 300 in this example operates to configure and manage virtual computer networks within the group 399, as well as to provide other functions (e.g., the provisioning, initialization, and execution of programs on computing nodes). The computing system 300 includes a CPU 305, various I/O components 310, storage 330, and memory 320. The I/O components include a display 311, network connection 312, computer-readable media drive 313, and other I/O devices 315 (e.g., a mouse, keyboard, speakers, etc.).

The host computing system 350 operates to host one or more virtual machines, such as for use as computing nodes in managed virtual computer networks (e.g., computing nodes that execute programs on behalf of various users). The host computing system 350 includes a CPU 352, various I/O components 353, storage 351, and memory 355. While not illustrated here, the I/O components 353 may include similar components to those of I/O components 310. A virtual machine Communication Manager module 356 and one or more virtual machines 358 are executing in the memory 355, with the module 356 managing communications for the associated virtual machine computing nodes 358 and in some embodiments including various software instructions that when executed program the CPU 352 to provide the described functionality. The Communication Manager module 356 maintains various mapping information 354 on storage related to the computing nodes 358 and other computing nodes, such as in a manner similar to mapping information 212, 212*d* and 262 of FIGS. 2A-2D. The structure of the other host computing systems 390 may be similar to that of host computing system 350, or instead some or all of the host computing systems 350 and 390 may act directly as computing nodes by executing programs without using hosted virtual machines. In a typical arrangement, the group 399 may include hundreds or thousands of host computing systems such as those illustrated here, organized into a large number of distinct physical sub-networks and/or networks.

An embodiment of a CNS system 340 is executing in memory 320 of the computing system 300. In some embodiments, the system 340 may receive an indication of multiple computing nodes to be used as part of a managed virtual computer network (e.g., one or more virtual machine computing nodes on host computing system 350 or one or more computing nodes using one of the host computing systems 390), and in some situations may select the particular computing node(s) for the managed virtual computer network. In some cases, information about the structure and/or membership of various managed virtual computer networks may be stored in the provisioning database 332 on storage 330 by the system 340, and provided to the Communication Manager modules at various times. Similarly, in some cases, information about configured network topology to be emulated for one or more managed virtual computer networks, including information about any integrated external nodes, may be stored in the database 334 on storage 330 by the system 340, such as in a manner similar to information 296 of FIG. 2D, and used to provide corresponding information to the Communication Manager modules at various times. In this example, the system 340 in memory 320 includes a system manager module 342 and optionally other modules 344, with the communication manager modules 356 and 360 being a further part of the distributed CNS system in this example. The system module 342 performs operations to facilitate the use of external nodes for managed computer networks, as discussed elsewhere. In addition, the CNS system and the modules 342 and 344 may each in some embodiments include various software instructions that when executed program the CPU 305 to provide described functionality.

As discussed in greater detail elsewhere, the Communication Manager modules 356 and 360 (and other Communication Manager modules, not shown, that manage other associated computing nodes, not shown) and the various modules 342 and 344 of the system 340 may interact in various ways to manage communications between computing nodes, including to support the integration of particular external nodes into particular provided virtual computer networks, and/or to use particular alternative intermediate destinations for particular communications from computing nodes of provided virtual computer networks. Such interactions may, for example, enable the computing nodes 358 and/or other computing nodes to inter-communicate over managed virtual computer networks without any special configuration of the computing nodes, by overlaying the virtual computer networks over network 380 and optionally one or more external networks (not shown) without any special configuration of networking device 362 or other networking devices (not shown), and without encapsulation of communications.

It will be appreciated that computing systems 300, 350, 390, and 395, edge devices 365, and networking device 362, are merely illustrative and are not intended to limit the scope of the present invention. For example, computing systems 300 and/or 350 may be connected to other devices that are not illustrated, including through one or more networks external to the group 399, such as the Internet or via the World Wide Web ("Web"). More generally, a computing node or other computing system may comprise any combination of hardware or software that can interact and perform the described types of functionality, including without limitation desktop or other computers, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated modules may in some embodiments be combined in fewer modules or distributed in additional modules, such as if the functionality of a system manager module and one or more communication manager modules are instead combined into a single module. Similarly, in some embodiments the functionality of some of the illustrated modules may not be provided and/or other additional functionality may be available. Furthermore, in some embodiments alternative intermediate destinations of one or more types other than edge devices may be present and in use (e.g., one or more edge modules), whether as part of, instead of or in addition to the alternative edge devices 365.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a non-transitory computer-readable storage medium, such as a hard disk, a memory, network storage, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
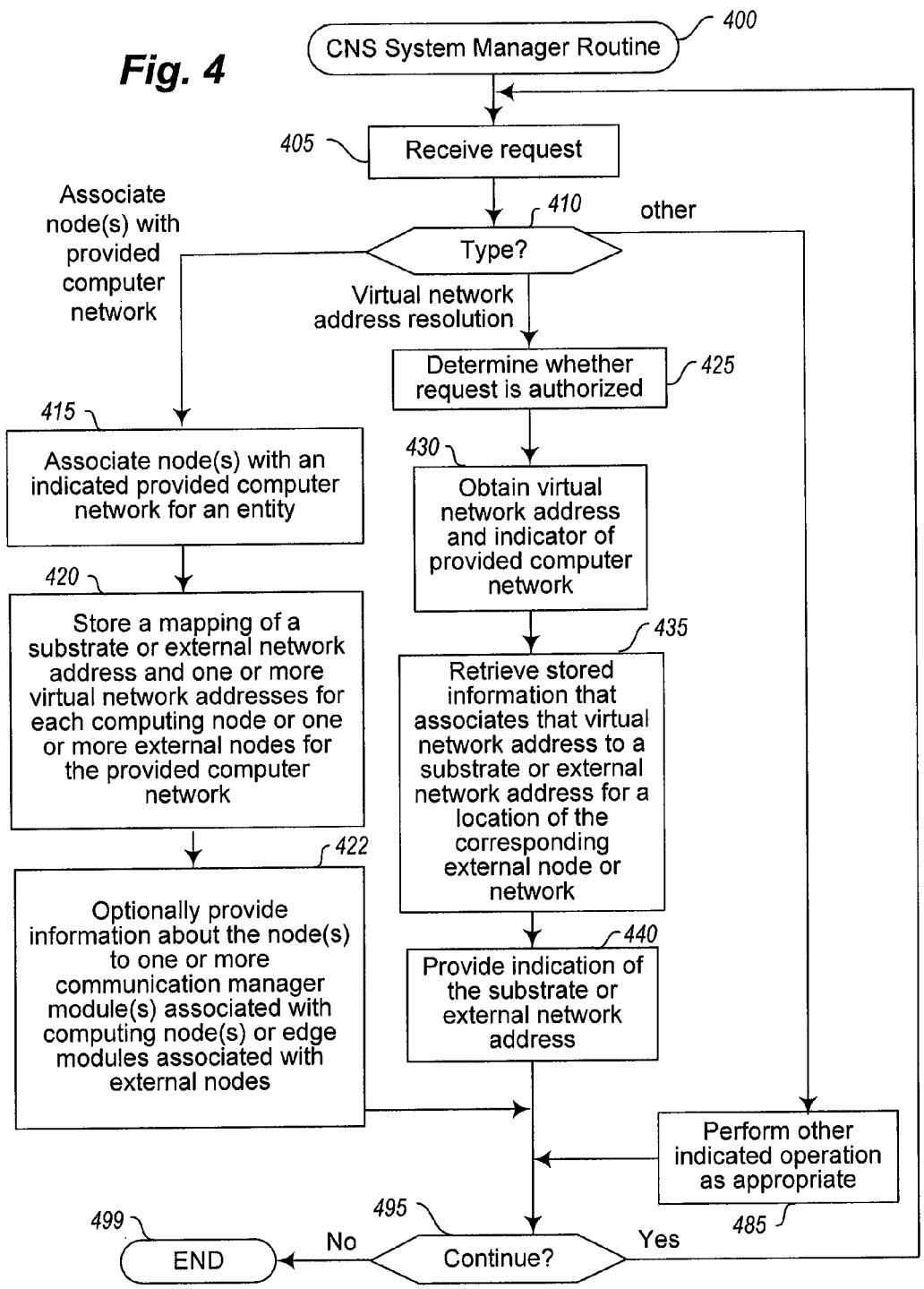
FIG. 4 illustrates a flow diagram of an example embodiment of a CNS System Manager routine.

FIG. 4 is a flowchart of an example embodiment of a CNS System Manager routine 400. The routine may be provided by, for example, execution of the system manager module 110 of FIGS. 1A and/or 1B, the system manager module 290 of FIGS. 2A-2E, and/or the system manager module 342 of CNS system 340 of FIG. 3, such as to assist in managing communications between multiple computing nodes across one or more intermediate networks, including to manage communications that involve external nodes integrated into one or more virtual computer networks, as well as to perform other types of management operations in some situations. In at least some embodiments, the routine may be provided as part of a system that manages communications for multiple different entities across a common intermediate substrate network, with the communications configured so as to enable each computing node to transparently communicate with other associated computing nodes using a private virtual computer network that is specific to that entity. Furthermore, the routine may facilitate preventing unauthorized communications from being provided to destination computing nodes, such as by assisting Communication Manager modules and edge modules with determinations of whether communications are authorized.

In the illustrated embodiment, the routine begins at block 405, where a request is received. The routine continues to block 410 to determine the type of request. If it is determined that the type of request is to associate one or more computing nodes and/or external nodes with a particular managed virtual computer network provided for an indicated entity, such as if those nodes are executing or are to execute one or more programs on behalf of that entity, or are otherwise designed or configured to provide one or more desired types of functionality for that entity, the routine continues to block 415 to associate those nodes with that indicated entity and virtual computer network. In some embodiments, the routine may further determine one or more computing nodes to be associated with the indicated entity and virtual computer network, such as based on information provided by the indicated entity, while in other embodiments the selection of such computing nodes and/or execution of appropriate programs on those computing nodes may be performed in other ways. In addition, as discussed in greater detail elsewhere, in some embodiments one or more of the computing nodes may each be a virtual machine that is hosted by one or more physical computing systems, and the external nodes may have various forms in various embodiments and situations. In addition, in some embodiments the routine may obtain and store various types of configuration information for the virtual computer network, such as a range of virtual network addresses for use with the virtual computer network, a specified network topology for the virtual computer network, etc. The routine then continues to block 420 to store mapping information for the nodes and the managed virtual computer network, including any received configuration information. For example, in the illustrated embodiment, the routine stores, for each computing node and each group of one or more external nodes, an indication of a corresponding substrate network address, one or more virtual network addresses for the virtual computer network, and optionally other information (e.g., a corresponding virtual hardware address, an indication of the associated entity, information about a logical location and/or function of the node in the specified network topology, etc.). As discussed in greater detail elsewhere, the substrate network address or external network address corresponding to a node may in some embodiments be a network address specific to that single node, while in other embodiments may instead refer to a sub-network or other group of multiple nodes, such as may be managed by an associated Communication Manager module and/or edge module. After block 420, the routine continues to block 422 to optionally provide information about the node(s) and their configuration to one or more communication manager modules and/or one or more edge modules associated with those nodes, although in other embodiments instead provides such information upon request from the communication manager modules and/or edge modules.

If it is instead determined in block 410 that the type of received request is a request for address resolution for a virtual network address of a target node or other computer system of interest, such as from a communication manager module or edge module on behalf of a managed node, the routine continues instead to block 425, where it determines whether the request is authorized in one or more ways, such as based on whether the managed node on whose behalf the request is made is authorized to send communications to a target node whose virtual network address resolution is requested (e.g., based on the virtual computer network(s) to which the two nodes belong), based on whether the managed node on whose behalf the request is made is a valid node that is currently part of a configured virtual computer network, and/or based on whether the request is received from the communication manager module or edge module that actually manages the indicated node on whose behalf the request is made. If the request is determined to be authorized, the routine continues to block 430, where it obtains a virtual network address of interest for a particular target node of interest, such as may be included with the request received in block 405, or previously stored and currently identifiable for the target based on other received information. The routine then continues to block 435 to retrieve stored information for the target that is associated with the network address, and in particular to retrieve information that associates that target network address to a substrate network address or external network address for a network location that corresponds to the target, such as may be previously stored with respect to block 420, and optionally to also provide other information for the target network address (e.g., an associated virtual hardware address, an indication regarding whether the target network address corresponds to a physically implemented computing node with an actual substrate network address or instead to a logical networking device that does not have an actual substrate network address, information about a role or status of the device corresponding to the virtual network address with respect to configured network topology information, whether the target network address is external to a current location such that communications to the target will use one or more intermediate destination edge devices and/or edge modules, whether communications to the target network address will use one or more intermediate computing node destinations or other intermediate destinations that are not edge devices or edge modules, etc.). After block 435, the routine continues to 440 to provide an indication of the retrieved information to the requester. While not illustrated here, if the determination in block 425 determines that the request is not authorized, the routine may instead not perform blocks 430-440 for that request, such as by responding with an error message to the request received in block 405 or by not responding to that received request. In addition, in other embodiments the routine may perform one or more other tests to validate a received request before responding with the requested information, such as to verify that the node that initiated the request is authorized to receive that information. Furthermore, in the illustrated embodiment, communication manager modules perform operations to select particular intermediate destinations to use for particular communications, including in some situations a particular edge module when multiple such edge modules are available for use, such as in an individualized manner for each of at least some communications, although in other embodiments the routine 400 may instead perform some or all such actions (e.g., as part of block 435, and if a single alternative intermediate destination may be repeatedly used for multiple communications being a single source/final destination pair).

If it is instead determined in block 410 that the received request is of another type, the routine continues instead to block 485 to perform one or more other indicated operations as appropriate. For example, in some embodiments, the routine may receive requests to update stored information about particular nodes, such as if a particular node was previously associated with a particular entity and/or virtual computer network but that association ends (e.g., one or more programs being executed for that entity on that node are terminated, the node fails or otherwise becomes unavailable, an associated user or other client changes specified configuration information for the node, etc.). Similarly, in some embodiments, the routine may receive requests to update stored information about external nodes or otherwise about specified network topology for a virtual computer network, including to add, remove or configure edge modules in some situations, and optionally to provide such updated information to one or more communication manager modules of the provided virtual network. The routine may also perform a variety of other actions related to managing a system of multiple nodes, as discussed in greater detail elsewhere, and may at times perform actions of other types, such as to perform occasional housekeeping operations to review and update stored information as appropriate (e.g., after predefined periods of time have expired). In addition, if possible validation problems are detected, such as with respect to received address resolution requests for virtual network addresses, the routine may take various actions to signal an error and/or perform other corresponding actions as appropriate.

After blocks 422, 440 or 485, the routine continues to block 495 to determine whether to continue, such as until an explicit indication to terminate is received. If it is determined to continue, the routine returns to block 405, and if not continues to block 499 and ends.

Figure 5A:
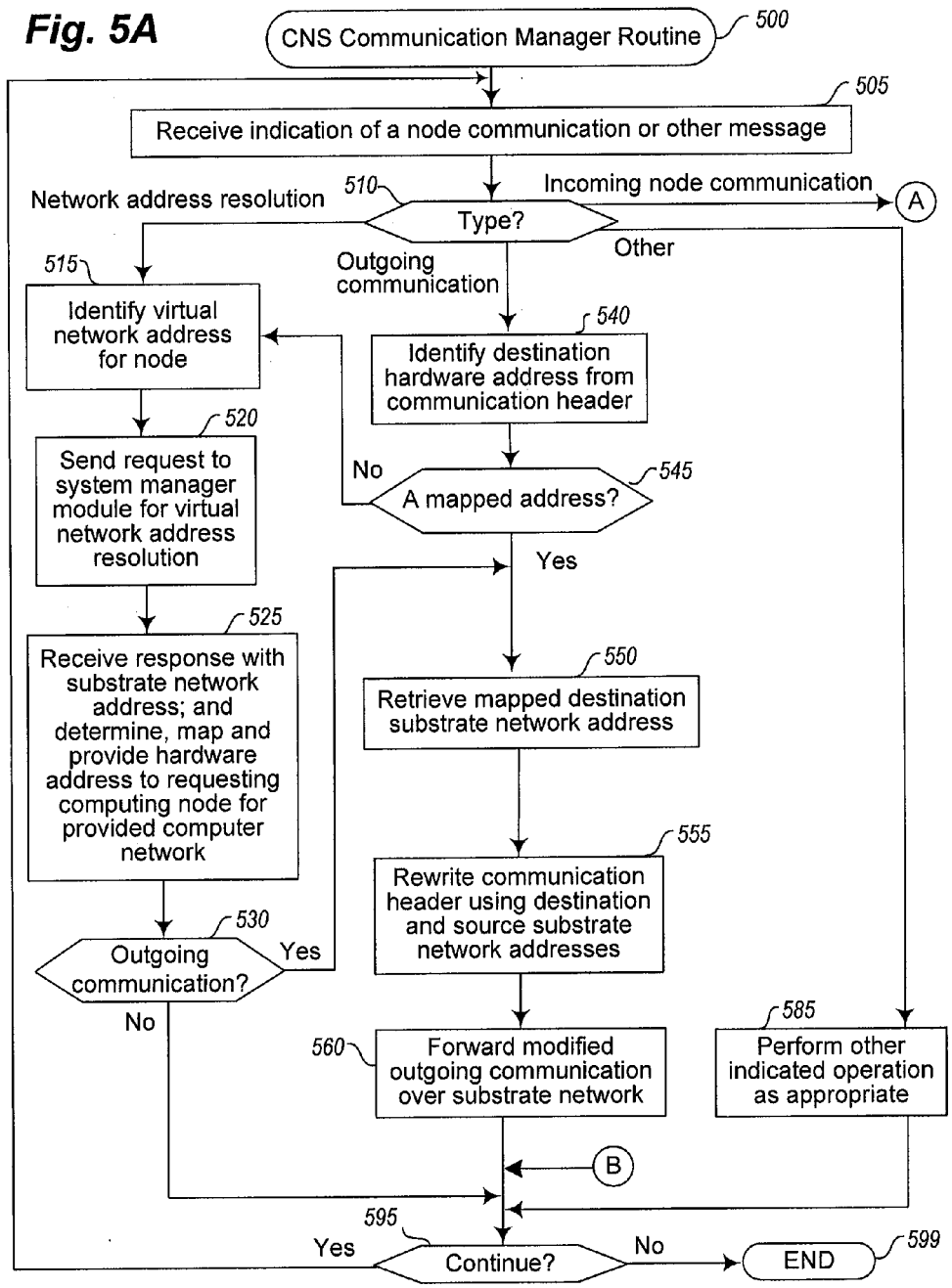
FIGS. 5A-5B illustrate a flow diagram of an example embodiment of a CNS Communication Manager routine.
Figure 5B:
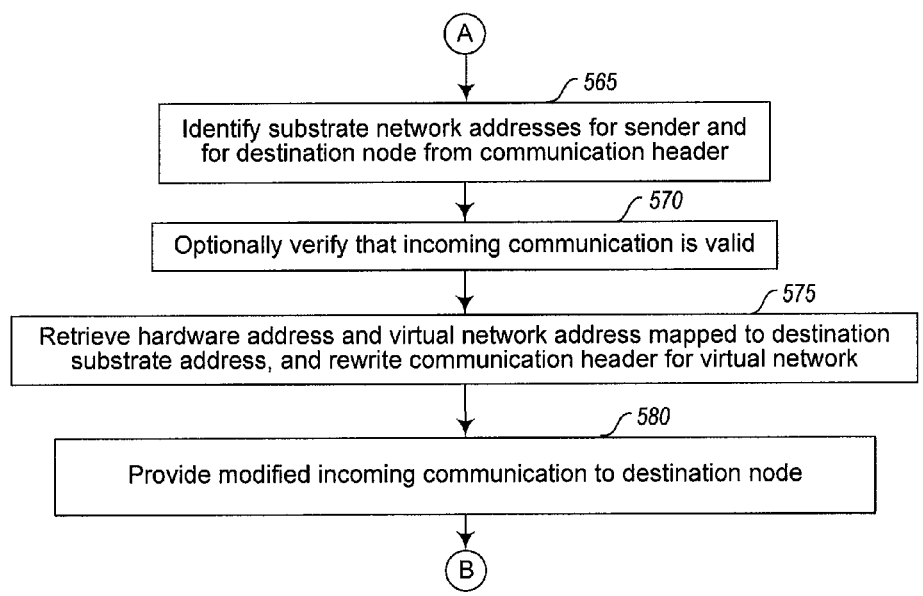

FIGS. 5A-5B are a flow diagram of an example embodiment of a CNS Communication Manager routine 500. The routine may be provided by, for example, execution of the Communication Manager modules 109a, 109b, 109c, 109d and/or 150 of FIG. 1B, the Communication Manager modules 210 and/or 260 of FIGS. 2A-2E, the Communication Manager modules 356 and/or 360 of FIG. 3, and/or a communication manager module (not shown) of the CNS service 105 of FIG. 1A (e.g., one of the other modules 115), such as to manage communications to and from an associated group of one or more computing nodes connected to one or more shared intermediate networks used as a substrate in order to provide a private virtual computer network over the shared intermediate network(s), including to determine whether to authorize communications to and/or from the managed computing nodes, and to support interactions with external nodes for at least some communications.

The routine begins at block 505, where an indication is received of a node communication or other message. The routine continues to block 510 to determine the type of communication or other message and proceed accordingly. If it is determined in block 510 that the message is a request from an associated managed computing node for network address resolution, such as an ARP request, the routine continues to block 515 to identify the target network address of interest indicated in the request. The routine then continues to block 520 to send a request to a system manager module for network address resolution for the indicated target network address for the virtual computer network that is associated with the computing node that provided the request, such as discussed with respect to blocks 425-440 of FIG. 4. As discussed in greater detail elsewhere, the routine may in some embodiments track information about virtual computer networks and/or entities associated with each managed computing node, as well as one or more external nodes that are each part of one or more virtual computer networks, while in other embodiments at least some such information may instead be provided to the routine by the computing nodes and/or by the system manager module, or instead the system manager module may track and store that information without it being provided to and tracked by the current routine. While not illustrated here, in other embodiments and situations such address resolution requests may be handled in other manners. For example, if a computing node being managed by a particular communication manager module provides an address resolution request for another computing node that is also managed by that communication manager module, the routine may instead respond to the request without interaction with the system manager module, such as based on locally stored information. In addition, while in the illustrated embodiment the received request is a request to provide a computing node's link-layer hardware address that corresponds to an indicated networking layer address, in other embodiments the address resolution request may have other forms, or computing nodes may request other types of information about computing nodes that have indicated target network addresses.

In the illustrated embodiment, the routine next continues to block 525 to receive a response from the system manager module that includes a substrate network address and/or other information corresponding to the identified virtual network address (e.g., an indication that the target address is an external address), and stores information locally that maps that substrate network address and/or other information to a unique hardware address for later use by the routine (e.g., based on a dummy virtual hardware address generated by the routine or provided in the response), along with other information about the target destination as discussed in greater detail elsewhere. The routine then provides the hardware address to the requesting computing node, which it may use as part of one or more later communications that it sends to the target destination with the indicated target network address. The routine then continues to block 530 to determine if blocks 515-525 were performed as part of the handling of an outgoing node communication, as discussed with respect to blocks 540-560, and if so, continues to block 550. While not illustrated here, in some embodiments the routine may instead receive an error response from the system manager module (e.g., based on the requesting computing node not being authorized to communicate with the indicated destination node) or no response, and if so may not send any response to the requesting computing node or may send a corresponding error message to that computing node.

If it is instead determined in block 510 that the type of communication or other message is an outgoing node communication from a computing node managed by the routine to another indicated non-local target destination that is not a computing node also managed by the routine, the routine continues to block 540 to identify the indicated hardware address for the indicated target final destination from the communication header. In block 545, the routine then determines whether that destination hardware address is a hardware address previously mapped to a substrate network address corresponding to the final destination, such as previously discussed with respect to block 525. If not, in some embodiments the routine continues to block 515 to perform blocks 515-525 to determine such a corresponding substrate network address for the outgoing node communication, while in other embodiments such actions are not performed (e.g., if the indicated hardware address is not a mapped address, the routine may cause the outgoing node communication to fail, such as with an error message back to the sending node; if the indicated hardware address is not mapped but the destination network address is an external address of an external computer system that is not part of the virtual computer network, to proceed to perform blocks 550-560 to send the communication to an edge device for forwarding outside of the substrate network; etc.).

If the indicated hardware address is a mapped address, or the check is not performed, the routine continues to block 550 to retrieve the physical substrate network address that is mapped to the hardware address. In block 555, the routine then rewrites the communication header in accordance with a networking address protocol for one or more intermediate substrate networks between the sending computing node and destination using the substrate network address retrieved in block 550. The header rewriting may further include changing other information in the new header, including changing a virtual network address for the sending computing node to be a corresponding substrate network address, and in at least some embodiments includes modifying the received communication without encapsulation as part of an overlay of the virtual computer network over the one or more intermediate substrate networks. Furthermore, for a communication whose destination hardware address does correspond to a logical networking device, the routine in block 555 may further perform other modifications that correspond to providing logical networking functionality to emulate the actions and functionality that would be performed by the one or more logical networking devices that would be used to forward the communication to the destination in accordance with the configured network topology for the virtual computer network. In block 560, the routine then facilitates providing of the modified outgoing communication to the destination, such as by initiating forwarding of the modified outgoing communication over the substrate intermediate network(s) toward the destination. While not illustrated here, in other embodiments various additional types of processing may be performed for outgoing node communications, such as to verify that the communications are valid or otherwise authorized in various ways (e.g., to verify that the sending computing node is authorized to send communications to the destination, such as based on being associated with the same entity or part of the same virtual computer network, based on the sending computing node and destination being associated with different entities that are authorized to inter-communicate, based on the type of communication or other information specific to the communication, etc.). In some embodiments, there may be multiple alternative intermediate destinations for use in forwarding a communication to a final destination, such as multiple edge modules or multiple computing nodes for use in exchanging communications between one or more computing nodes and/or one or more external nodes. In the illustrated embodiment, in such situations, the system manager module selects a particular such alternative intermediate destination to use, such as may be identified by the current routine with respect to information received in block 525. Maintaining the use of a single such alternative intermediate destination between a pair of sending/destination nodes may provide various benefits, including to enable continuity for a particular flow of communications or other group of multiple communications back and forth between two nodes. In other embodiments, the selection of such a particular intermediate destination to use for a particular communication may be made in other manners, including by the routine 500 (e.g., with respect to block 550), and optionally in a dynamic manner for some or all such communications. For example, the routine 500 may instead receive in block 525 a list or other indication of multiple substrate network addresses corresponding to some or all of the multiple alternative intermediate destinations, and may then use that information as part of selecting a particular intermediate destination to use in a particular situation, as discussed in greater detail elsewhere.

If it is instead determined in block 510 that the received message is an incoming node communication for one of the managed computing nodes from a non-local node managed by a different communication manager module or by a edge module, the routine continues instead to block 565 to identify the substrate network addresses for the sender and for the destination computing node from the communication header. After block 565, the routine continues to block 570 to optionally verify that the incoming communication is valid in one or more ways. For example, the routine may determine whether the substrate network address for the sender is actually mapped to a node that corresponds to the location from where the communication entered the substrate network, such as based on interactions with a system manager module and/or based on other information previously obtained and stored by the routine. In addition, the routine may determine whether the substrate network address for the destination computing node corresponds to an actual managed computing node or external node. While not illustrated here, if an incoming communication is determined to not be valid, the routine may take various actions not shown, such as to generate one or more errors and perform associated processing and/or drop the incoming communication without forwarding it to the indicated destination node. For example, if the incoming communication indicates a destination network address that does not correspond to a current managed computing node, the routine may drop the incoming communication and/or initiate an error message, although in some embodiments such error messages are not sent to the sending computing node.

In the illustrated embodiment, after block 570, the routine continues to block 575 to retrieve the hardware address and the virtual network address that are mapped to the destination substrate network address, and to rewrite the communication header for the virtual computer network so that it appears to be sent to a computing node with that virtual network address and hardware address. For example, in some embodiments the destination virtual network address may be obtained from the destination substrate network address itself, such as from a subset of the bits of the destination substrate network address. In addition, the destination hardware address may have previously been mapped to the destination substrate network address, such as previously discussed with respect to block 525. In situations in which such prior mapping has not occurred, the routine may instead perform blocks 515-525 to obtain such information, although such actions are not illustrated in this example. The routine may similarly rewrite the communication header for the virtual computer network so that it appears to be sent from a node with a source virtual network address corresponding to the sender. Furthermore, in at least some embodiments, the routine in block 575 may further perform other modifications to the incoming communication that correspond to providing logical networking functionality to emulate the actions and functionality that would be performed by one or more logical networking devices that would have been used to forward the communication to the destination computing node in accordance with the configured network topology for the virtual computer network. After block 575, the routine continues to block 580 to facilitate providing of the modified incoming communication to the destination computing node, such as by initiating forwarding of the modified incoming communication to the destination computing node.

If it is instead determined in block 510 that a message of another type is received, the routine continues to block 585 to perform one or more other indicated operations as appropriate, such as to store information about entities associated with particular computing nodes and/or external nodes, store configuration information about edge modules or other intermediate destinations, store current or recent tracking information about intermediate destinations (e.g., current load information for particular intermediate destinations or other information about current characteristics of particular intermediate destinations), store information about external nodes and other configured network topologies for particular virtual computer networks, respond to requests and other messages from computing nodes in a manner to provide logical networking functionality corresponding to configured network topologies for virtual computer networks (e.g., by emulating actions and other functionalities that would be performed by specified logical networking devices if they were physically implemented), update previously mapped or stored information to reflect changes with respect to computing nodes that are being managed or to non-local nodes of a virtual computer network, perform operations to forward communications between multiple managed computing nodes of the communication manager module without forwarding such communications over the substrate network, etc. The storing and/or updating of stored information may be initiated in various manners, such as by receiving information in response to previous requests, periodically requesting such information, receiving information that is proactively pushed to the routine without a corresponding request, etc.

After blocks 560, 580, or 585, or if it is instead determined in block 530 that the processing is not being performed with respect to an outgoing communication, the routine continues to block 595 to determine whether to continue, such as until an explicit indication to terminate is received. If it is determined to continue, the routine returns to block 505, and if not continues to block 599 and ends.

Figure 6A:
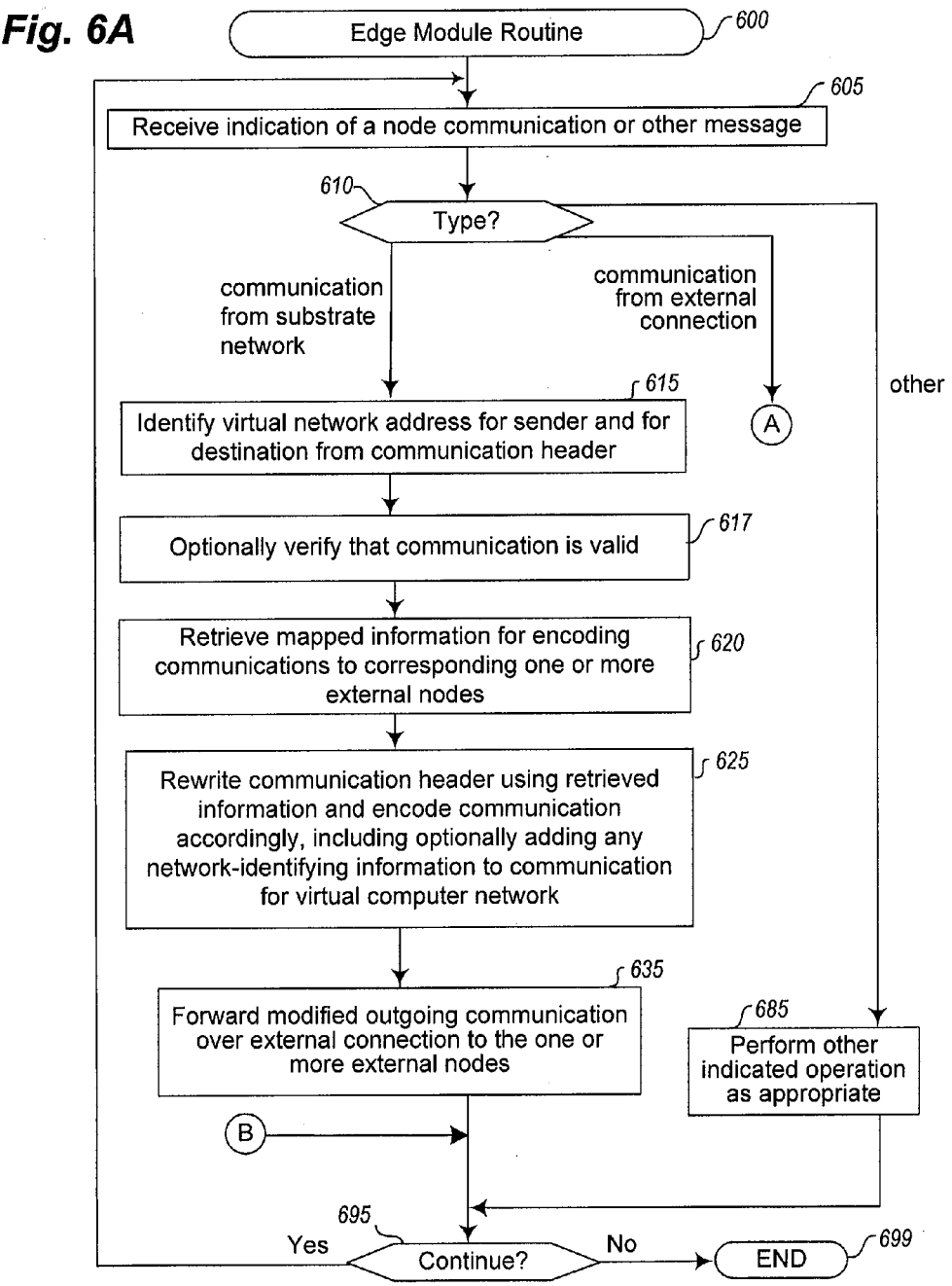
FIGS. 6A-6B illustrate a flow diagram of an example embodiment of a CNS Edge Module routine.
Figure 6B:
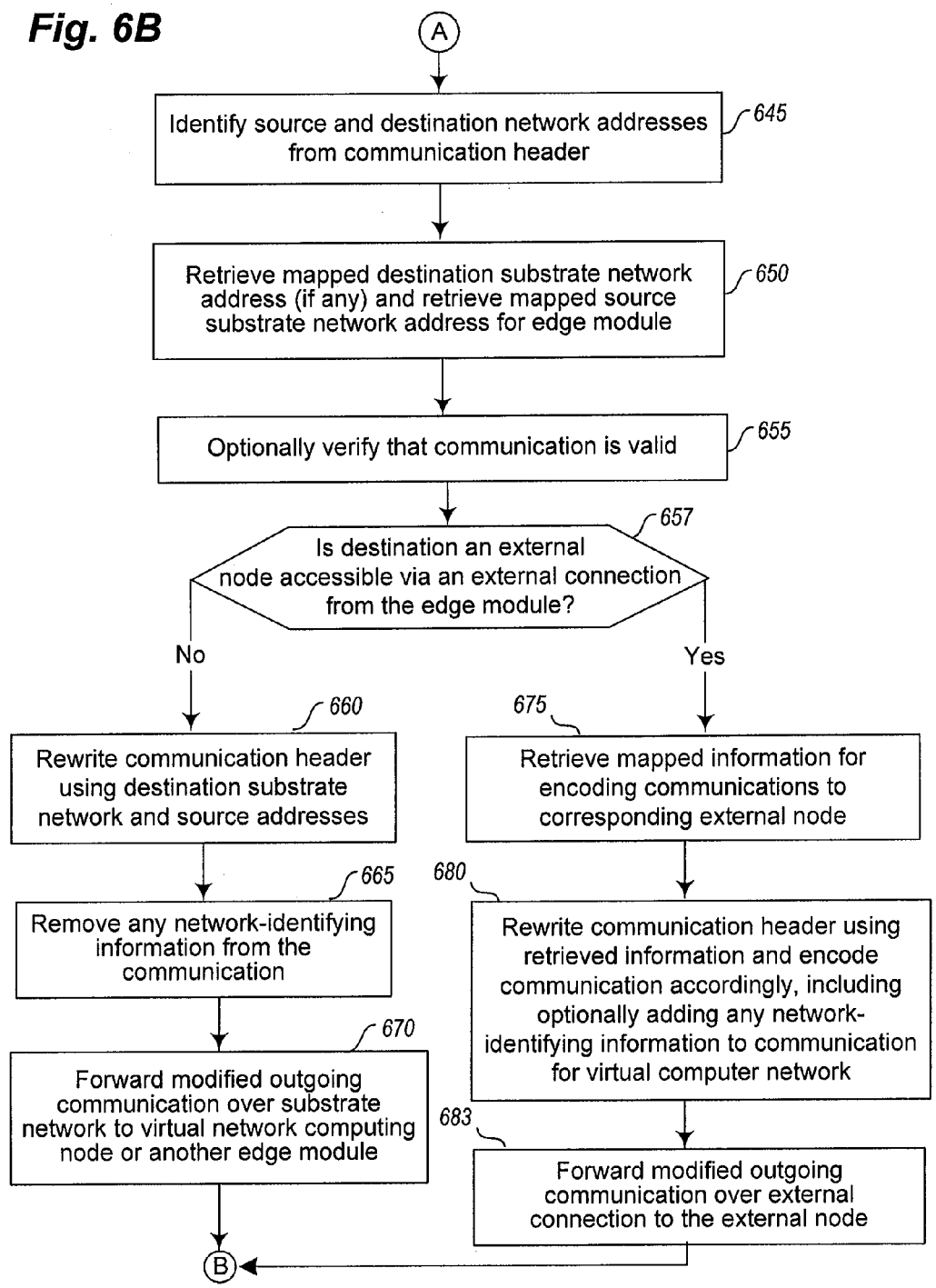

FIGS. 6A-6B are a flow diagram of an example embodiment of a CNS Edge Module routine 600. The routine may be provided by, for example, execution of the edge module N 275a and/or edge module M 275b of FIGS. 2C-2E, the edge devices 108 of FIG. 1B, the edge devices 365 of FIG. 3, and/or one or more edge modules (not shown) of the CNS service 105 of FIG. 1A (e.g., one of the other modules 115), such as to manage communications to and from an associated group of one or more external nodes that are not connected to the substrate network in order to integrate those external nodes as part of one or more virtual computer networks overlaid on the substrate network.

The routine begins at block 605, where an indication is received of a node communication or other message. The routine continues to block 610 to determine the type of communication or other message, and to proceed accordingly.

If it is determined in block 610 that the type of communication or other message is a communication from the substrate network that is directed to an external node, the routine continues to block 615 to identify from the communication the indicated virtual network address for the sender and the destination virtual network address for the intended final destination external node. The routine then continues to block 617 to optionally verify whether the communication is valid and/or authorized. In particular, the edge module performing the routine receives the incoming communication and may verify that the sending node and/or the edge module is authorized to send the communication to the final destination external node (e.g., based on being a response to a previous communication, or otherwise based on configuration information for the external node, the sending node, and the edge module). The routine then continues to block 620 to retrieve information mapped to the destination virtual network address that indicates how to encode communications sent to that destination virtual network address over an external connection, such as based on mapping information accessible to the edge module or other configuration of the edge module. In block 625, the routine then rewrites the communication header in accordance with the retrieved information (e.g., based on a networking address protocol for the external connection, based on an external network address for the external node, etc.), including optionally decoding the communication to remove information specific to the substrate network, and encoding the communication for the external connection over which it will be sent. The encoding of the communication may include changing other information in the new communication header (e.g., changing the source network address to another network address and/or port used to represent the sending computing node to external computer systems, such as if the routine performs NAT/PAT functionality for computing nodes of the virtual computer network; adding network-identifying information for the managed virtual computer network; etc.), and in at least some embodiments includes modifying the received communication without encapsulation as part of an overlay of the virtual computer network over the one or more external networks. In block 635, the routine then facilitates providing of the modified outgoing communication to the destination external node, such as by initiating forwarding of the modified outgoing communication over the external connection to the destination external node. While not illustrated here, the routine may further take actions in some embodiments to perform operations related to metering a quantity of communications that are forwarded by the routine to one or more external nodes, related to filtering particular communications sent to one or more external nodes, related to determining and/or enforcing limits on rates or quantities or other thresholds of use for communications to one or more external nodes, etc.

If it is instead determined in block 610 that the received message is an incoming communication from an external node over an external connection, the routine continues to block 645 to identify the source and destination network addresses from the communication header, as well as to optionally identify a particular virtual computer network to which the destination computing node belongs, such as based on network-identifying information (e.g., a VLAN identifier) included with the communication. After block 645, the routine continues to block 650 to retrieve the mapped destination substrate network address (if any) for the destination network address, whether mapped specifically to the destination network address or to a range or other group of multiple virtual network addresses to which the destination virtual network address belongs, as well as a source substrate network address for the edge module. After block 650, the routine continues to block 655 to optionally verify that the incoming communication is valid in one or more ways, such as based on interactions with a system manager module and/or based on other information previously obtained and stored by the routine regarding the sending node and/or destination node. While not illustrated here, if an incoming communication is determined to not be valid, the routine may take various actions not shown, such as to generate one or more errors and perform associated processing and/or drop the incoming communication without forwarding it to the indicated destination node.

In the illustrated embodiment, after block 655, the routine continues to block 657 to determine whether the destination is an external node accessible via an external connection from the edge module, whether the same external connection or a different external connection from which the communication was received. This determination may be made based on the destination network address, the specified configuration information for the destination node, and/or other network configuration and specified network topology information. If it is determined that the destination is an external node accessible via an external connection from the edge module, the routine continues to block 675 to retrieve information mapped to the destination virtual network address that indicates how to encode communications sent to that destination virtual network address over the external connection to be used. In block 680, the routine then rewrites the communication header in accordance with the retrieved information (e.g., based on a networking address protocol for the external connection, based on an external network address for the external node, etc.), including optionally changing other information in the new header (e.g., changing the source network address to another network address and/or port used to represent the sending computing node to external computer systems, such as if the routine performs NAT/PAT functionality for computing nodes of the virtual computer network, adding network-identifying information for the managed virtual computer network, etc.). In block 683, the routine then facilitates providing of the modified outgoing communication to the destination external node, such as by initiating forwarding of the modified outgoing communication over the external connection to the destination external node, such as without the communication passing over the substrate network. While not illustrated here, the routine may further take actions in some embodiments to perform operations related to metering a quantity of communications that are received from and/or forwarded to one or more external nodes, related to filtering particular communications received from and/or sent to one or more external nodes, related to determining and/or enforcing limits on rates or quantities or other thresholds of use for communications from and/or to one or more external nodes, etc.

If it is instead determined at block 657 that the destination is not an external node accessible from this edge module, the routine continues to block 660 to encode the communication for the substrate network by rewriting the communication header using the destination substrate and source network addresses, and in block 665 removes any network-identifying information for the virtual computer network from the communication (e.g., identifiers for a particular entity; a tag or label for the virtual computer network, such as a VLAN identifier for a particular VLAN associated with the destination virtual computer network; etc.). In block 670, the routine then facilitates providing of the modified outgoing communication to the destination node, such as by initiating forwarding of the modified communication to the substrate network for further forwarding to the destination node. As discussed in greater detail elsewhere, the destination node may in some embodiments be another external node accessible via another edge module (in which case the encoded communication is forwarded over the substrate network to that destination edge module), may be a final destination computing node connected to the substrate network, may be an intermediate destination computing node connected to the substrate network that further handles the communication, etc. While not illustrated here, the routine may further take actions in some embodiments to perform operations related to metering a quantity of communications that are received from and/or forwarded to one or more external nodes, related to filtering particular communications received from and/or forwarded to one or more external nodes, related to determining and/or enforcing limits on rates or quantities or other thresholds of use for communications received from and/or forwarded to one or more external nodes, etc.

If it is instead determined in block 610 that a message of another type is received, the routine continues to block 685 to perform one or more other indicated operations as appropriate, such as to store information about entities associated with particular external nodes, store information about external nodes and other configured network topologies for particular virtual computer networks, update previously mapped or stored information to reflect changes with respect to external nodes that are being managed or to other computing nodes, forward communications between computing nodes and external computer systems that are not part of any virtual computer networks, perform configuration or reporting related to actions taken to meter communications that are forwarded by the routine to one or more external nodes or taken to filter particular communications or taken to determine and/or store information about a threshold of use of particular external nodes, etc. The storing and/or updating of stored information may be initiated in various manners, such as by receiving information in response to previous requests, periodically requesting such information, receiving information that is proactively pushed to the routine without a corresponding request, etc.

After blocks 635, 670, 683 or 685, the routine continues to block 695 to determine whether to continue, such as until an explicit indication to terminate is received. If it is determined to continue, the routine returns to block 605, and if not continues to block 699 and ends.

In addition, various embodiments may provide mechanisms for customer users and other entities to interact with an embodiment of the system manager module for the purpose of configuring computing nodes and external nodes. For example, some embodiments may provide an interactive console (e.g. a client application program providing an interactive user interface, a Web browser-based interface, etc.) from which users can manage the creation or deletion of virtual computer networks, the configuration of specified VLANs for virtual computer networks, the configuration of network topology information for virtual computer networks, and the specification of virtual network membership, as well as more general administrative functions related to the operation and management of hosted applications (e.g., the creation or modification of user accounts; the provision of new applications; the initiation, termination, or monitoring of hosted applications; the assignment of applications to groups; the reservation of time or other system resources; etc.). In some embodiments, some or all of the functionality of an embodiment of the CNS system may be provided in exchange for fees from users or other entities acting as customers or other clients of the CNS system, and if so the mechanisms for such clients to interact with an embodiment of the system manager module may include mechanisms for users and other entities to provide payment and payment-related information, as well as to monitor corresponding payment information. In addition, some embodiments may provide an API that allows other computing systems and programs to programmatically invoke at least some of the described functionality, such as APIs provided by libraries or class interfaces (e.g., to be invoked by programs written in C, C++, or Java) or otherwise, and/or using network service protocols such as via Web services. Additional details related to the operation of example embodiments of a program execution service with which the described techniques may be used are available in U.S. application Ser. No. 11/394,595, filed Mar. 31, 2006 and entitled "Managing Communications Between Computing Nodes;" U.S. application Ser. No. 11/395,463, filed Mar. 31, 2006 and entitled "Managing Execution of Programs by Multiple Computing Systems;" U.S. application Ser. No. 11/692,038, filed Mar. 27, 2007 and entitled "Configuring Intercommunications Between Computing Nodes;" and U.S. application Ser. No. 12/332,214, filed Dec. 10, 2008 and entitled "Providing Access To Configurable Private Computer Networks;" each of which is incorporated herein by reference in its entirety. In addition, additional details related to the management of provided virtual networks that may be used by at least some embodiments of a CNS system, such as in conjunction with an Overlay Network Manager module of such a CNS system, are available in U.S. application Ser. No. 12/060,074, filed Mar. 31, 2008 and entitled "Configuring Communications Between Computing Nodes;" and in U.S. application Ser. No. 12/414,260, filed Mar. 30, 2009 and entitled "Providing Virtual Networking Functionality For Managed Computer Networks;" each of which is also incorporated herein by reference in its entirety.

It will also be appreciated that, although in some embodiments the described techniques are employed in the context of a data center housing multiple physical machines hosting virtual machines, other implementation scenarios are also possible. For example, the described techniques may be employed in the context an organization-wide network or networks operated by a business or other institution (e.g. university) for the benefit of its employees and/or members. Alternatively, the described techniques could be employed by a network service provider to improve network security, availability, and isolation. In addition, example embodiments may be employed within a data center or other context for a variety of purposes. For example, data center operators or users that sell access to hosted applications to customers may in some embodiments use the described techniques to provide network isolation between their customers' applications and data; software development teams may in some embodiments use the described techniques to provide network isolation between various environments that they use (e.g., development, build, test, deployment, production, etc.); organizations may in some embodiments use the described techniques to isolate the computing resources utilized by one personnel group or department (e.g., human resources) from the computing resources utilized by another personnel group or department (e.g., accounting); or data center operators or users that are deploying a multi-piece application (e.g., a multi-tiered business application) may in some embodiments use the described techniques to provide functional decomposition and/or isolation for the various types of interacting pieces (e.g., Web front-ends, database servers, business rules engines, etc.). More generally, the described techniques may be used to virtualize physical networks to reflect almost any situation that would conventionally necessitate physical partitioning of distinct computing systems and/or networks.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A non-transitory computer-readable storage medium having stored contents that configure a computing system to:

obtain information regarding a first virtual computer network overlaid on a distinct substrate network that interconnects multiple computing nodes of the first virtual computer network, and wherein the first virtual computer network further includes a first external node separated from the substrate network via a first external connection;

configure a first edge module that interconnects the substrate network and the first external connection to associate a first group of multiple virtual network addresses with a second computing node of the multiple computing nodes that is configured to act as an intermediate destination for at least some communications directed to the virtual network addresses of the first group, the virtual network addresses of the first group including a first virtual network address associated with a third computing node of the multiple computing nodes; and under control of the first edge module,
  receive a first communication from the first external node via the first external connection that the first external node indicates to be sent to the third computing node by specifying the first virtual network address for the third computing node;
  encode the first communication in a manner specific to the substrate network; and
  forward the encoded first communication over the substrate network from the first edge module to the second computing node, to enable the second computing node to manage further forwarding of the encoded first communication to the third computing node.

2. The non-transitory computer-readable storage medium of claim 1 wherein the obtained information is configuration information specified by a user on whose behalf the first virtual computer network is provided and includes a specified network topology for the first virtual computer network, and wherein the first virtual computer network is overlaid on the substrate network without physically implementing the specified network topology for the first virtual computer network.

3. The non-transitory computer-readable storage medium of claim 1 wherein the first virtual computer network further includes multiple second external nodes that are distinct from the first external node and are separated from the substrate network via a second external connection distinct from the first external connection, wherein the first edge module is further configured to associate the multiple second external nodes with a second edge module, and wherein the stored contents further configure the computing system to:

under control of the first edge module,
  receive a second communication from the first external node via the first external connection that is directed to one of the multiple external nodes of the second group;
  encode the second communication in a manner specific to the substrate network; and
  forward the encoded second communication over the substrate network from the first edge module to the second edge module for further handling; and
under control of the second edge module,
  receive the forwarded encoded second communication from the substrate network;
  decode the received forwarded second communication to remove information specific to the substrate network; and further forward the decoded second communication from the substrate network over the second external connection to the one external node of the second group.

4. The non-transitory computer-readable storage medium of claim 1 wherein the first virtual computer network further includes a second external node separated from the substrate network via a second external connection that is accessible to the first edge module, and wherein the stored contents further configure the computing system to, under control of the first edge module:
receive a second communication from the first external node via the first external connection that is directed to the second external node; and
without forwarding the second communication over the substrate network, forward the second communication from the first edge module via the second external connection to the second external node.

5. The non-transitory computer-readable storage medium of claim 1 wherein the stored contents further configure the computing system to:
for each of one or more second communications sent by the multiple computing nodes to the first external node, encode the second communication in a manner specific to the substrate network, and forward the encoded second communication over the substrate network to the first edge module; and
under control of the first edge module, for each of the second communications:
receive the forwarded second communication from the substrate network;
decode the received forwarded second communication to remove information specific to the substrate network; and
further forward the decoded second communication from the substrate network over the first external connection toward the first external node.

6. The non-transitory computer-readable storage medium of claim 1 wherein the stored contents further configure the computing system to, under control of the second computing node, receive the forwarded encoded first communication from the substrate network and further forward the received encoded first communication over the substrate network from the second computing node to the third computing node.

7. The non-transitory computer-readable storage medium of claim 1 wherein the stored contents further configure the computing system to, for a second communication sent by one the multiple computing nodes to another of the multiple computing nodes, encode the second communication in a manner specific to the substrate network, and forward the encoded second communication over the substrate network directly to the another computing node without forwarding the encoded second communication to the second computing node, and wherein the stored contents are instructions that, when executed, program the computing system to perform the method.

8. A system, comprising:
one or more hardware processors of one or more computing systems;
a manager module that is configured to, when executed by at least one of the one or more hardware processors, manage a first communication for a virtual computer network that has multiple computing nodes interconnected by an underlying second network and that has one or more external nodes separated from the second network via one or more external connections, wherein the first communication is sent to a first destination virtual network address associated with a first computing node of the multiple computing nodes, and wherein the managing of the first communication includes:
encoding the first communication in a manner specific to the second network; and
initiating forwarding the encoded first communication to the first computing node over the second network without using the one or more external connections; and
an edge module that interconnects the second network with the one or more external nodes via the one or more external connections and that is associated with one or more second virtual network addresses of the virtual computer network assigned to the one or more external nodes, the edge module being configured to, when executed by at least one of the one or more hardware processors, manage a second communication that is sent to one of the one or more second virtual network addresses, the managing of the second communication including:
receiving the second communication; and
initiating forwarding of the received second communication to at least one of the one or more external nodes via at least one of the one or more external connections.

9. The system of claim 8 wherein the one or more external nodes include one or more first external nodes separated from the second network via a first of the one or more external connections and include one or more second external nodes separated from the second network via a second of the one or more external connections, and wherein the second communication is sent to the edge module by one of the first external nodes over the first external connection and is forwarded by the edge module to one of the second external nodes over the second external connection.

10. The system of claim 8 wherein the one or more external nodes include one or more first external nodes separated from the second network via a first external connection, wherein a second edge module interconnects the second network with one or more second external nodes via a second external connection, wherein the second communication is sent to the second edge module by one of the second external nodes over the second external connection, and wherein the second edge module is configured to, before the receiving of the second communication by the edge module:
encode the second communication in a manner specific to the second network; and
forward the encoded second communication over the second network from the second edge module to the edge module.

11. The system of claim 9 wherein the one or more first external nodes are at a first geographical location remote from the second network, wherein the one or more second external nodes are at a distinct second geographical location remote from the second network, and wherein the one or more second virtual network addresses are part of a range of multiple virtual network addresses assigned to the one or more second external nodes.

12. The system of claim 8 wherein the manager module is one of multiple manager modules of a configurable network service that each includes software instructions for execution by the at least one hardware processors, and wherein the edge module is part of a hardware edge device.

13. The system of claim 8 wherein the edge module consists of a means for performing the managing of the second communication.

14. A computer-implemented method comprising:
receiving configuration information for a virtual computer network having multiple computing nodes and having one or more external nodes, the virtual computer network being overlaid on a distinct substrate network that interconnects the multiple computing nodes, the one or more external nodes being separated from the substrate network via an external connection;
configuring a first edge module that interconnects the substrate network and the first external connection, the configuring including associating multiple virtual network addresses for the virtual computer network with a first computing node of the multiple computing nodes, the first computing node being configured to act as an intermediate destination for at least some communications directed to the multiple virtual network addresses;
receiving, by the first edge module, a communication from one of the one or more external nodes via the external connection, the communication being directed via one of the multiple virtual network addresses to a second computing node of the multiple computing nodes, the first edge module executing on a configured device;
encoding, by the executing first edge module, the communication in a manner specific to the substrate network; and
forwarding, by the executing first edge module, the encoded communication over the substrate network from the first edge module to the first computing node based on the configuring, to enable the first computing node to act as the intermediate destination and manage further communication forwarding to the second computing node.

15. The method of claim 14 wherein the one or more external nodes include a first external node separated from the substrate network via a first external connection, wherein the first edge module interconnects the substrate network and the first external connection, and wherein the communication is received from the first external node.

16. The method of claim 15 wherein the one or more external nodes further include a second external node separated from the substrate network via a second external connection, and wherein a distinct second edge module interconnects the substrate network and the second external connection.

17. The method of claim 16 further comprising, under control of the executing first edge module:
receiving a second communication from the first external node via the first external connection that is directed to the second external node;
encoding the second communication to include information specific to the substrate network; and
forwarding the encoded second communication over the substrate network from the first edge module to the second edge module for further handling.

18. The method of claim 17 further comprising, under control of the second edge module:
receiving the forwarded encoded second communication;
decoding the received forwarded encoded second communication to remove the included information specific to the substrate network; and
further forwarding the decoded second communication over the second external connection toward the second external node.

19. The method of claim 17 wherein the configuring of the first edge module further includes, before the receiving of the second communication, associating with the second edge module one or more additional virtual network addresses of the virtual computer network that are assigned to the second external node, and wherein the encoding of the second communication further includes selecting the second edge module as a recipient for the forwarding of the encoded second communication based on the second communication being directed to one of the one or more additional virtual network addresses.

20. The method of claim 19 wherein the one or more additional virtual network addresses assigned to the second external node are a range of multiple virtual network addresses represented with a classless inter-domain routing (CIDR) block.

21. The method of claim 17 wherein the multiple computing nodes and the first and second edge modules each has a distinct substrate network address that corresponds to a location in the substrate network, and wherein the forwarding of the encoded second communication over the substrate network from the first edge module to the second edge module uses the substrate network address for the second edge module.

22. The method of claim 17 further comprising selecting the second edge module from a pool of multiple alternative edge modules associated with the second external connection before forwarding the encoded second communication over the substrate network from the first edge module to the second edge module.

23. The method of claim 16 wherein the first external node is part of a first computer network of multiple nodes at a first geographical location remote from the substrate network, wherein the second external node is part of a second computer network of multiple other nodes at a distinct second geographical location remote from the substrate network, wherein the first external connection is a first virtual private network (VPN) connection between the substrate network and the first computer network, wherein the second external connection is a distinct second VPN connection between the substrate network and the second computer network, and wherein the first and second edge modules are each part of one of multiple edge devices connected to the substrate network.

24. The method of claim 14 wherein the external connection is a multi-protocol label switching (MPLS) connection, a connection to a public network, or a dedicated private connection to a distinct location.

25. The method of claim 14 wherein the received configuration information further indicates a specified network topology for the virtual computer network, and wherein the method further comprises providing the virtual computer network by overlaying the virtual computer network on the substrate network without physically implementing the specified network topology for the virtual computer network.

26. The method of claim 14 wherein the received configuration information further indicates a plurality of virtual network addresses for use with the virtual computer network, and wherein the multiple virtual network addresses are a subset of the plurality of virtual network addresses.

27. The method of claim 14 further comprising, before the receiving of the communication:
assigning the multiple virtual network addresses to the multiple computing nodes, the assigning including assigning, to the second computing node, the one virtual network address to which the communication is directed; and
assigning a range of multiple additional virtual network addresses for the virtual computer network to the one or more external nodes, the multiple additional virtual network addresses of the range being distinct from the multiple virtual network addresses assigned to the multiple computing nodes.

28. The method of claim 27 wherein the assigning of the range of multiple additional virtual network addresses to the one or more external nodes includes associating the range of multiple additional virtual network addresses with the first edge module for use with the external connection.

29. The method of claim 14 further comprising, for each of one or more second communications sent between the multiple computing nodes, encoding the second communication in a manner specific to the substrate network, and forwarding the encoded second communication over the substrate network to a destination computing node without forwarding the encoded second communication to the first computing node.

* * * * *

UNITED STATES PATENT AND TRADEMARK OFFICE
CERTIFICATE OF CORRECTION

PATENT NO.       : 8,683,023 B1
APPLICATION NO.  : 12/828060
DATED            : March 25, 2014
INVENTOR(S)      : Eric Jason Brandwine et al.

Page 1 of 2

It is certified that error appears in the above-identified patent and that said Letters Patent is hereby corrected as shown below:

Title Page, Other Publications:

Item (56):
"Coulson, D., "Network Security Iptables," March 2003, Linuxpro, Part 1, retrieved from http://davidcoulson.net/writing/lxf138/iptables.pdf, 4 pages." should read, --Coulson, D., "Network Security Iptables," March 2003, Linuxpro, Part 1, retrieved from http://davidcoulson.net/writing/lxf/38/iptables.pdf, 4 pages.--.

Item (56):
"Ioannidis, S., "Implementing a Distributed Firewall," November 2000, (ACM) Proceedings of the ACM Computer and Communications Security (CCS) 2000, Athens, Greece, pp. 190-199, retrieved from http://www.cis.upenn.edu/~dsl/STRONGMAN/Papers/df.pdf, 10 pages." should read, --Ioannidis, S., "Implementing a Distributed Firewall," November 2000, (ACM) Proceedings of the ACM Computer and Communications Security (CCS) 2000, Athens, Greece, pp. 190-199, retrieved from http://www.cis.upenn.edu/~dsl/STRONGMAN/Papers/df.pdf, 10 pages.--.

Item (56):
"Clark, C., et al., "Live Migration of Virtual Machines," retrieved on March 16, 2009, from http://www.cl.cam.ac.uk/research/srg/netos/pa-pers/2005-migration-nsdi-pre.pdf, 14 pages." should read, --Clark, C., et al., "Live Migration of Virtual Machines," retrieved on March 16, 2009, from http://www.cl.cam.ac.uk/research/srg/netos/papers/2005-migration-nsdi-pre.pdf, 14 pages.--.

Item (56):
""Connecting IPv6 Islands Across IPv4 Clouds with BGP," retrieved on June 24, 2010, from http://www.juniper.net/ techpubs/en_US/junose10.2/information-products/topic-collections/swconfig-bgp-mpls/id-13832.html, 5 pages." should read, --"Connecting IPv6 Islands Across IPv4 Clouds with BGP," retrieved on June 24, 2010, from http://www.juniper.net/techpubs/en_US/_junose10.2/information-products/topic-collections/swconfig-bgp-mpls/id-13832.html, 5 pages.--.

Signed and Sealed this
Twelfth Day of August, 2014

Michelle K. Lee
*Deputy Director of the United States Patent and Trademark Office*

CERTIFICATE OF CORRECTION (continued)
U.S. Pat. No. 8,683,023 B1

In the Claims:

Column 61, Lines 47-48, Claim 7:
"computing system to, for a second communication sent by one the multiple computing nodes to another of the multiple" should read, --computing system to, for a second communication sent by one of the multiple computing nodes to another of the multiple--.